(12) United States Patent
Atkiss et al.

(10) Patent No.: US 11,873,584 B2
(45) Date of Patent: Jan. 16, 2024

(54) PRECURSOR STABILISATION PROCESS

(71) Applicant: Deakin University, Geelong (AU)

(72) Inventors: Stephen Paul Atkiss, Dingwall (GB); Maxime Robert Maghe, Hamlyn Heights (AU)

(73) Assignee: Deakin University, Victoria (AU)

( * ) Notice: Subject to any disclaimer, the term of this patent is extended or adjusted under 35 U.S.C. 154(b) by 542 days.

(21) Appl. No.: 16/754,708

(22) PCT Filed: Oct. 10, 2017

(86) PCT No.: PCT/AU2017/051094
§ 371 (c)(1),
(2) Date: Apr. 8, 2020

(87) PCT Pub. No.: WO2019/071286
PCT Pub. Date: Apr. 18, 2019

(65) Prior Publication Data
US 2020/0248339 A1 Aug. 6, 2020

(51) Int. Cl.
*D01F 9/22* (2006.01)
*C01B 32/05* (2017.01)
*C08J 5/00* (2006.01)
*D01F 6/18* (2006.01)
*D01F 6/40* (2006.01)

(52) U.S. Cl.
CPC .............. *D01F 9/225* (2013.01); *C01B 32/05* (2017.08); *C08J 5/00* (2013.01); *D01F 6/18* (2013.01); *D01F 6/40* (2013.01); *C08J 2333/20* (2013.01)

(58) Field of Classification Search
CPC ... D01F 9/225; D01F 6/18; D01F 6/40; C01B 32/05; C08J 5/00; C08J 2333/20
See application file for complete search history.

(56) References Cited

U.S. PATENT DOCUMENTS

| 3,862,334 | A | 1/1975 | Turner |
| 3,961,888 | A | 1/1976 | Riggs |
| 5,256,344 | A | 10/1993 | Schimpf |
| 8,236,273 | B2 | 8/2012 | Oyama et al. |
| 2010/0260658 | A1* | 10/2010 | Oyama .................. D01F 9/225 423/447.2 |

(Continued)

FOREIGN PATENT DOCUMENTS

| CN | 102181963 A * | 9/2011 | ............... D01F 9/22 |
| CN | 102181963 A | 9/2011 | |

(Continued)

OTHER PUBLICATIONS

International-Type Search dated Sep. 28, 2021 for referenced in JP 2020-518782.

(Continued)

*Primary Examiner* — John E Uselding
(74) *Attorney, Agent, or Firm* — McDonnell Boehnen Hulbert & Berghoff LLP

(57) ABSTRACT

The invention relates to an improved process for forming a stabilised precursor that is suitable for the manufacture of carbon materials, such as carbon fibre. The process can convert a precursor comprising polyacrylonitrile into a stabilised precursor with greater efficiency. The invention also relates to a process for preparing a carbon fibre that utilises the stabilised precursor.

12 Claims, 22 Drawing Sheets

(56) References Cited

U.S. PATENT DOCUMENTS

2013/0059261 A1 3/2013 Sprague
2015/0299909 A1 10/2015 Mizuno et al.

FOREIGN PATENT DOCUMENTS

| EP | 3018238 A1 | 5/2016 |
|---|---|---|
| GB | 2138114 A | 10/1984 |
| GB | 2184819 A | 7/1987 |
| JP | S5530472 A | 3/1980 |
| JP | H07292526 A | 11/1995 |

OTHER PUBLICATIONS

"The structural evolution and control of polyacrylonitrile fibers during heat treatment", Qin Xianying, China Doctoral Dissertations Full-Text Database (Engineering Science and Technology Series I), vol. 3, pp. B016-13 published: Mar. 15, 2013.

Liu C. et al. "Evolution of the crystalline structure and cyclization with changing tension during the stabilization of polyacrylonitrile fibers", Journal of Applied Polymer Science, 2015, vol. 132, pp. 42182/1-42182/10.

Qin X. et al.., "Effect of Heating and Stretching Polyacrylonitrile Precursor Fibers in Steam on the Properties of Stabilized Fibers and Carbon Fibers", Polymer Engineering and Science, 2013, vol. 53, pp. 827-832.

Qin X. et al., "Improving preferred orientation and mechanical properties of PAN-based carbon fibers by pretreating precursor fibers in nitrogen", Carbon, Jun. 13, 2011, vol. 49, pp. 4598-4600.

Qin X. et al."Improving stabilization degree of stabilized fibers by pretreating polyacrylonitrile precursor fibers in nitrogen", Materials Letters, Feb. 28, 2012, vol. 76, pp. 162-164.

International-Type Search dated Oct. 10, 2016 in relation to AU 2016904219.

International-Type Search dated Mar. 22, 2017 in relation to AU 2016904220.

International Search Report dated Nov. 9, 2017 in relation to PCT/AU2017/051094.

* cited by examiner

PRECURSOR STABILISATION PROCESS

TECHNICAL FIELD

The invention relates to a process for forming a stabilised precursor that can be used in the manufacture of carbon-based materials such as carbon fibre, and to stabilised precursors formed by the process. The invention also relates to a process for preparing a carbon fibre that utilises the stabilised precursor.

BACKGROUND

Carbon fibres are fibres predominately composed of carbon atoms, which are manufactured by converting organic precursors, such as polyacrylonitrile (PAN) precursors, into carbon.

Conventionally, carbon fibre is manufactured by subjecting a PAN precursor to a series of heat treatments, which can be broadly divided into two major steps; stabilisation and carbonisation. The first major step, called stabilisation, involves the heating of a PAN precursor in air at a temperature of from 200° C. to 300° C. in order to prepare the precursor to be able to withstand the following carbonisation step. During carbonisation, the stabilised precursor undergoes chemical rearrangement, leading to the release of non-carbonaceous atoms and the formation of a highly ordered carbon-based structure. The carbonisation step is often performed at temperatures ranging from 400° C. to 1600° C., in furnaces containing an inert atmosphere.

The stabilisation process is often performed in a series of ovens and can take a number of hours to complete. Consequently, precursor stabilisation can be costly from a time and energy perspective, thus making it an expensive part of the carbon fibre manufacturing process. Additionally, the exothermic nature of stabilisation reactions as well as the combination of heat and oxygen used for precursor stabilisation can present a fire risk, thus giving rise to serious safety concerns.

It would be desirable to provide a process for the preparation of a stabilised PAN precursor that overcomes or ameliorates one or more shortcomings of conventional precursor stabilisation processes. It would also be desirable to provide a process that enables carbon fibre to be manufactured in a more efficient manner.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

SUMMARY OF THE INVENTION

The present invention is directed to a process for preparing a stabilised precursor, which can be used in the manufacture of carbon materials, such as carbon fibre. Advantageously, the process of the invention can enable a stabilised precursor fibre useful for carbon fibre manufacture to be formed rapidly.

In one aspect, the present invention provides a process for preparing a stabilised precursor, the process comprising:

heating a precursor comprising polyacrylonitrile in a substantially oxygen-free atmosphere while applying a substantially constant amount of tension to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups as determined by Fourier transform infrared (FT-IR) spectroscopy; and exposing the pre-stabilised precursor to an oxygen containing atmosphere to form the stabilised precursor.

The temperature, time and tension conditions selected for the process can enable a pre-stabilised precursor having at least 10% cyclised nitrile groups to be generated in a short period of time.

In particular embodiments, the temperature in which the precursor is heated in the substantially oxygen-free atmosphere and the amount of tension applied to the precursor as it is heated are each selected to promote formation at least 10% cyclised nitrile groups in the precursor in a time period selected from the group consisting of less than 5 minutes, less than 4 minutes, less than 3 minutes, or less than 2 minutes. Thus the precursor need only be heated in the substantially oxygen-free atmosphere for a time period of several minutes to generate a pre-stabilised precursor having at least 10% cyclised nitrile groups.

During the precursor stabilisation process, the precursor is heated in the substantially oxygen-free atmosphere at a temperature that is sufficient to trigger formation of at least 10% cyclised nitrile groups in the precursor within the time period selected.

In some embodiments, the precursor is heated in the substantially oxygen-free atmosphere at a temperature that is in proximity of the degradation temperature of the precursor. In one preference, the precursor is heated in the substantially oxygen-free atmosphere at a temperature that is not more than 30° C. below the degradation temperature of the precursor.

In particular embodiments, the precursor is heated in the substantially oxygen-free atmosphere at a temperature in a range of from about 250° C. to 400° C., preferably a temperature in a range of from about 280° C. to 320° C.

The amount of tension applied to the precursor can influence the extent of nitrile group cyclisation. Tension can be selected to enable a desired amount of cyclised nitrile groups to be formed in the pre-stabilised precursor under selected parameters of temperature and time period for heating the precursor in the substantially oxygen-free atmosphere.

In one or more embodiments, the amount of tension applied to the precursor is selected to form a pre-stabilised precursor having at least 15% cyclised nitrile groups, preferably at least 20% cyclised nitrile groups, as determined by Fourier transform infrared (FT-IR) spectroscopy.

In a specific embodiment, the amount of tension applied to the precursor is selected to form a pre-stabilised precursor having 20% to 30% cyclised nitrile groups, as determined by Fourier transform infrared (FT-IR) spectroscopy.

It has been found that precursors comprising polyacrylonitrile have a potential to attain a maximum amount of nitrile group cyclisation. Pre-stabilisation process parameters of temperature, time and tension can be selected to promote a maximum extent of nitrile group cyclisation in the precursor. Alternatively, pre-stabilisation process parameters of temperature, time and tension can be selected to promote an extent of nitrile group cyclisation in the precursor that varies from the maximum amount potentially attainable by an acceptable amount.

In one embodiment, the amount of tension applied to the precursor is selected to promote an extent of nitrile group cyclisation that is up to 80% less than the maximum amount that is attainable in the precursor.

In another embodiment, the amount of tension applied to the precursor is selected to promote formation of the maximum amount of nitrile group cyclisation that is attainable in the precursor. A pre-stabilised precursor having a maximum amount of cyclised nitrile groups can facilitate formation of a stabilised precursor with improved efficiency.

In one or more embodiments, an amount of tension in a range of from about 50 cN to about 50,000 cN can be applied to precursor as it is heated in the substantially oxygen-free atmosphere.

The substantially oxygen-free atmosphere employed in the precursor stabilisation process described herein may comprise a suitable gas. In one embodiment, the substantially oxygen-free atmosphere comprises nitrogen.

The pre-stabilised precursor formed in accordance with the process of the invention is exposed to an oxygen containing atmosphere to form a stabilised precursor. Desirably, the stabilised precursor is capable of being carbonised to form a carbon-based material, such as carbon fibre.

The pre-stabilised precursor may only need to be exposed to the oxygen containing atmosphere for a relatively short period of time to form a stabilised precursor, compared to conventional precursor stabilisation processes known in the prior art. In one embodiment, the pre-stabilised precursor is exposed to the oxygen containing atmosphere for a time period of no more than about 30 minutes.

The pre-stabilised precursor is preferably heated when in the oxygen containing atmosphere. Heating of the pre-stabilised precursor can facilitate rapid formation of the stabilised precursor. In some particular embodiments, the pre-stabilised precursor is heated in the oxygen containing atmosphere at a temperature in a range of from about 200° C. to 300° C.

In one set of embodiments, the pre-stabilised precursor is heated in the oxygen containing atmosphere at a temperature that is lower than that used to form the pre-stabilised precursor.

As temperatures for forming the stabilised precursor may be lower than that employed for forming the pre-stabilised precursor, some embodiments of the precursor stabilisation process described herein may further comprise a step of cooling the pre-stabilised precursor prior to exposing the pre-stabilised precursor to the oxygen containing atmosphere.

The precursor stabilisation process of the invention can enable a suitably stabilised precursor to be formed rapidly.

In some embodiments, the process of the invention can enable a stabilised precursor to be formed in a time period selected from no more than about 60 minutes, no more than about 45 minutes, no more than about 30 minutes, and no more than about 25 minutes.

In some embodiments, the stabilisation process of the invention may form a stabilised precursor with an average energy consumption in a range of from about 1.1 to 2.6 kWh/kg.

One or more embodiments of a process described herein may further comprise a step of determining a tension parameter for a precursor prior to forming the pre-stabilised precursor, wherein determining the tension parameter for the precursor comprises:
 (a) selecting a temperature and time period for heating a precursor in a substantially oxygen-free atmosphere;
 (b) applying a range of different substantially constant amounts of tension to the precursor while heating the precursor in the substantially oxygen-free atmosphere at the selected temperature and for the selected time period;
 (c) determining by Fourier transform infrared (FT-IR) spectroscopy the amount of cyclised nitrile groups formed in the precursor for each substantially constant amount of tension applied to the precursor;
 (d) calculating a trend of extent of nitrile group cyclisation (% EOR) versus tension, (e) identifying from the calculated trend the amounts of tension providing at least 10% nitrile group cyclisation and maximum nitrile group cyclisation in the precursor; and
 (f) selecting an amount of tension giving rise to at least 10% nitrile group cyclisation to pre-stabilise the precursor.

In some embodiments of the tension parameter determining step, an amount of tension giving rise to maximum nitrile cyclisation is selected to pre-stabilise the precursor as described herein.

The above embodiments of the stabilisation process can be applied to a precursor fibre and incorporated into a process for preparing a carbon fibre.

In another aspect, the present invention provides a process for preparing a carbon fibre comprising the steps of:
 providing a stabilised precursor fibre prepared according to a process of any one of the embodiments described herein; and
 carbonising the stabilised precursor fibre to form the carbon fibre.

Conventional carbonisation process conditions may be employed to convert the stabilised precursor into carbon fibre. In one set of embodiments, carbonising the stabilised precursor involves heating the stabilised precursor in an inert atmosphere at a temperature in a range of from about 350° C. to 3000° C.

In one or more embodiments of a carbon fibre preparation process described herein, the carbon fibre is formed within a time period of no more than about 70 minutes, or no more than about 45 minutes.

In some embodiments, the carbon fibre preparation process is continuous and comprises the steps of:
 feeding a precursor comprising polyacrylonitrile in to a pre-stabilisation reactor comprising a substantially oxygen-free atmosphere and heating the precursor in the substantially oxygen-free atmosphere while applying a substantially constant amount of tension to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups as determined by Fourier transform infrared (FT-IR) spectroscopy;
 feeding the pre-stabilised precursor in to an oxidation reactor comprising an oxygen containing atmosphere and exposing the pre-stabilised precursor to the oxygen containing atmosphere to form a stabilised precursor; and feeding the stabilised precursor in to a carbonisation unit and carbonising the stabilised precursor in the carbonisation unit to form the carbon fibre.

In some embodiments of a continuous carbon fibre preparation process described herein there may be a further step of cooling the pre-stabilised precursor prior to the feeding the pre-stabilised precursor in to the oxidation reactor.

Also provided is a stabilised precursor prepared by a precursor stabilisation process of any one of the embodiments described herein.

Further, there is also provided a carbon fibre prepared by a carbon fibre preparation process of any one of the embodiments described herein.

In another aspect, there is also provided a low density, stabilised precursor comprising polyacrylonitrile which has at least 60% cyclised nitrile groups and a mass density in a range of from about 1.30 to 1.33 g/cm$^3$.

BRIEF DESCRIPTION OF THE FIGURES

Embodiments of the invention will now be described with reference to the following non-limiting drawings in which.

DETAILED DESCRIPTION OF THE INVENTION

Figure 1:
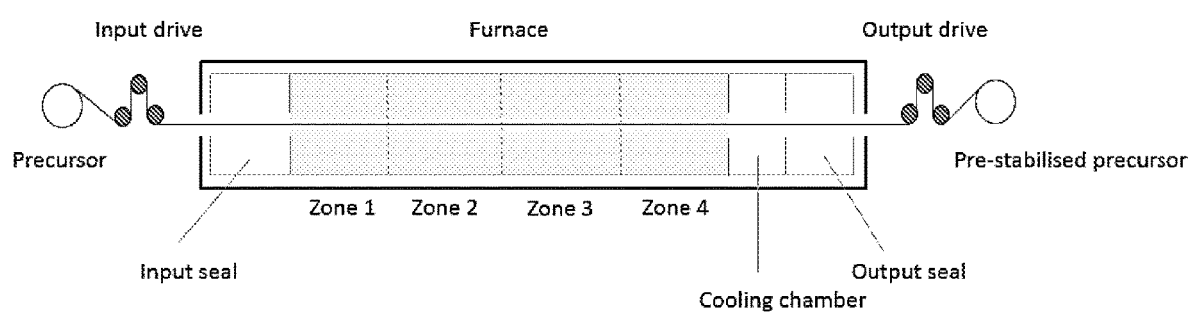
FIG. 1 shows a schematic of a pre-stabilisation process of an embodiment of one aspect of the invention performed in a furnace having one reaction chamber comprising four temperature zones operating as a pre-stabilisation reactor.

As used herein, the singular forms "a," "an," and "the" designate both the singular and the plural, unless expressly stated to designate the singular only.

The term "about" and the use of ranges in general, whether or not qualified by the term about, means that the number comprehended is not limited to the exact number set forth herein, and is intended to refer to ranges substantially within the quoted range while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

Broadly, the present invention provides processes for preparing stabilised precursors, which are useful in the manufacture of carbon-based materials, in particular, carbon fibre. Stabilisation processes described herein include a pre-stabilisation step, which forms a pre-stabilised precursor. It has been found that the inclusion of a pre-stabilisation step can help improve the efficiency of processes used to form stabilised precursors.

In particular, it has been found that a stabilisation process comprising a pre-stabilisation step as described herein enables a stabilised precursor suitable for the manufacture of carbon fibre to be formed in a rapid manner.

In one aspect, the present invention provides a process for preparing a pre-stabilised precursor, the process comprising: heating a precursor comprising polyacrylonitrile in a substantially oxygen-free atmosphere while applying a substantially constant amount of tension to the precursor to promote cyclisation of nitrile groups in the precursor, the temperature and time period in which the precursor is heated in the atmosphere and the amount of tension applied to the precursor each being selected to form a pre-stabilised precursor having at least 10% cyclised nitrile groups as determined by Fourier transform infrared (FT-IR) spectroscopy.

A pre-stabilised precursor having at least 10% cyclised nitrile groups as described herein is intended to mean a partially stabilised precursor that can be further treated in an oxygen-containing atmosphere to form a stabilised precursor. The so-formed stabilised precursor can suitably be carbonised to form a carbon-based material.

It has been found that by initiating stabilisation reactions in a substantially oxygen-free atmosphere by heating the precursor at a selected temperature in the substantially oxygen-free atmosphere for a selected period of time and as a selected substantially constant amount of tension is applied to the precursor, a pre-stabilised precursor having at least 10% cyclised nitrile groups can be formed, which is activated for subsequent reaction in an oxygen containing atmosphere. Upon exposure of the pre-stabilised precursor to the oxygen containing atmosphere, a stabilised precursor can then be readily and rapidly formed.

An important part of the present invention is that a pre-stabilised precursor having at least 10% cyclised nitrile groups is formed by heating a precursor comprising polyacrylonitrile in a substantially oxygen-free atmosphere. Without wishing to be limited by theory, it is believed that by forming at least 10% cyclised nitrile groups in the pre-stabilised precursor, downstream advantages can be conferred to oxidative precursor stabilisation as well as carbonisation of the oxidatively stabilised precursor to form carbon-based materials such as carbon fibre of acceptable quality, including high performance quality. In particular, it is believed that a pre-stabilised precursor having at least 10% cyclised nitrile groups can facilitate faster, safer, and lower cost precursor stabilisation and carbon fibre formation. It is further believed that when less than 10% nitrile group cyclisation is obtained in the pre-stabilised precursor, benefits provided by the process of the invention, such as high speed formation of a suitably stabilised precursor that can be converted into a carbon-based material such as carbon fibre, improved safety in precursor stabilisation and reduction in energy consumption, are not achieved.

Stabilised precursors described herein, which are formed in accordance with the stabilisation process of the invention, are thermally stable. By being "thermally stable" is meant that the stabilised precursor is resistant to combustion or degradation when exposed to a naked flame and can suitably be carbonised to form a carbon-based material, such as carbon fibre.

Stabilised precursors formed by the stabilisation process of the invention may also be referred to herein as "fully stabilised precursors". This compares to the pre-stabilised precursors described herein, which are partially stabilised precursors.

In one aspect, the present invention provides a process for preparing a stabilised precursor, the process comprising:
heating a precursor comprising polyacrylonitrile in a substantially oxygen-free atmosphere while applying a substantially constant amount of tension to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups as determined by Fourier transform infrared (FT-IR) spectroscopy; and
exposing the pre-stabilised precursor to an oxygen containing atmosphere to form a stabilised precursor.

A stabilised precursor suitable for the manufacture of carbon-based material such as carbon fibre can be produced with improved efficiency by subjecting a precursor to initial pre-stabilisation and forming a pre-stabilised precursor having at least 10% cyclised nitrile groups as described herein.

Processes described herein can facilitate rapid formation of a stabilised precursor and aid in accelerating the precursor stabilisation step used in carbon fibre manufacture. Moreover, processes described herein can help to reduce costs associated with the precursor stabilisation step, as well as help to improve the safety of precursor stabilisation.

Precursor

Processes of the present invention are useful for the stabilisation of precursors comprising polyacrylonitrile (PAN). A precursor comprising PAN is also referred to herein as a "polyacrylonitrile precursor" or "PAN precursor".

PAN precursors referred to herein include precursors comprising homopolymers of acrylonitrile as well as copolymers and terpolymers of acrylonitrile with one or more co-monomers.

Thus the term "polyacrylonitrile" as used herein includes homopolymers, copolymers and terpolymers formed through at least the polymerisation of acrylonitrile. Such polymers are generally linear and will have nitrile groups pendant from a carbon-based polymer backbone.

As will be discussed further below, cyclisation of the pendant nitrile groups will play an important part of the present invention.

Precursors used in the present invention may comprise polyacrylonitrile having at least about 85% by weight acrylonitrile units. In some embodiments, precursors used herein may comprise polyacrylonitrile having less than 85% by weight acrylonitrile units. Such polymers can include modacrylic polymers, generally defined as polymers comprising 35-85% by weight acrylonitrile units and typically copolymerized with vinyl chloride or vinylidene chloride.

Polyacrylonitrile (PAN) is a suitable polymer for inclusion in a precursor for producing carbon-based materials such as carbon fibre due to its physical and molecular properties and its ability to provide a high carbon yield.

In one set of embodiments, the precursor employed in the process of the invention may comprise a polyacrylonitrile homopolymer, a polyacrylonitrile copolymer, or mixtures thereof.

A person skilled in the relevant art would understand that a polyacrylonitrile homopolymer is a polymer composed of polymerised units derived only from acrylonitrile.

Polyacrylonitrile copolymers are copolymers of acrylonitrile with at least one co-monomer. Examples of co-monomers include acids such as itaconic acid and acrylic acid, ethylenically unsaturated esters such as vinyl acetate, methyl acrylate and methyl methacrylate, ethylenically unsaturated amides such as acrylamide and methacrylamide, ethylenically unsaturated halides such as vinyl chloride and sulfonic acids such a vinyl sulfonate and p-styrene sulfonate. Polyacrylonitrile copolymers may comprise from 1 to 15% by weight, or from 1 to 10% by weight, of one or more co-monomers. The precursor may comprise two or more different types of PAN copolymer.

Polyacrylonitrile in the precursor may have a molecular weight of at least 200 kDa.

Chemical mechanisms involved in stabilisation of polyacrylonitrile precursors in preparation for carbonisation are not well understood. However, it is believed that cyclisation of pendant nitrile groups on acrylonitrile units in a polyacrylonitrile polymer can play an important role in forming a sufficiently stabilised precursor that is able to withstand the high temperature conditions employed for carbonisation.

Cyclisation of pendant nitrile groups in a polyacrylonitrile polymer generate hexagonal carbon-nitrogen rings as illustrated below:

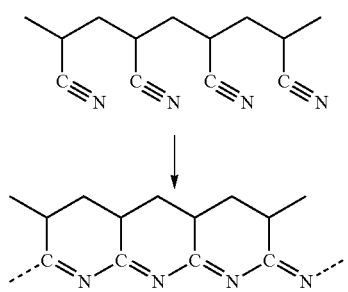

Heat and gases (such as HCN gas) are typically generated as a result of nitrile group cyclisation.

In one set of embodiments, the precursor may be a polyacrylonitrile copolymer of acrylonitrile with at least one acidic co-monomer. Examples of acidic co-monomers include acids such as itaconic acid and acrylic acid. The polyacrylonitrile copolymer may comprise from 1 to 15% by weight, or from 1 to 10% by weight, of polymerised units derived from at least one acidic co-monomer.

In some embodiments, it is preferable to utilise a precursor comprising a polyacrylonitrile copolymer of acrylonitrile with at least one acidic co-monomer as a feedstock for the stabilisation process of the invention. It is believed that polymerised units derived from an acidic co-monomer can become deprotonated, thereby catalysing nitrile group cyclisation in the precursor. Thus, the initiation of nitrile group cyclisation can occur at lower temperature. The inclusion in the polyacrylonitrile of polymerised units derived from an acidic co-monomer may also assist in controlling the exotherm generated by nitrile group cyclisation.

In a precursor comprising a polyacrylonitrile copolymer of acrylonitrile and at least one acidic co-monomer, cyclic groups formed during stabilisation of the precursor may have structures as illustrated below:

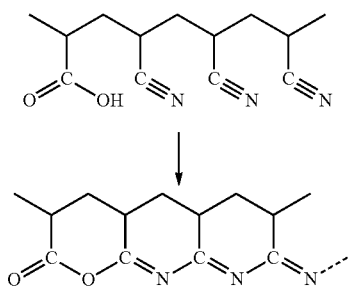

In one set of embodiments, the precursor employed in the process of the invention may comprise polyacrylonitrile mixed or blended with an additional substance.

In some embodiments, the additional substance may be a further polymer. In such embodiments, a blend or mixture preferably comprises at least 50% by weight of polyacrylonitrile (PAN). The PAN is in admixture with at least one further polymer In embodiments where the precursor comprises polyacrylonitrile blended or mixed with at least one further polymer, the weight ratio of PAN:further polymer in the precursor may be selected from 55:45, 60:40, 70:30, 80:20, 85:15, 90:10 and 95:5.

Polyacrylonitrile in a blend or mixture may be a polyacrylonitrile homopolymer or polyacrylonitrile copolymer, as described herein.

A polyacrylonitrile copolymer may comprise at least 85% by weight, or at least 90% by weight, of polymerised units derived from acrylonitrile. The remaining portion of polymerised units in the polyacrylonitrile copolymer is derived from one or more co-monomer, such as acidic co-monomers.

In some embodiments of mixtures and blends referred to herein, the further polymer may be selected from polymers known for use in the manufacture of carbon fibre manufacture. In some embodiments, the further polymer may be selected from the group consisting of petroleum pitch, thermoplastic polymers, cellulose, rayon, lignin and mixtures thereof. Thermoplastic polymers may include but are not limited to polyethylene (PE), poly(ethylene terephthalate) (PET), poly(butylene terephthalate) (PBT), polypropylene (PP), poly(vinyl chloride) (PVC), poly(vinylidene fluoride) (PVDF), polycarbonate (PC), poly(phenylene oxide) (PPO) and poly(styrene) (PS).

In some embodiments, the precursor may comprise polyacrylonitrile mixed or blended with a filler, such as a nano-filler. Exemplary nano-fillers may be carbon nanoparticles, such as carbon nanotubes or graphene nanoparticles.

In some embodiments the precursor may be surface treated. For example, the precursor may comprise an optional surface coating (i.e. sizing or spin finish). The presence of a surface treatment does not detract from the benefits of the invention.

The precursor employed in the process of the invention may be in a range of forms, including but not limited to fibre, yarn, web, film, fabric, weave, felt and mat forms. Mats may be woven or non-woven mats.

The precursor is preferably in the form of a continuous length of material, such as a continuous length of fibre. Precursor fibres may comprise bundles of filaments.

The precursor may also have different cross-sectional morphologies, including for example, round, oval, bean-shaped, dog-bone shaped, petal-shaped or other shaped cross sections. Precursors may be hollow and have one or more internal voids. Internal voids may be continuous or discontinuous.

In one set of embodiments, the precursor is in the form of a fibre, preferably a continuous fibre. A number of PAN precursor fibres are known and are commercially available. The process of the present invention may be utilised to stabilise a variety of PAN precursors, both from commercial and non-commercial sources.

The PAN precursor fibres may be provided in one or more tows, each tow having fibres comprising a multitude of continuous filaments. Tows comprising the PAN precursor may be in variety of sizes, where size is dependent upon the number of filaments per tow. For example, tows may comprise from between 100 to 1,000,000 filaments per tow. This corresponds to a tow size of from about 0.1 K to about 1,000 K. In some embodiments, tows may comprise from 100 to 320,000 filaments per tow, which corresponds to a tow size of from about 0.1 K to about 320 K.

Filaments forming a PAN precursor fibre can have a range of diameters. For example, diameters may range from between about 1 to 100 microns, about 1 to 30 microns, or 1 to 20 microns. However, the magnitude of such diameter is not critical to the process of the present invention.

Precursor Stabilisation

The stabilisation process of the invention involves two precursor treatment stages, pre-stabilisation and oxidation, to form a stabilised precursor. These two stages are discussed further below.

In one aspect the present invention provides a process for preparing a stabilised precursor, the process comprising:
- a pre-stabilisation stage comprising heating a precursor comprising polyacrylonitrile in a substantially oxygen-free atmosphere while applying a substantially constant amount of tension to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups as determined by Fourier transform infrared (FT-IR) spectroscopy; and
- an oxidation stage comprising exposing the pre-stabilised precursor to an oxygen containing atmosphere;

to form the stabilised precursor.

For convenience, in the process described below, a reference to a precursor is meant a precursor in fibre form. However, it would be appreciated that the process may be applied to other forms of precursor, such as the yarn, web and mat forms described above, and is not limited to the fibre form.

Pre-Stabilisation

In order to form a stabilised precursor, the process described herein involves a step of heating a precursor fibre in a substantially oxygen-free atmosphere while a substantially constant amount of tension is applied to the precursor. A pre-stabilised precursor fibre is thereby produced as a result of this step. This step of the precursor stabilisation process described herein may also be referred to as a "pre-stabilisation" or "pre-stabilising" step. The pre-stabilisation step therefore converts a PAN precursor into a pre-stabilised precursor.

The terms "pre-stabilisation" and "pre-stabilising" used herein in relation to a step of the stabilisation process described herein indicates that the step is a preparative step, which takes place prior to full stabilisation of the precursor in the oxidation step described below. The pre-stabilisation step may therefore be regarded as a pre-treatment step or pre-oxidation step, which subjects the precursor to a preliminary treatment prior to full stabilisation in the oxidation step. Thus the process of the invention involves a step of pre-treating the precursor to help prepare the precursor for oxidative stabilisation in the oxygen containing atmosphere discussed below. The term "pre-stabilised precursor" therefore indicates a precursor that has undergone the "pre-stabilisation" treatment described herein.

The pre-stabilisation step described herein can advantageously facilitate rapid and efficient conversion of a precursor into a stabilised precursor by enabling initial formation of a partially stabilised precursor that is activated for oxidative stabilisation. Rapid formation of a stabilised precursor can confer downstream advantages when the stabilised precursor is carbonised to form a carbon-based material such as carbon fibre, as discussed below. The downstream benefits may be particularly advantageous in a continuous process for manufacturing a material such as carbon fibre.

A substantially oxygen-free atmosphere is employed for the pre-stabilising step. The term "substantially oxygen-free atmosphere" means an atmosphere that is substantially free of oxygen atoms. The oxygen atoms may be part of an oxygen containing molecule, such as molecular oxygen (i.e. $O_2$) or water (i.e. $H_2O$), that is within the atmosphere. However, the term "substantially oxygen-free atmosphere" will permit oxygen atoms forming part of the molecular structure of a polymer in the precursor to be present.

It is preferable to limit the amount of oxygen atoms in the substantially oxygen-free atmosphere as it is believed that oxygen atoms can adversely affect the rate of nitrile group cyclisation and thus the ability to achieve a requisite quantity of cyclised nitrile groups in the pre-stabilised precursor within a selected time period.

Accordingly, it is an important part of the process that pre-stabilisation and formation of a pre-stabilised precursor comprising at least 10% cyclised nitrile groups is carried out in a substantially oxygen-free atmosphere.

It is desired that water (e.g. in the form of steam or water vapour) not be present in the substantially oxygen-free atmosphere as water can result in cooling of the atmosphere. Accordingly, more energy will need to be consumed in order to maintain the substantially oxygen-free atmosphere at a desired temperature. Thus it is preferred that the substantially oxygen-free atmosphere employed for the pre-stabilisation step is at least substantially free of water, and in one preference, does not contain water.

As discussed above, the term "substantially oxygen-free atmosphere" is also used to indicate that the atmosphere is substantially free of molecular oxygen (i.e. $O_2$), which is commonly referred to as "oxygen". Minor amounts of oxygen (i.e. $O_2$) may be present in the atmosphere to which the precursor fibre is exposed. A substantially oxygen-free atmosphere may contain not more than 1%, not more than 0.5%, not more than 0.1%, not more than 0.05%, not more than 0.01%, or not more than 0.005% by volume of oxygen ($O_2$). In some embodiments it is preferred that no oxygen be present, such that the atmosphere used during pre-stabilisation is oxygen-free.

It can be desirable to limit the amount of oxygen in the substantially oxygen-free atmosphere as the presence of oxygen may pose a fire risk at some operating temperatures employed for forming the pre-stabilised precursor.

In one set of embodiments, the substantially oxygen-free atmosphere comprises an inert gas. A suitable inert gas may be a noble gas, such as argon, helium, neon, krypton, xenon and radium. A suitable inert gas may be nitrogen. The substantially oxygen-free atmosphere may comprise a mixture of inert gases, such as a mixture of nitrogen and argon.

In one embodiment, the substantially oxygen-free atmosphere is provided by a substantially oxygen-free gas. The substantially oxygen-free gas is preferably an inert gas as described herein. In one embodiment, the substantially oxygen-free gas is nitrogen. The nitrogen may be of 99.995% purity and have a dew point lower than −30° C.

In some embodiments, the substantially oxygen-free gas may be medical grade nitrogen of at least 99.995% purity. Medical grade nitrogen is available from a number of commercial suppliers.

In one embodiment, the precursor is heated in a nitrogen atmosphere.

The heating of the precursor in the substantially oxygen-free atmosphere proceeds for a desired period of time and at a desired temperature. Additionally, a substantially constant amount of tension is applied to the precursor fibre as the precursor is heated in the substantially oxygen-free atmosphere for a desired period of time.

The temperature and time in which the precursor is heated in the substantially oxygen-free atmosphere and the amount of tension applied to the precursor during the heat treatment are each selected to facilitate nitrile group cyclisation in the precursor. The individual temperature, time and tension process conditions employed for the pre-stabilisation step are thus each set to promote the formation of a desired amount of cyclised nitrile groups in a pre-stabilised precursor.

In the pre-stabilisation step described herein, the temperature and time in which the precursor is heated in the substantially oxygen-free atmosphere and the tension applied to the precursor are each selected to promote and control nitrile group cyclisation, such that a pre-stabilised precursor comprising a desired percentage of cyclised nitrile groups is formed. In particular, the temperature and time in which the precursor is heated in the substantially oxygen-free atmosphere and the amount of tension applied to the precursor are each selected to control nitrile group cyclisation, such that a pre-stabilised precursor having at least 10% cyclised nitrile groups as determined by Fourier transform infrared (FT-IR) spectroscopy is formed.

In some embodiments, the temperature and time in which the precursor is heated in the substantially oxygen-free atmosphere and the amount of tension applied to the precursor are each selected to control nitrile group cyclisation, such that a pre-stabilised precursor having at least 15%, or at least 20%, cyclised nitrile groups as determined by Fourier transform infrared (FT-IR) spectroscopy is formed.

In other embodiments, the temperature and time in which the precursor is heated in the substantially oxygen-free atmosphere and the amount of tension applied to the precursor are each selected to control nitrile group cyclisation, such that a pre-stabilised precursor having 10% to 50%, 15% to 45%, or 20% to 30%, cyclised nitrile groups as determined by Fourier transform infrared (FT-IR) spectroscopy is formed.

Process conditions selected for the pre-stabilisation step can facilitate the formation of a pre-stabilised precursor suitable for high speed conversion to carbon fibre. That is, the temperature and time period for heating the precursor in the substantially oxygen-free atmosphere and the tension applied to the precursor are appropriately selected to enable the formation of a pre-stabilised precursor having desirable properties, which can subsequently be rapidly converted into carbon fibre.

It would be appreciated that if lower or higher temperatures are desired for heating the precursor during the pre-stabilisation step, suitable adjustments can be made to the time period for heating the precursor and/or the tension applied to the precursor in view of the selected temperature. For example, if the temperature at which the precursor is heated in the substantially oxygen-free atmosphere is increased, then the time period for heating the precursor may be decreased to compensate for the increased temperature, and vice versa.

A number of indicators can be used to guide the selection of the process conditions (i.e. heating temperature, time period and tension) used to convert a precursor into a pre-stabilised precursor. One skilled in the art would appreciate that different PAN precursor feedstocks can have different properties. Accordingly, the indicators can facilitate the selection of appropriate time, temperature and tension conditions to be used in the pre-stabilisation step for a given precursor feedstock so that a pre-stabilised precursor having desired properties is formed at the conclusion of the pre-stabilisation step. The indicators may be considered separately or in combination.

An indicator that is used to guide the selection of pre-stabilisation process conditions is the extent of nitrile group cyclisation (expressed as an extent of reaction (% EOR)). The extent of reaction (% EOR) corresponds to the percentage of cyclised nitrile groups in the pre-stabilised precursor. A skilled person would understand that nitrile group cyclisation produces a conjugated C=N double bond structure in the PAN precursor from the C—N triple bond.

The % EOR can be determined using Fourier Transform Infrared (FT-IR) spectroscopy according to methodology developed by Collins et al., Carbon, 26 (1988) 671-679. Under this methodology, the following formula can be used:

$$EOR\ (\%) = \frac{(100 \times 0.29 \times \text{Abs}(1590))}{((\text{Abs}(2242) + (0.29 \times \text{Abs}(1590)))}$$

where Abs (1590) and Abs (2242) are the absorbance of the peaks recorded at 1590 cm$^{-1}$ and 2242 cm$^{-1}$, which correspond to C=N groups and nitrile (—CN) groups, respectively. The nitrile groups (2242 cm$^{-1}$) are converted to C=N groups through cyclisation. The ratio of absorbance between peaks at 1590 cm$^{-1}$ and 2242 cm$^{-1}$ can therefore provide an indication of the proportion of nitrile groups that have undergone cyclisation.

Nitrile group cyclisation as described herein is most suitably determined by Fourier transform infrared (FT-IR) spectroscopy.

The % EOR and percentage (%) cyclised nitrile groups therefore represents the proportion of available nitrile (—CN) groups in the polyacrylonitrile in the precursor which have been converted into C=N groups through cyclisation.

The process conditions selected for the pre-stabilisation step are sufficient to form a pre-stabilised precursor having a predetermined % EOR, in particular a % EOR that is at least 10%. In some embodiments, process conditions selected for the pre-stabilisation step described herein are sufficient to form a pre-stabilised precursor having at least 15%, or at least 20%, cyclised nitrile groups.

It has been found that the quantity of cyclised nitrile groups (% EOR) in the pre-stabilised precursor can be varied through the selection of particular process parameters employed for the pre-stabilisation step. For example, in some embodiments, it has been found that the degree of nitrile group cyclisation in a precursor can be varied by applying different amounts of tension to the precursor fibre when the precursor is heated in a substantially oxygen-free atmosphere at fixed conditions of temperature and time.

The temperature and time period in which the precursor is heated in the substantially oxygen-free atmosphere can also influence nitrile group cyclisation. However, without wishing to be limited by theory, it is believed that the amount of tension applied to the precursor can exert a greater influence on the formation of cyclic structures.

In particular, it has been found that tension applied to the precursor can control the extent of nitrile group cyclisation in the precursor. This may arise as tension applied to the precursor can influence the molecular alignment of polyacrylonitrile in the precursor.

As an example, pre-stabilisation of a PAN precursor can involve heating a precursor comprising polyacrylonitrile at a predetermined temperature in a substantially oxygen-free atmosphere for a predetermined time period while applying a substantially constant amount of tension to the precursor. In such embodiments involving predetermined heating temperature and time, the amount of tension applied can influence the extent of nitrile group cyclisation in the precursor. Accordingly, when time and temperature conditions for the pre-stabilisation step are fixed, the application of different substantially constant amounts of tension to the precursor under those fixed conditions can produce different quantities of cyclised nitrile groups in the precursor. The applied tension can thus control the extent of nitrile group cyclisation, allowing a pre-stabilised precursor comprising a predetermined percentage of cyclised nitrile groups to be formed.

In particular embodiments, the % EOR can be tuned by varying the amount of tension applied to the precursor during pre-stabilisation. Thus the amount of tension applied to the precursor in the pre-stabilisation step can be controlled to ensure formation of a desired quantity of cyclised nitrile groups. In turn, this can assist in the evolution of particular chemical and structural properties in the pre-stabilised fibre.

In one set of embodiments, the amount of tension applied to the PAN precursor during pre-stabilisation is selected to form a pre-stabilised precursor having at least 10%, at least 15%, or at least 20% cyclised nitrile groups, as determined by FT-IR spectroscopy.

In one preference, the amount of tension applied to the precursor promotes the formation of a high content of cyclised nitrile structures in the pre-stabilised precursor.

A high content of cyclised nitrile groups can assist in efficient processing of the precursor for formation of a stabilised precursor.

Additionally, a high quantity of cyclised nitrile groups may assist in rapid formation of a thermally stable, partially stabilised precursor.

Theoretically there is no upper limit on the amount of cyclised nitrile groups that may be present in the pre-stabilised precursor. However, in practice, it may be desirable for the pre-stabilised precursor to have no more than about 50%, no more than about 45%, or no more than about 35%, cyclised nitrile groups.

In some embodiments, the pre-stabilised precursor may have from between about 10% to about 50%, from about 15% to about 45% cyclised nitrile groups, or from about 20% to about 30% cyclised nitrile groups, as determined by FT-IR spectroscopy.

Without wishing to be limited by theory, it is believed that the cyclisation of a portion of the nitrile groups present in a precursor can assist in preparing the precursor for subsequent stabilisation reactions in an oxygen containing environment. Thus, a benefit provided by the pre-stabilisation step is the ability to form a precursor having a desired amount of cyclised nitrile groups, which can readily undergo further reaction to form a stabilised precursor. Thus the pre-stabilisation step can allow a stabilised precursor to be formed in less time and with less energy.

The cyclisation of nitrile groups in the precursor may be initiated by heat and thereafter promoted through an increase in the molecular alignment of polyacrylonitrile within the precursor due to the applied tension. Cyclised nitrile groups can form fused hexagonal carbon-nitrogen rings in the precursor. The result is a precursor fibre that is at least partially stabilised and in which at least a portion of the PAN has been transformed into a ladder-type structure due to the cyclised nitrile groups.

The cyclisation of nitrile groups in a PAN precursor is exothermic and exothermic energy is released as nitrile groups undergo cyclisation. Exothermic behaviour can vary between different precursors. Accordingly, the heating temperature and the time period selected for heating the precursor, as well as the applied tension employed for pre-stabilisation of the precursor in the substantially oxygen-free atmosphere can be adapted for a given precursor so as to suitably pre-stabilise the precursor and manage its exothermic behaviour.

In addition to % EOR, other indicators that may also assist in the selection of appropriate process conditions for use in the pre-stabilisation step include the colour, mechanical properties (including tensile properties such as tensile strength, tensile modulus and elongation), mass density and appearance of the precursor. Each of these other indicators is further discussed below.

Virgin (untreated) PAN precursor is typically white in colour. The PAN precursor undergoes a colour change during the pre-stabilisation step, which can be visually observed. The colour evolution that occurs is believed to be chemically induced due to the formation of cyclised nitrile groups in the PAN precursor. A pre-stabilised precursor having at least 10% cyclised nitrile groups, for example, having about 20% cyclised nitrile groups, may have a colour ranging from dark yellow or orange to copper. A change in the colour of the PAN precursor may therefore assist one skilled in the art in selecting an appropriate temperature and time period for heating the precursor. However, for the purposes of production quality control, although a colour change may be observed, the value of % EOR must be measured to ensure the process is within tolerance. The temperature and time period in which the precursor is heated in the substantially oxygen-free atmosphere as well as the tension applied to the precursor may be selected to ensure that a precursor of a desired colour is achieved at the conclusion of the pre-stabilisation step. Preferably, the temperature and time period in which the precursor is heated in the substantially oxygen-free atmosphere is not so high or so long that the precursor becomes dark brown or black in colour.

Another useful indicator that can help to guide the selection of process conditions for the pre-stabilisation step is the mechanical properties of the pre-stabilised precursor, in particular, its tensile properties.

It has been found that the tensile properties of ultimate tensile strength and tensile modulus in the PAN precursor can decrease after the pre-stabilisation step. Furthermore, it has been found that elongation of the precursor can increase after the pre-stabilisation step.

In one form of the pre-stabilisation step, the temperature and time period in which the precursor is heated in the substantially oxygen-free atmosphere and the amount of tension applied to the precursor as it is heated in the atmosphere are selected so as to form a pre-stabilised precursor having an ultimate tensile strength that is lower than that of the virgin PAN precursor. In one set of embodiments, the pre-stabilised precursor produced by the pre-stabilisation step has an ultimate tensile strength that is up to 60% lower, for example from about 15% to about 60% lower, than that of the initial virgin PAN precursor.

In one form of the pre-stabilisation step, the temperature and time period in which the precursor is heated in the substantially oxygen-free atmosphere and the amount of tension applied to the precursor as it is heated in the atmosphere are selected so as to form a pre-stabilised precursor having a tensile modulus that is lower than that of the virgin PAN precursor. In one set of embodiments, the pre-stabilised precursor produced by the pre-stabilisation step has a tensile modulus that is up to 40% lower, for example from about 15% to about 40% lower, than that of the initial virgin PAN precursor.

In one form of the pre-stabilisation step, the temperature and time period in which the precursor heated in the substantially oxygen-free atmosphere and the amount of tension applied to the precursor as it is heated in the atmosphere are selected so as to form a pre-stabilised precursor having an elongation to break that is higher than that of the virgin PAN precursor. In one set of embodiments, the pre-stabilised precursor produced by the pre-stabilisation step has an elongation to break that is up to 45% higher, for example from about 15% to about 45% higher, than that of the initial virgin PAN precursor.

A further indicator to guide the selection of pre-stabilisation process conditions is the mass density of the PAN precursor. Precursor mass density can increase after treatment of the precursor in a pre-stabilisation step as described herein. In one form of the pre-stabilisation step, the temperature and time period in which the precursor heated in the substantially oxygen-free atmosphere and the amount of tension applied to the precursor as it is heated in the atmosphere are selected so as to form a pre-stabilised PAN precursor having a mass density in the range of from about 1.19 to 1.25 g/cm$^3$, for example from 1.21 to 1.24 g/cm$^3$.

As yet a further indicator, the appearance of the PAN precursor can also help to guide the selection of pre-stabilisation process conditions. PAN precursors that have been pre-stabilised are preferably substantially defect-free and have an acceptable appearance. It is considered that defects including melting of the precursor or partial tow breakage could lead to low mechanical properties (e.g. tensile properties) or even failure in a carbon material prepared with the precursor.

Process conditions for the pre-stabilisation step can be selected to ensure that the resultant pre-stabilised precursor has one or more properties selected from a colour, mechanical property (including a tensile property selected from ultimate tensile strength, tensile modulus and elongation at break), mass density and appearance within the parameters described above, in addition to having a requisite % EOR.

In one form of the pre-stabilisation step, the temperature and time period in which the precursor heated in the substantially oxygen-free atmosphere and the amount of tension applied to the precursor as it is heated in the atmosphere are each selected so as to form a pre-stabilised PAN precursor that is substantially defect-free.

The temperature and time period in which the precursor fibre is heated in the substantially oxygen-free atmosphere are sufficient to at least initiate and to promote the cyclisation of at least 10% of the available nitrile groups in the precursor and optionally, to also promote the evolution of one or more of the other indicators described above.

In one set of embodiments, the heating of the precursor fibre in the substantially oxygen-free atmosphere is performed for a relatively short period of time, more preferably in minutes. This can allow a pre-stabilised precursor to be formed rapidly.

It can be desirable to heat a precursor in a substantially oxygen-free atmosphere for a short period of time as this can help confer downstream advantages that assist in improving the efficiency of precursor stabilisation and subsequently also carbon fibre manufacture, particularly in relation to processing time. In particular, it has been found that the pre-stabilisation step described herein can assist with the high speed conversion of a PAN precursor fibre into carbon fibre as it facilitates rapid formation of a stabilised precursor fibre.

To enable the PAN precursor to be treated for a short period of time, parameters such as the temperature at which the precursor is heated as well as the amount of tension applied to the PAN precursor during the heat treatment may be selected to ensure that the desired time period for pre-stabilisation can be met.

In one set of embodiments the precursor is heated in the substantially oxygen-free atmosphere at a temperature that is sufficient to at least initiate cyclisation of a portion of the nitrile groups present in the precursor. In some embodiments, the heating of the precursor is performed at the selected temperature for a selected period of time.

Visually, nitrile group cyclisation can be indicated by a change in the colour of the precursor from white to a colour ranging from dark yellow to copper. The colour change has been observed to occur even after heating of the precursor in a substantially oxygen-free atmosphere for a short period of time.

It can be advantageous to subject the PAN precursor to a high temperature for a brief period of time when in the substantially oxygen-free atmosphere in order to trigger nitrile group cyclisation in the precursor during the pre-stabilisation step.

In some embodiments the temperature selected for heating the precursor in the substantially oxygen-free atmosphere is high enough to trigger or initiate nitrile group cyclisation in the PAN precursor, yet is not so high that the physical integrity of the precursor is compromised (e.g. the precursor fibre melts, breaks or degrades). For instance, it is desirable that the PAN precursor be heated at a temperature that is not greater than the degradation temperature of the precursor. Meanwhile, as a minimum, the PAN precursor should be heated when in the substantially oxygen-free atmosphere at a temperature that is sufficient to initiate nitrile group cyclisation in the precursor in the desired processing time period.

In some embodiments, during the pre-stabilisation step, the PAN precursor is heated in the substantially oxygen-free atmosphere at a temperature that is sufficient to initiate nitrile group cyclisation without causing degradation of the precursor.

In some embodiments, the temperature at which the precursor is heated in the substantially oxygen-free atmosphere can also influence the extent of nitrile group cyclisation, as it has been found that higher heating temperatures can promote and increase nitrile group cyclisation in the precursor.

In some embodiments it is preferable that the temperature at which the precursor is heated when in the substantially oxygen-free atmosphere is in proximity to the degradation temperature of the precursor. A high temperature in proximity of the degradation temperature of the precursor can help to ensure that a high content of cyclised nitrile groups is achieved in a short period of time.

PAN precursors are generally reported in the literature to have a degradation temperature of from about 300 to 320° C. However, a skilled person would appreciate that precursor degradation temperature may differ from reported literature values as it could be dependent on the composition of the PAN precursor.

Should one skilled in the art wish to determine the degradation temperature of a given PAN precursor, this may be ascertained using differential scanning calorimetry (DSC) under a nitrogen atmosphere. Using DSC, a sample of a given precursor may be placed in a nitrogen atmosphere and heated at rate of 10° C./minute. Changes in heat flux with temperature is then measured. Thermal degradation of the precursor can be detected by observing an exothermic transition in the DSC curve. The temperature corresponding to the peak (or maximum) of the exothermic transition is thus the degradation temperature of the precursor.

In some embodiments, the precursor is heated in the substantially oxygen-free atmosphere at a temperature that is not more than 30° C. below the precursor degradation temperature. This will be understood to mean that the precursor cannot be heated at a temperature that exceeds the degradation temperature of the precursor and furthermore, cannot be more than 30° C. below the degradation temperature. Accordingly, in such embodiments, the PAN precursor can be heated in the substantially oxygen-free atmosphere at a temperature (T) that is selected to be in a range represented by the following: $(T_D-30° C.) \leq T < T_D$, where $T_D$ is the degradation temperature (in ° C.) of the precursor.

In another set of embodiments, the precursor is heated in the substantially oxygen-free atmosphere at a maximum temperature that is at least 5° C. below the degradation temperature of the precursor, and not more than 30° C. below the degradation temperature. This will be understood to mean that the precursor is heated in the substantially oxygen-free atmosphere at a temperature (T) that is selected to be in a range represented by the following: $(T_D-30° C.) \leq T \leq (T_D-5° C.)$, where $T_D$ is the degradation temperature (in ° C.) of the precursor.

In one set of embodiments, the precursor fibre is heated in a substantially oxygen-free atmosphere at a maximum temperature that is no more than about 400° C., preferably no more than about 380° C., more preferably no more than about 320° C.

In one set of embodiments, the precursor fibre is heated in a substantially oxygen-free atmosphere at a minimum temperature that is no less than about 250° C., preferably no less than about 270° C., more preferably no less than about 280° C.

In one set of embodiments, the precursor is heated in a substantially oxygen-free atmosphere at a temperature in a range of from about 250 to 400° C., preferably in a range of from about 270 to 350° C., more preferably in a range of from about 280° C. to 320° C.

During the pre-stabilisation step the precursor may be heated under a substantially constant temperature profile or a variable temperature profile.

Under a variable temperature profile the precursor may be heated at two or more different temperatures. The two or more different temperatures are preferably within the temperature ranges described herein.

In one set of embodiments, the precursor is heated at a substantially constant temperature of approximately 300° C.

In another set of embodiments, the precursor may initially be heated at a selected temperature, then the temperature may increase as the pre-stabilisation step proceeds. As an example, the PAN precursor may initially be heated at a temperature of about 285° C., with temperature increasing to about 295° C. during the pre-stabilisation step.

Once a temperature or temperatures and heating profile for heating the precursor in the substantially oxygen-free atmosphere is selected, the temperature parameters remain fixed and are not varied. For example, in a continuous carbon material (e.g. carbon fibre) manufacturing process that incorporates the precursor stabilisation process described herein, it can be desirable for each temperature parameter selected for pre-stabilisation of the precursor as part of the stabilisation process to remain constant and fixed at a selected value for process stability and to enable stable, continuous operation. In some embodiments, it can be desirable for the temperature utilised in the pre-stabilisation step to be maintained within about 2° C., preferably within about 1° C., of a selected pre-stabilisation temperature. It is preferable to limit or avoid undesirable temperature fluctuations during the pre-stabilisation step as these can give rise to undesired changes in the precursor. For example, temperature variations can cause localised hot spots in the precursor, precursor deformation, or breakage of the precursor fibre.

Heating of the precursor during the pre-stabilisation step may occur by passing the precursor through a single temperature zone or a plurality of temperature zones.

In embodiments where heating of the precursor during the pre-stabilisation step occurs by passing the precursor through a plurality of temperature zones, the precursor may pass through 2, 3, 4, or more temperature zones. Each of the zones may be of the same temperature. Alternatively, two or more zones may be of different temperatures. For example, at least one temperature zone (e.g. first temperature zone) may be at a first temperature while at least one temperature zone (e.g. second temperature zone) is at a second temperature that is different to the first temperature. The precursor may be heated under a variable temperature profile by passing the precursor through a plurality of zones of different temperature.

In some embodiments, each temperature zone may provide a reaction zone in which a reaction facilitating nitrile group cyclisation in the precursor is performed.

The precursor may pass through a selected temperature zone once. For example, when a single temperature zone or a plurality of temperature zones is used, the precursor fibre may make a single pass through each temperature zone.

Alternatively, the precursor may pass through a selected temperature zone a plurality of times. Thus the precursor may make multiple passes through a given temperature zone.

In one set of embodiments a flow of a substantially oxygen-free gas may be used to establish a substantially oxygen-free atmosphere. The flow of substantially oxygen-free gas may be heated. The flow of heated substantially oxygen-free gas can be used to heat the precursor and to maintain the precursor at a selected temperature.

In one set of embodiments, the precursor is heated in the substantially oxygen-free atmosphere for a time period ranging from less than one minute (i.e. several seconds) to several minutes.

It is one advantage of the present invention that a short time period for the pre-stabilisation step can be achieved by adjustments to the heating temperature and the amount of tension that is applied to the precursor.

Thus the temperature for heating the precursor in the substantially oxygen-free atmosphere and the amount of tension applied to the precursor fibre as it is heated can each be selected to promote formation of at least 10%, at least 15%, or at least 20% cyclised nitrile groups in the precursor in a time period of less than 5 minutes, less than 4 minutes, less than 3 minutes, or less than 2 minutes. Thus a pre-stabilised precursor having a desired amount of cyclised nitrile groups can be formed rapidly and in a short period of time.

In one preference, the temperature for heating the precursor in the substantially oxygen-free atmosphere and the amount of tension applied to the precursor fibre as it is heated are each be selected so as to promote formation of between 10%-50%, 15%-40%, or 20%-30%, cyclised nitrile groups in the precursor in a time period of less than 5 minutes, less than 4 minutes, less than 3 minutes, or less than 2 minutes.

The present invention allows a desired amount of cyclised nitrile groups to be formed in a short period of time. Consequently, the precursor need only be heated in the substantially oxygen-free atmosphere for a short period. Thus in some embodiments, the precursor may reside in the substantially oxygen-free atmosphere for a time period of no more than about 5 minutes, no more than about 4 minutes, no more than about 3 minutes, or no more than about 2 minutes.

In some embodiments, heating of the precursor at a temperature which is in proximity of the degradation temperature of the precursor can facilitate rapid formation of a pre-stabilised precursor.

During the pre-stabilisation step, a substantially constant amount of tension is also applied to the precursor. A person skilled in the relevant art would understand that tension is a force that is applied to the precursor. In the pre-stabilisation step, the amount of tension applied to the precursor is maintained at a predetermined and substantially constant value and is not varied as the precursor is heated in the substantially oxygen-free atmosphere. As an example, a precursor fibre may be suspended between two tensioning devices, with the tensioning devices operating to ensure that the tension applied to the precursor suspended there-between is maintained at a substantially constant and predetermined value. Thus once an amount of tension is selected for a given precursor, the tension is maintained so that the precursor can be processed at a substantially constant amount of tension during the pre-stabilisation step.

It is desirable that the tension applied to the precursor does not vary during pre-stabilisation as variations in tension can indicate or promote process instability. Preferably, there is less than 5% variation in the amount of tension applied to the precursor during the pre-stabilisation step.

The amount of tension that is applied may be dependent on a number of factors, such as for example the temperature and time period in which the precursor is heated in the substantially oxygen-free atmosphere, the composition of the PAN precursor and the size of the precursor tow. The applied tension can be adapted to enable optimised results to be achieved for a specific precursor and/or tow size and/or selected pre-stabilisation process conditions of time and temperature.

It is also recognised that there may be intrinsic tension effects in the precursor due to physical and/or chemical changes that may occur in the precursor as the pre-stabilisation step proceeds. However, it is intended that the tension applied to the precursor in accordance with processes of embodiments described herein would encompass any intrinsic tension changes that may be generated in the precursor during the pre-stabilisation step. The tension applied to the precursor may make accommodation for changes in intrinsic tension of the precursor due to changes that take place in the precursor during pre-stabilisation.

In one set of embodiments, when determining the process conditions (i.e. heating temperature, time period and tension) to be used for the pre-stabilisation step it can be useful to initially ascertain a baseline tension that is sufficient to facilitate transport of the precursor at a selected speed through a reaction chamber employed to perform the pre-stabilisation step. The speed at which the precursor is transported may determine the time in which the precursor resides in the reaction chamber. Once the baseline tension and residence time period in the reaction chamber are determined, a temperature for heating the precursor may then be selected.

The temperature for heating the precursor in the pre-stabilisation step is sufficient to initiate or promote the cyclisation of a portion of the nitrile groups present in the precursor, but is not so high as to cause degradation of the precursor. As discussed above, the cyclisation of nitrile groups may be visually indicated as a change in the colour of the precursor from white to a colour ranging from dark yellow or orange to copper. Thus a change in the colour of the precursor provides an indication of when nitrile group cyclisation can be initiated and may be used as a visual cue for selecting the heating temperature.

In practice, to select a heating temperature, the precursor may be heated at a variety of different temperatures while the baseline tension applied to the precursor and residence time of the precursor in a reaction chamber each remain fixed. Changes in the colour of the precursor is then visually determined. The temperature at which an initial colour change in a precursor is observed may be regarded as the minimum temperature that can be used for pre-stabilising that precursor.

In one preference, the PAN precursor is heated when in the substantially oxygen-free atmosphere at a high temperature that is in proximity to the degradation temperature of the precursor. It is believed that use of a high heating temperature close the precursor degradation temperature can facilitate formation of a pre-stabilised precursor having at least 10% cyclised nitrile groups in a time period of less than about 5 minutes, less than about 4 minutes, less than about 3 minutes, or less than about 2 minutes. In one embodiment, the pre-stabilised precursor may have from 20% to 30% cyclised nitrile groups.

In one embodiment, the precursor is heated at a temperature that is not more than 30° C. below the degradation temperature. It has been found that when a PAN precursor is heated at a high temperature that is within 30° C. of the degradation temperature of the precursor, a colour change can occur in the precursor in a short period of time (e.g. within about 2 minutes). The colour change can be visually discerned and can be indicative of chemical changes (such as cyclisation and aromatisation reactions) occurring in the precursor.

Once the heating temperature is determined, the amount of tension applied to the precursor is then adjusted (e.g. increased) from the baseline value until a tension value that promotes the desired level of nitrile group cyclisation (% EOR) in the precursor under the selected heating temperature and time conditions is identified. As discussed above, the % EOR can be determined by FT-IR spectroscopy.

Once a tension value giving a desired % EOR in the precursor has been identified, tests may be performed on the resultant pre-stabilised precursor to ascertain whether the precursor has properties, such as tensile properties, mass density and appearance, within desired parameters. If necessary, further adjustments may be made in order to fine tune tensioning parameters so that the amount of tension applied to the precursor is sufficient to not only form a pre-stabilised precursor having a desired level of nitrile group cyclisation (% EOR), but also a desired colour, tensile properties, mass density and/or appearance.

In some embodiments, the precursor has the potential to attain a maximum quantity of cyclised nitrile groups and it can be desirable for the amount of tension applied to the PAN precursor fibre to be selected to promote formation of the maximum quantity of cyclised nitrile groups in the pre-stabilised precursor fibre. This tension may be referred to as an "optimised tension" value. Accordingly, the extent of reaction (% EOR) of nitrile groups achievable in the PAN precursor under the substantially oxygen-free atmosphere is highest at about the optimised tension value.

The optimised tension value may be determined by applying different quantities of substantially constant tension to the precursor fibre while pre-selected conditions of temperature and time in the substantially oxygen-free atmosphere remain constant. It has been found that as the amount of tension applied to a given precursor fibre increases, the degree of nitrile group cyclisation (% EOR) as measured by FT-IR spectroscopy increases until a maximum value is reached. The maximum % EOR corresponds to the highest quantity of cyclised nitrile groups produced in the precursor fibre under the pre-stabilisation conditions employed. Following the maximum value, the degree or quantity of cyclised nitrile groups decrease, even as the amount of applied tension increases. Thus a "bell-shaped" % EOR versus tension curve can be formed. The bell-shaped curve will generally comprise a peak % EOR, which would correspond to the maximum % EOR that is attainable for that given precursor. The tension value providing the highest extent of nitrile group cyclisation (i.e. the maximum % EOR) under the pre-selected temperature and time parameters is thus the optimised tension for that PAN precursor.

In some embodiments it may be desirable for the pre-stabilised precursor to have a maximum amount of cyclised nitrile groups to enable a stabilised precursor to be formed with improved efficiency.

In some embodiments of the invention, the precursor has a potential to attain a maximum amount of nitrile group cyclisation and the amount of tension applied to the precursor is selected to promote maximum nitrile group cyclisation in the precursor. In such embodiments, an optimised amount of tension may thus be applied to the precursor as the precursor is heated at a selected temperature and for a selected time period in a substantially oxygen-free atmosphere so as to form a pre-stabilised precursor having a maximum quantity of cyclised nitrile groups. The optimised tension would generate at least 10% cyclised nitrile groups in the precursor, and may and preferably will, generate more than 10% cyclised nitrile groups in the precursor.

It would be appreciated that due to the slightly differing polymer compositions of PAN precursors from different commercial suppliers, a different maximum % EOR achievable for a PAN precursor and the optimised tension that can promote maximised nitrile group cyclisation can differ for different precursors. For example, PAN precursors can differ in a range of parameters, such as composition and tow size. Accordingly, it would be understood that the optimised tension and the maximum quantity of cyclised nitrile groups attainable in a precursor can vary with different precursor feedstocks. For example, for some precursor feedstocks, a potential maximum of 40% cyclised nitrile groups may be attained, while for other precursor feedstocks, a maximum of 20% cyclised nitrile groups may only be possible.

In some embodiments, there may be an acceptable operating window for the tension parameter, such that a pre-stabilised precursor having a quantity of cyclised nitrile groups which is more than 10% but less than the maximum quantity of cyclised nitrile groups attainable for that precursor, can be formed. That is, it is possible that the pre-stabilised precursor may have an intermediate quantity of cyclised nitrile groups that varies from the maximum % EOR and which is less than the maximum % EOR but remains greater than 10%.

In some embodiments, the pre-stabilised precursor may have an optimum quantity of cyclised nitrile groups, where the optimum quantity includes the maximum quantity of cyclised nitrile groups (maximum % EOR), as well as an acceptable variation thereof.

Thus an "optimum quantity" may include the maximum % EOR that is attainable for a given precursor, which is obtained at an optimised tension, as well as acceptable sub-maximum values of % EOR obtained at applied amounts of tensions that are above or below the optimised tension. In the context of a % EOR versus tension curve, an "optimum quantity" of cyclised nitrile groups is a quantity within an acceptable operating window bounded by a region surrounding the maximum % EOR in a % EOR versus tension curve and which encompasses acceptable values of % EOR below the maximum % EOR.

While being at less than maximum, an optimum quantity of cyclised nitrile groups may nevertheless still be beneficial in facilitating efficient formation of a pre-stabilised and stabilised precursor.

The amount of variation from the maximum % EOR that qualifies as an optimum quantity of cyclised nitrile groups and which is deemed acceptable for efficient precursor processing may depend on the precursor and the value of the maximum % EOR. A skilled person would appreciate that larger variations from the maximum % EOR may be acceptable where higher values of maximum % EOR can be attained in a precursor, whereas smaller variations from the maximum % EOR may only be acceptable when smaller values of maximum % EOR are only attainable.

In some embodiments, for a precursor that has a potential to attain a maximum amount of cyclised nitrile groups, the amount of tension applied to the precursor is selected to promote up to 80% less than the maximum attainable nitrile group cyclisation in the pre-stabilised precursor. In some embodiments, the amount of tension applied to the precursor can be selected to promote up to 70% less, up to 60% less, up to 50% less, up to 40% less, up to 30% less, or up to 20% less than the maximum attainable nitrile group cyclisation in the pre-stabilised precursor. Each of the afore-mentioned ranges may independently represent a window within which an optimum quantity of cyclised nitrile groups can be formed in a given precursor.

In one illustrative example, where the maximum amount of cyclised nitrile groups that can be achieved in a precursor is 50%, the tension applied to that precursor may be selected so as to form a pre-stabilised precursor having an amount of cyclised nitrile groups that is in a range from between 10% to 50%. Accordingly, in this example, there may be an acceptable operating range in % EOR of up to 40%. Furthermore, in this example, the amount of 10% represents the minimum quantity of cyclised nitrile that is acceptable for the pre-stabilised precursor in accordance with the invention. This value of 10% also represents an amount that is about 80% of the maximum attainable nitrile group cyclisation (i.e. 80% of 50%). An amount of cyclised nitrile groups representing an optimum quantity may thus be selected from those within the range of from 10-50% and a tension promoting a quantity of cyclised nitrile groups in this % EOR range may be selected in some embodiments.

In another illustrative example, where the maximum amount of cyclised nitrile groups that can be achieved in a precursor is 30%, the tension applied to that precursor may be selected so as to form a pre-stabilised precursor having an amount of cyclised nitrile groups that is in a range from between 10% to 30%. Accordingly, in this example, there may be an acceptable operating range in % EOR of up to 20%. The minimum value of 10% cyclised nitrile groups therefore represents an amount that is at about 67% of the maximum attainable nitrile group cyclisation (i.e. 67% of 30%). Similar to the above illustrative example, an amount of cyclised nitrile groups representing an optimum quantity may thus be selected from those within the range of from 10-30% and a tension promoting a quantity of cyclised nitrile groups within this % EOR range may be selected in some embodiments.

In yet another illustrative example, where the maximum amount of cyclised nitrile groups that can be achieved in a precursor is 20%, 80% less than the maximum attainable nitrile group cyclisation represents 4% cyclised nitrile groups. However, it would be appreciated that the value of 4% is below the minimum threshold of at least 10% cyclised nitrile groups required for the pre-stabilised precursor in accordance with the invention. In such circumstances, the acceptable operating window would therefore be restricted by the lower threshold of 10% cyclised nitrile groups, such that the tension that is applied to that precursor may only be selected from those that form an amount of cyclised nitrile groups in a range from between 10% to 20%. Thus in this example, an operating window providing only up to 50% of the maximum attainable nitrile group cyclisation (i.e. 50% of 20%) is acceptable. Thus an amount of cyclised nitrile groups in the range of from 10-20% can represent an optimum amount of cyclised nitrile groups and a tension promoting a quantity of cyclised nitrile groups within this % EOR range may be selected in some embodiments.

In some embodiments, the pre-stabilised precursor may have at least 15% or at least 20%, cyclised nitrile groups as a lower threshold (or minimum) quantity of cyclised nitrile groups. In such embodiments, the amount of acceptable variation from the maximum % EOR may be within a smaller window. For example, where the maximum amount of cyclised nitrile groups that can be achieved in a precursor is 50% and a minimum (or lower threshold) of 15% nitrile group cyclisation is required in the formed pre-stabilised precursor, the tension applied to that precursor may be selected so as to form an amount of cyclised nitrile groups that is in a range from between 15% to 50%. Accordingly, in this example, there may be an acceptable operating range in % EOR of up to 35%. Thus the minimum extent of nitrile cyclisation of 15% represents an amount that is at about 70% of maximum nitrile group cyclisation (i.e. 70% of 50%).

Maximum and optimum amounts of cyclised nitrile groups can each be determined using Fourier transform infrared (FT-IR) spectroscopy as described herein.

In embodiments where a desired amount of cyclised nitrile groups, which is greater than 10% but less than the potential maximum amount of cyclised nitrile groups attainable in a precursor is desired in the pre-stabilised precursor, the amount of tension that is applied to the precursor can vary from the optimised tension value for that precursor in order to promote formation of the desired quantity of cyclised groups. A variation from optimised tension may be a tension value that is above or below the optimised tension value which promotes maximum nitrile group cyclisation.

In one set of embodiments, an amount of tension varying by up to 20% from the optimised tension can be applied to the precursor when it is heated in a substantially oxygen-free atmosphere at a selected temperature and for a selected time period, to form a pre-stabilised precursor having at least 10% cyclised nitrile groups. In other embodiments, an amount of tension varying by up to 15%, or by up to 10%, from the optimised tension can be applied to the precursor to form a pre-stabilised precursor having at least 10% cyclised nitrile groups.

One or more embodiments of a precursor stabilisation process described herein may further comprise a step of determining a tension parameter for a precursor prior to forming the pre-stabilised precursor, wherein determining the tension parameter for the precursor comprises:
  (a) selecting a temperature and time period for heating a precursor in a substantially oxygen-free atmosphere;
  (b) applying a range of different substantially constant amounts of tension to the precursor while heating the precursor in the substantially oxygen-free atmosphere at the selected temperature and for the selected time period;
  (c) determining by Fourier transform infrared (FT-IR) spectroscopy the amount of cyclised nitrile groups formed in the precursor for each substantially constant amount of tension applied to the precursor;
  (d) calculating a trend of extent of nitrile group cyclisation (% EOR) versus tension,
  (e) identifying from the calculated trend the amounts of tension providing at least 10% nitrile group cyclisation and maximum nitrile group cyclisation; and
  (f) selecting an amount of tension giving rise to at least 10% nitrile group cyclisation to pre-stabilise the precursor.

Determination of a tension parameter is ideally performed for a precursor prior to carrying the stabilisation process of the invention in relation to that precursor. Suitably, the determination of the tension parameter will be performed prior to forming a pre-stabilised precursor from that precursor.

The determination of the tension parameter will facilitate the identification and selection of an appropriate amount of tension to promote a desired extent of nitrile group cyclisation in a given precursor under selected temperature and time period conditions. This can enable a pre-stabilised precursor having a desired amount of cyclised nitrile groups to be formed when the precursor is heated in a substantially oxygen-free atmosphere under the selected temperature and time period as part of the stabilisation process.

The determination of a tension parameter can facilitate identification of an amount of tension that can promote formation of (i) of at least 10% cyclised nitrile groups in a given precursor, (ii) the maximum attainable amount of cyclised nitrile groups in the precursor, and (iii) intermediate quantities of cyclised nitrile groups that occur in between 10% and the maximum amount attainable, in a precursor when the precursor is heated in a substantially oxygen-free atmosphere under selected temperature and time parameters. Thus the above tension parameter determination steps may be employed to assist in screening for an amount of tension that will achieve a desired extent of nitrile group cyclisation (% EOR) in a pre-stabilised precursor that is to be generated from the precursor being assessed.

Determination of a tension parameter for a precursor involves applying a range of different substantially constant amounts of tension to the precursor as it is heated in the substantially oxygen-free atmosphere at the selected temperature and for the selected time period. Accordingly, the temperature and time period for heating the precursor each remain fixed at the selected value during this assessment.

Determination of the tension parameter involves the application of different amounts of substantially constant tension to the precursor fibre while the selected conditions of temperature and time for heating the precursor in the substantially oxygen-free atmosphere each remain fixed at the selected values. In practice, it is useful to apply an initial tension to the precursor, which may be a baseline tension. As discussed above, a baseline tension is one that is sufficient to facilitate transport of the precursor through a pre-stabilisation reactor. The amount of tension applied to the precursor can then be incrementally increased from the initial tension value. The amount of cyclised nitrile groups (% EOR) formed in the precursor as a range of different substantially constant amounts of tension are applied to the precursor is then determined by FT-IR spectroscopy.

Once data relating to the amounts of cyclised nitrile groups (% EOR) formed at different applied amounts of tension is obtained, a trend of extent of nitrile group cyclisation (% EOR) versus tension may then be calculated. In some embodiments, calculation of a trend of extent of nitrile group cyclisation (% EOR) versus tension can involve generation of a graph illustrating a % EOR versus tension curve.

From the calculated trend of extent of nitrile group cyclisation (% EOR) versus tension, it is then possible to identify the amounts of tension that promote (i) at least 10% nitrile group cyclisation, (ii) maximum nitrile group cyclisation, and (iii) intermediate quantities of nitrile cyclisation in between 10% and the maximum attainable, in the precursor. For example, from the calculated trend it is possible to identify an amount of tension that promotes formation of from 20% to 30% cyclised nitrile groups in the precursor.

Once an amount of tension that gives rise to, or promotes formation of, a desired, selected % EOR in the precursor under a selected temperature and time period been identified from the calculated trend, that amount of tension may be selected for use in pre-stabilisation of the precursor.

In general, an amount of tension promoting at least 10% nitrile group cyclisation is selected to pre-stabilise the precursor in the pre-stabilisation step described herein.

In some embodiments, an amount of tension promoting from 10% to 50%, from 15% to 45%, or from 20% to 30%, nitrile group cyclisation is selected to pre-stabilise the precursor in the pre-stabilisation step described herein.

In yet other embodiments, an amount of tension promoting up to 80%, up to 70%, up to 60%, up to 50%, up to 40%, up to 30%, or up to 20% less than the maximum nitrile group cyclisation attainable in the precursor is selected to pre-stabilise the precursor in the pre-stabilisation step described herein.

In other embodiments, an amount of tension promoting maximum nitrile cyclisation is selected to pre-stabilise the precursor in the pre-stabilisation step described herein.

One skilled in the art would appreciate that in addition to the selected tension parameter (which has been determined in accordance with the steps above) being employed in the pre-stabilisation step, the temperature and time period utilised when determining the tension parameter would also be employed for pre-stabilisation of the precursor. This is because a desired tension parameter for suitably forming a pre-stabilised precursor having a requisite quantity of cyclised nitrile groups can vary if different temperature and/or time period conditions are used for pre-stabilisation of a given precursor.

In one set of embodiments, pre-stabilisation of a PAN precursor involves heating a precursor comprising polyacrylonitrile in a substantially oxygen-free atmosphere for a time period of no more than 5 minutes while applying a substantially constant amount of tension to the precursor, the temperature at which the precursor is heated in the substantially oxygen-free atmosphere and the amount of tension applied to the precursor being sufficient to form a pre-stabilised precursor comprising at least 10% cyclised nitrile groups as determined by Fourier transform infrared (FT-IR) spectroscopy.

As discussed above, tension applied to the precursor can control the extent of nitrile group cyclisation in the precursor and thus enable a desired quantity of cyclised nitrile groups to be achieved. In some embodiments of the pre-stabilisation process described herein, the tension applied to the precursor is sufficient to form a pre-stabilised precursor having at least 15% and preferably from between 20-30% cyclised nitrile groups as determined by FT-IR spectroscopy.

In one set of embodiments, during the pre-stabilisation step the precursor is heated in a substantially oxygen-free atmosphere at a predetermined temperature for a predetermined time period while a substantially constant amount of tension is applied to the precursor, the amount of tension being sufficient to form a pre-stabilised precursor having at least 10% cyclised nitrile groups as determined by FT-IR spectroscopy. A skilled person would appreciate that the value of 10% represents the minimum amount of cyclised nitrile groups in the pre-stabilised precursor and that higher amounts of cyclised nitrile groups may be formed in the pre-stabilised precursor. For example, the pre-stabilised precursor may have from 20-30% cyclised nitrile groups.

In a particular set of embodiments, pre-stabilisation of a PAN precursor involves heating a precursor comprising polyacrylonitrile at a temperature in a range of from about 250° C. to 400° C. in a substantially oxygen-free atmosphere for a time period of no more than 5 minutes while applying a substantially constant amount of tension to the precursor, the amount of tension being sufficient to form a pre-stabilised precursor having at least 10% cyclised nitrile groups as determined by Fourier transform infrared (FT-IR) spectroscopy.

In some embodiments, the pre-stabilised precursor may have from 10-50%, from 15-40%, or from 20-30% cyclised nitrile groups, as determined by FT-IR spectroscopy.

The desired quantity of cyclised nitrile groups is formed during the residence time of the precursor in the substantially oxygen-free atmosphere. Thus, the desired amount of cyclised nitrile groups can be formed in a time period selected from less than 5 minutes, less than 4 minutes, less 3 minutes, or less than 2 minutes.

In some embodiments, the precursor comprising polyacrylonitrile is heated in the substantially oxygen-free atmosphere for a time period no more than 4 minutes, no more than 3 minutes, or no more than 2 minutes.

In some embodiments, the precursor comprising polyacrylonitrile is heated in the substantially oxygen-free atmosphere at a temperature in a range of from about 280° C. to 320° C.

In some embodiments the amount of tension applied to the precursor is sufficient to form a pre-stabilised precursor having at least 15%, or at least 20%, cyclised nitrile groups. The extent of nitrile group cyclisation is determined by Fourier transform infrared (FT-IR) spectroscopy as described herein. It has been found that in some embodiments an insufficient extent of cyclisation can occur if insufficient tension is applied to the precursor.

In some embodiments, the amount of tension applied to the precursor is sufficient to form a pre-stabilised precursor having from between about 10% to about 50%, preferably from about 10% to about 45%, and most preferably from about 20% to about 30%, cyclised nitrile groups as determined by FT-IR spectroscopy.

An optimised quantity of cyclised nitrile groups in the pre-stabilised precursor may fall within the above ranges. In some embodiments, the maximum quantity of cyclised nitrile groups (maximum % EOR) attainable in the pre-stabilised precursor may be within the above ranges.

For a selected PAN precursor fibre and selected heating time and temperature conditions for the pre-stabilisation step, the amount of tension applied to the precursor fibre should be such that the precursor fibre is not in a slack state. For practical considerations, the tension applied to the precursor will be sufficient to facilitate transport of the fibre through a reaction chamber used to perform the pre-stabilisation step whilst also avoiding contact with an internal surface of the chamber. However, the applied tension also should not be so high that the precursor fibre breaks under the applied tension.

In one set of embodiments, the amount of tension applied to the PAN precursor is in a range of from about 50 cN to about 50,000 cN, depending on tow size. In some embodiments, the amount of tension applied to the PAN precursor can be in a range of from about 50 cN to about 10,000 cN. For example, in some embodiments, a tension of up to 6,000 cN may be applied. In some embodiments, a tension of up to 4,000 cN may be applied.

In some embodiments the tension applied to the PAN precursor is not sufficient to alter the dimensions (e.g. the shape or length) of the precursor to a significant extent. For example, upon tension being applied to the PAN precursor, at least one dimension of the precursor does not change by more than 10%.

Once a tension suitable for promoting a desired amount of nitrile group cyclisation in a given precursor is selected, the tension applied to the precursor remains substantially constant and fixed. Controls may be utilised to ensure that the tension is maintained within acceptable limits from the selected value, such that the precursor is processed at a substantially constant tension. This can be important to ensure tension is maintained to ensure stable precursor processing, which can facilitate continuous operation of the precursor stabilisation process and ensure consistent quality in the pre-stabilised precursor, stabilised precursor and subsequently, also in the carbon fibre In one set of embodiments the amount of tension applied to the PAN precursor during the pre-stabilisation step is selected to maximise the extent of nitrile group cyclisation in the precursor.

In one set of embodiments, during the pre-stabilisation step the precursor is heated in a substantially oxygen-free atmosphere at a predetermined temperature for a predetermined time period while a substantially constant amount of tension is applied to the precursor, the tension being sufficient to form a pre-stabilised precursor having a maximum extent of nitrile group cyclisation (max % EOR) as determined by FT-IR spectroscopy.

In particular embodiments, the predetermined time period in which the precursor is heated obtain a maximum extent of nitrile cyclisation (max % EOR) may be selected from no more than about 5 minutes, no more than about 4 minutes, no more than about 3 minutes or no more than about 2 minutes.

In particular embodiments, the predetermined temperature in which the precursor is heated to obtain a maximum extent of nitrile cyclisation (max % EOR) may be in a range of from about 250° C. to 400° C., or from about 280° C. to 320° C.

In particular embodiments, the tension applied to the precursor to obtain a maximum extent of nitrile cyclisation (max % EOR) may be in the range of from about 50 cN to about 50,000 cN, or in the range of from about 50 cN to about 10,000 cN.

The amount of tension applied during pre-stabilisation can facilitate rapid formation of the requisite quantity of cyclised nitrile groups in the PAN precursor.

In some embodiments it may beneficial to apply the optimised tension value to the precursor for an economical process for producing carbon material such as carbon fibre.

In some embodiments the tension applied to the precursor during the pre-stabilisation step is such that elongation spread (standard deviation) as determined by the Favimat (single filament tester) is as low as possible. A small standard deviation and thus a small elongation spread can help to determine whether the precursor fibres are being processed homogeneously. In one preference, the tension applied is such that the elongation spread for the pre-stabilisation step is as close possible to that of untreated (virgin) PAN precursor.

In some embodiments, the tension applied to the precursor is insufficient to cause stretching of the precursor, which can result in an increase in precursor length following the pre-stabilisation step.

In particular embodiments, it can be preferable for the amount of tension applied to the precursor to be controlled so as to form a pre-stabilised precursor having a stretch ratio of 0% or less. A 0% stretch ratio may be achieved by operating process equipment in a manner that ensures the precursor is not stretched.

In another set of embodiments, during the pre-stabilisation step the precursor is heated in a substantially oxygen-free atmosphere at a predetermined temperature for a predetermined time period while a substantially constant amount of tension is applied to the precursor, the amount of tension applied to the precursor being sufficient so as to form a pre-stabilised precursor comprising an optimised quantity of cyclised nitrile groups as determined by FT-IR spectroscopy.

In a particular embodiment, pre-stabilisation of a PAN precursor involves heating a precursor comprising polyacrylonitrile at a temperature in a range of from about 250° C. to 400° C. in a substantially oxygen-free atmosphere for a time period of no more than 5 minutes while applying a substantially constant amount of tension to the precursor, the amount of tension being selected to form a pre-stabilised precursor comprising an optimised quantity of cyclised nitrile groups as determined by Fourier transform infrared (FT-IR) spectroscopy.

As discussed herein, an optimised quantity of cyclised nitrile groups may be an amount that is up to 80%, up to 70%, up to 60, up to 50%, up to 40%, up to 30%, or up to 20% below the maximum quantity of cyclised nitrile groups that is attainable in the precursor.

In particular embodiments, the predetermined time period in which the precursor is heated to obtain an optimised quantity of nitrile group cyclisation may be selected from no more than about 5 minutes, no more than about 4 minutes, no more than about 3 minutes or no more than about 2 minutes.

In particular embodiments, the predetermined temperature in which the precursor is heated to obtain an optimised quantity of nitrile group cyclisation may be in a range of from about 250° C. to 400° C., or from about 280° C. to 320° C.

In particular embodiments, the tension applied to the precursor to obtain an optimised quantity of nitrile group cyclisation may be in the range of from about 50 cN to about 50,000 cN, or in the range of from about 50 cN to about 10,000 cN.

Pre-stabilisation treatment of a PAN precursor in accordance with processes described herein may be performed in a variety of different apparatus.

In one set of embodiments, the pre-stabilisation step is performed in a reactor adapted to heat the precursor contained therein in a substantially oxygen-free atmosphere. The PAN precursor is conveyed through the reactor during the pre-stabilisation step. A reactor adapted for pre-stabilising the precursor may also be referred to herein as a "pre-stabilisation reactor".

The pre-stabilisation reactor may comprise a reaction chamber adapted to pre-stabilise the precursor in a substantially oxygen-free atmosphere as the precursor is passed through the reaction chamber under a predetermined amount of tension, an inlet for allowing the precursor to enter the reaction chamber, an outlet for allowing the precursor to exit the reaction chamber, and a gas delivery system for delivering a flow of a substantially oxygen-free gas to the reaction chamber. The precursor fibre may make a single pass or multiple passes through a reaction chamber. In some embodiments, the pre-stabilisation reactor may also comprise a cooling zone adapted to remove heat from the pre-stabilised precursor before it exits the reactor.

An example of a pre-stabilisation reactor may be a furnace or oven that is adapted to contain a substantially oxygen-free atmosphere.

Another example of a reactor that can be used for pre-stabilising the precursor is described in Australian provisional patent application no 2016904219 and the co-pending International patent application claiming priority from Australian provisional patent application no 2016904219.

A pre-stabilisation reactor may comprise a single reaction chamber or a plurality of reaction chambers. Where the reactor comprises a plurality of reaction chambers, each chamber may be at the same temperature or two or more of the chambers may be at different temperatures. Each reaction chamber may provide a temperature zone in which the PAN precursor is heated.

In one preference, a pre-stabilisation reactor may comprise a single reaction chamber. The single reaction chamber may be adapted to provide a plurality of temperature zone for pre-stabilising the precursor.

Where a pre-stabilisation reactor comprises a plurality of temperature zones (which may be in a single reaction chamber or in a plurality of reaction chambers), each temperature zone is preferably within the pre-stabilisation temperature ranges described herein.

Where the precursor makes multiple passes through a pre-stabilisation reactor, the pre-stabilisation step may be performed in multiple stages. Each pass may represent a stage of the pre-stabilisation step. The pre-stabilisation step may be interrupted between each stage.

In some embodiments, where pre-stabilisation is conducted in multiple stages, it is contemplated that the precursor may be briefly exposed to an atmosphere between stages. The atmosphere may be a substantially oxygen-free atmosphere, such as a nitrogen atmosphere, or alternatively, it may be an oxygen containing atmosphere, such as ambient air.

When the precursor is exposed to an oxygen-containing atmosphere in between stages of the pre-stabilisation step, it is desirable that such exposure be as short as possible (for example, in the order of seconds), such that no substantial chemical change or visual change (e.g. colour change) occurs or is discerned in the precursor between the pre-stabilisation stages.

It is also contemplated that the precursor may be cooled in between stages of the pre-stabilisation step. This may desirable in order to limit reaction of the precursor with oxygen in the surrounding atmosphere should the precursor be briefly exposed to an oxygen containing atmosphere, such as ambient air, as the precursor makes multiple passes through a pre-stabilisation reactor.

A flow of a substantially oxygen-free gas may be used to establish a substantially oxygen-free atmosphere in a reaction chamber of the pre-stabilisation reactor. In an embodiment the flow of substantially oxygen-free gas may be sufficient to inhibit the ingress of oxygen into the reaction chamber. A flow of substantially oxygen-free gas may further assist in dissipating exothermic energy released as nitrile groups in the PAN precursor undergo cyclisation during the pre-stabilisation step.

In one preference, the substantially oxygen-free gas is an inert gas. The substantially oxygen-free gas may comprise nitrogen or a noble gas, such as argon, helium, neon, krypton, xenon and radium, or mixtures thereof.

It is preferable that the substantially-oxygen free gas be as dry as possible and be substantially free of water.

In some embodiments, the substantially oxygen-free gas may be a heated gas. A heated gas may be used to establish a substantially oxygen-free atmosphere of a desired temperature in the pre-stabilisation reactor. The heated gas may thus facilitate heating of the PAN precursor at a selected temperature when in the pre-stabilisation reactor. The use of a pre-heated gas may advantageously help to lower the overall energy consumption of the precursor stabilisation and carbon fibre manufacture processes described herein as energy would not be required to bring a cool gas up to a desired temperature in the reactor. Additionally, there may also be lower gas consumption when a heated gas is used due to gas expansion.

One skilled in the art would appreciate that a pre-stabilisation reactor would have a defined length, which might in part depend on the number and configuration of reaction chambers in the reactor. The precursor may make a single pass or multiple passes through each reaction chamber in the reactor, at a predetermined speed. The length of the reactor, the precursor flow path through each reaction chamber in the reactor, and the speed at which the precursor is conveyed through reaction chambers in the reactor can each influence the total dwell time of the precursor in the reactor. In turn, the dwell time can determine the time period in which the pre-stabilisation step is performed.

Additionally, the residence time of the PAN precursor in a reaction chamber can be affected by the temperature within a given reaction chamber and vice versa. For example, in embodiments where a higher temperature is used for pre-stabilisation, it may be desirable to shorten the residence time in the reaction chamber compared to embodiments where a lower temperature is used.

In one set of embodiments, the dwell time of the precursor in the reactor is no more than about 5 minutes, no more than about 4 minutes, no more than about 3 minutes or no more than about 2 minutes.

For a given reactor, the temperature of the one or more reaction chambers in the reactor as well as the speed at which the precursor is conveyed through each chamber and the flow path of the precursor through each chamber can be adjusted in order to achieve a desired dwell time.

In some embodiments, the speed at which the precursor is conveyed through a pre-stabilisation reactor is selected to match a line speed used in a carbon fibre production line. This can allow the pre-stabilisation step to be incorporated as a step within an existing carbon fibre manufacturing process. In particular embodiments, the precursor may be conveyed through a pre-stabilisation reactor at a speed in a range of from about 10 to 1,000 metres/hour (m/h).

In one form, subject to being able to apply a desired amount of tension, a high speed may be preferred to assist with rapid processing of the precursor. For instance, it can be preferable for the precursor to have a residence time in the pre-stabilisation reactor that is as short as possible.

Once a pre-stabilisation time period (e.g. dwell time in the pre-stabilisation reactor) has been selected, the temperature at which the precursor is heated during the pre-stabilisation step may then be selected to allow the pre-stabilisation step to be completed within that selected period of time. An example of a procedure for determining the heating temperature is described above.

In some particular embodiments, during the pre-stabilisation step, the precursor is heated in a substantially oxygen-free atmosphere at a temperature that is sufficient to initiate nitrile group cyclisation in the precursor without degrading the precursor. In one preference, the temperature at which the precursor is heated when in the substantially oxygen-free atmosphere is sufficient to promote nitrile group cyclisation of at least 10%.

In one set of embodiments, the precursor is heated in the substantially oxygen-free atmosphere at a temperature in a range of from about 250° C. to 400° C., or from about 280° C. to 320° C. In some embodiments, the precursor is heated in a substantially oxygen-free atmosphere at a temperature in a range selected from the group consisting of: 250 to 400° C., from about 260° C. to 380° C., from about 280° C. to 320° C., and from about 290° C. to 310° C., during the pre-stabilisation step. Heating at a temperature within such ranges may occur for a time period selected from the group consisting of no more than about 5 minutes, no more than about 4 minutes, no more than about 3 minutes or no more than about 2 minutes.

The above-mentioned temperatures can represent environmental temperatures within the or each reaction chamber of the pre-stabilisation reactor. The environmental temperature may be measured by a thermocouple or other appropriate temperature measurement device. The environmental temperature within each reaction chamber of the pre-stabilisation reactor is preferably maintained substantially constant during the pre-stabilisation step.

The pre-stabilisation reactor may comprise one or more heating elements to facilitate heating of the precursor at a desired temperature. In some embodiments, the heating elements may heat a reaction chamber that is adapted to pre-stabilise the precursor. The heating elements can heat a flow of substantially oxygen-free gas that is delivered to the reaction chamber.

In some embodiments, the temperature within each temperature zone employed for pre-stabilising a precursor is preferably maintained to be within 3° C. of a selected temperature value. One or more reaction chambers in a pre-stabilisation reactor may provide one or more temperature zones for pre-stabilising a precursor. In one set of embodiments, where a flow of heated substantially oxygen-free gas is used to provide a substantially oxygen-free atmosphere in the pre-stabilisation reactor, the temperature of the heated gas as it enters the reactor may be controlled so that the temperature of any one temperature zone varies no more than ±2° C., preferably no more than ±1° C., from a desired temperature, so as to enable the reactor temperature to be maintained.

During pre-stabilisation, exothermic energy is released as nitrile groups in the PAN precursor undergo cyclisation. If unmanaged, the amount of exothermic energy released can cause the temperature of the precursor to increase significantly, damaging the precursor and posing a fire risk. To avoid exothermic runaway, the temperature and flow rate of a heated substantially oxygen-free gas can be selected to maintain the temperature of the precursor within acceptable limits. A skilled person would appreciate that when the released exothermic energy results in the precursor reaching a temperature that is higher than the reactor environmental temperature, then the flow of substantially oxygen-free gas may act to cool and control the temperature of the precursor to the desired reactor temperature.

In some embodiments, the gas flow rate will be such that the temperature measured adjacent to the precursor is within 40° C. of the temperature of the substantially oxygen-free gas, preferably within 30° C. of the temperature of the gas. As used herein, "adjacent the precursor" means within 10 mm of the precursor, preferably within 3 mm of the precursor, more preferably within 1 mm of the precursor. In some embodiments, the gas flow rate may be such that the actual precursor temperature is within 50° C. of the temperature of the gas, preferably within 40° C. of the temperature of the gas, more preferably within 30° C. of the temperature of the gas.

The flow rate of the gas may be high enough that there is localised turbulent gas flow around the precursor. This localised turbulent flow in the vicinity of the precursor can induce some fibre agitation and shaking that facilitates effective removal of the reaction by-products, as well as aiding in the management of the exothermic behaviour of the precursor. Agitation of the precursor fibres in the gas flow can facilitate heat transfer from the precursor to the flow of gas so as to ensure that the temperature of the fibre remains within an acceptable limit. However, the flow rate of the gas will be controlled so that it is not too high as this could cause excessive agitation of the precursor, leading to precursor damage, including breakage.

As discussed above, a substantially constant amount of tension is also applied to the precursor during the pre-stabilisation step. The desired amount of tension may be applied by tensioning devices located upstream and downstream of each reaction chamber employed for pre-stabilising the precursor. The precursor is suspended between the tensioning devices, which are adapted to pass the precursor through each reaction chamber under a predetermined amount of tension.

In some embodiments, tensioning devices are material handling devices such as those known in the art and are separate components from the pre-stabilisation reaction chamber. Examples of material handling devices include drive rollers.

In some embodiments, the reactor will comprise one or more of the tensioning devices. In embodiments where the pre-stabilisation reactor comprises two or more reaction chambers, tensioning devices may be provided upstream and downstream of each reaction chamber so that the precursor is conveyed via a tensioning device as it passes from one reaction chamber to the next.

Tensioning devices may be controlled by a tension controller in order to enable a substantially constant amount of tension to be applied to the PAN precursor. The amount of tension applied may be monitored by the use of a tensiometer or electric load cells, such as piezoelectric load cells. The tensioning devices may be controlled to maintain the tension applied to the precursor at a substantially constant value during pre-stabilisation. Fluctuations in tension can indicate process instability, which may require an adjustment in a pre-stabilisation process parameter, such as temperature.

For example, drive roller systems can allow a precursor fibre to be carried through the pre-stabilisation step. The speed at which the drive roller systems operate can assist to set the tension used in the pre-stabilisation step. Load cells can be used to help to monitor any fluctuations the tension applied to the precursor and to provide feedback to help control the tension. Load cells may also be programmed to control the tension though an automated system. Preferably, drive roller systems employed for conveying a precursor are able to maintain tension within 5% of a selected value.

The tension of the precursor may be affected by a number of factors, including the relative temperature and humidity of the precursor prior to entry to the reactor, the catenary effect, which is affected by the distance between material handling devices (e.g. rollers), the degree of shrinkage experienced by the precursor due to chemical changes occurring in the precursor and other intrinsic material property changes that occur as the precursor is pre-stabilised.

In some embodiments, in order to apply a substantially constant amount of tension to the precursor, the draw ratio applied by the tensioning devices will be adjusted as necessary. Accordingly, in practice, for the same precursor at a given temperature and residence time in the pre-stabilisation reactor, the draw ratio applied by the tensioning devices may be varied or adjusted to account for the factors that affect the tension of the precursor so as to ensure that the desired, predetermined substantially constant tension is applied to the precursor. For example, a different draw ratio may be applied for a reactor with a relatively short distance between rollers compared to a reactor with a longer length so that the same desired predetermined substantially constant amount of tension can be applied to the precursor in each reactor.

The draw ratio is determined by the transfer speed of the tensioning device upstream of the pre-stabilisation reactor (i.e. at the inlet side) compared to the transfer speed of the tensioning device downstream (i.e. at the outlet side). When the downstream transfer speed is higher than the upstream speed, the draw ratio is positive and an elongating load is being applied to the precursor to increase the tension applied. Conversely, where the upstream speed is higher than the downstream speed, the draw ratio is negative and a compressive load is applied to the precursor to reduce the tension applied. In some embodiments, the degree of shrinkage and other intrinsic material property changes may be such that a negative draw ratio is used so as to apply the desired predetermined substantially constant tension to the precursor. In other embodiments, a positive draw ratio may be used.

In some other embodiments, the transfer speeds are selected such that a 0% draw ratio is used. Accordingly, in some embodiments, the tensioning devices located upstream and downstream of the pre-stabilisation reactor may be operated in a manner that ensures that a desired amount of tension can be applied to the precursor fibre suspended without stretching the precursor fibre. For example, drive rollers in tensioning devices located upstream and downstream of a pre-stabilisation reaction chamber may be operated at the same rotational speed to ensure the precursor fibre suspended there-between is not stretched as it travels through the reactor.

In other embodiments, the tensioning devices located upstream and downstream of the pre-stabilisation reactor may be operated in a manner that ensures that a desired amount of tension can be applied to the precursor fibre suspended without stretching the precursor fibre. For example, drive rollers in tensioning devices located upstream and downstream of a pre-stabilisation reaction chamber may be operated at the same rotational speed to ensure the precursor fibre suspended there-between is not stretched as it travels through the reactor.

If desired, the pre-stabilised precursor may optionally be collected prior to being exposed to an oxygen containing atmosphere. For example, the pre-stabilised precursor may be collected on one or more spools.

However, it is believed that the pre-stabilised precursor is activated for the oxidative treatment step due at least in part, to partial cyclisation of the PAN precursor during pre-stabilisation. Because of this activation, the pre-stabilised precursor may be chemically unstable and susceptible to further reaction when in an oxygen containing environment (such as air). For instance, it is believed that dihydropyridine structures that can be produced in an inert atmosphere can be prone to reaction through free radical auto-oxidation when exposed to oxygen. Due to this instability, it may therefore be advantageous to expose the pre-stabilised precursor to an oxygen containing atmosphere immediately or shortly after its formation, rather than storing the pre-stabilised precursor. If storage of the pre-stabilised precursor is desired, it can be beneficial for storage to be effected in a substantially oxygen-free atmosphere, such as an atmosphere comprising an inert gas.

Pre-stabilised precursors obtained from the pre-stabilisation step are believed to be more thermally stable than virgin PAN precursors, and were found to have lower exothermicity as determined by differential scanning calorimetry (DSC). It is believed that the decrease in exothermic behaviour for the pre-stabilised precursor is at least partially due to the presence of cyclised nitrile groups in the pre-stabilised precursor. Translated to a carbon fibre manufacturing process, the reduction of energy released during processing of the PAN precursor would allow better control of further oxidative exothermic reactions, thus enhancing the safety of carbon fibre manufacture.

Oxidation

The pre-stabilised precursor is exposed to an oxygen containing atmosphere in order to form a stabilised precursor. Thus the pre-stabilised precursor is converted into a stabilised precursor. This step of embodiments of the processes described herein may also be referred to herein as an "oxidation" or "oxidising" step. Conditions for forming the stabilised precursor are discussed below.

During the oxidation step, pendant nitrile groups in the PAN precursor that had not cyclised during the pre-stabilisation step can now undergo further cyclisation. The oxidation step therefore increases the quantity of cyclised nitrile groups (and hence the quantity of hexagonal carbon-nitrogen rings) relative to that of the pre-stabilised precursor fibre, leading to a higher proportion of ladder-type structures in the precursor. By increasing the quantity of cyclised nitrile groups, the precursor acquires increased thermal stability and is suitably prepared for the subsequent carbonisation process described herein which can be used to form a carbon-based material such as carbon fibre.

A stabilised precursor comprising a high proportion of cyclised nitrile groups can be beneficial to enable the formation of a high quality carbon material with desirable physical and tensile properties. In some embodiments, the stabilised precursor may comprise at least 50% cyclised nitrile groups, preferably at least 60% cyclised nitrile groups. The stabilised precursor may comprise up to about 85% cyclised nitrile groups. In particular embodiments, the stabilised precursor may comprise from about 65% to 75% cyclised nitrile groups.

By forming a pre-stabilised precursor comprising at least 10% cyclised nitrile groups, it is possible to obtain a desired quantity of cyclised nitrile groups in the stabilised precursor in less time and with concomitant lower energy consumption and cost.

A skilled person would understand that during the oxidising step, additional chemical reactions, such as dehydrogenation and oxidation reactions and intermolecular cross-linking reactions might also occur. Dehydrogenation reactions along the polymer backbone can lead to the formation of conjugated electron systems and condensed ring structures, while oxidation reactions can result in the formation of carbonyl and hydroxyl functionalities.

The oxygen containing atmosphere to which the pre-stabilised precursor is exposed to during the oxidation step comprises a suitable amount of oxygen.

The oxygen containing atmosphere may comprise only oxygen (i.e. molecular oxygen or $O_2$) or it may comprise oxygen in combination with one or more gases in admixture. In some embodiments, the oxygen concentration of the oxygen-containing atmosphere is from about 5% to 30% by volume.

In one embodiment, the oxygen containing atmosphere is air. A skilled person would understand that the oxygen content of air is approximately 21% by volume.

In one set of embodiments a flow of an oxygen containing gas, such as air, may be used to establish the oxygen containing atmosphere.

The exposure of the pre-stabilised precursor to an oxygen-containing atmosphere may proceed for a desired period of time and at a desired temperature sufficient to form a stabilised precursor. Additionally, in some embodiments tension may also be applied to the pre-stabilised precursor during the oxidation step.

Similar to the pre-stabilisation step, a number of indicators can be used to guide the selection of the process conditions (i.e. temperature, time period and tension) used during the oxidation step to convert a pre-stabilised precursor in to a stabilised precursor. The indicators may be considered separately or in combination. The oxidation process conditions can be selected to aid in the formation of a stabilised precursor fibre having desirable properties.

The choice of oxidation process conditions used for converting the pre-stabilised precursor in to a stabilised precursor may in some embodiments depend on outcomes desired in relation to one or more of the following indicators produced in the fully stabilised precursor: mechanical properties of the precursor (including tensile properties of ultimate tensile strength, tensile modulus and elongation to break), precursor fibre diameter, mass density, the extent of nitrile group cyclisation (% EOR), and appearance. The process conditions employed during oxidation can be adjusted in order to promote the evolution of one or more of the above indicators to achieve desirable outcomes in the stabilised precursor produced at the conclusion of the oxidation step.

In some embodiments it can be desirable for process conditions employed during the oxidation step to be selected to produce a stabilised precursor having desirable tensile properties.

For instance, in some embodiments it can be desirable for process conditions employed during the oxidation step to be selected so as to produce a minimum value of ultimate tensile strength and/or tensile modulus in the stabilised precursor generated from the oxidation step, as low tensile strength and tensile modulus can provide an indication of a high extent of precursor stabilisation.

Further, in some embodiments it can be desirable for process conditions employed during the oxidation step to be selected to produce a maximum elongation to break value in the stabilised precursor generated from the oxidation step.

Oxidation process conditions (i.e. temperature, time period and tension) employed to convert a pre-stabilised precursor in to a stabilised precursor can be selected to suitably promote chemical reactions, including nitrile group cyclisation and dehydrogenation, during the oxidation step that assist with formation of a stabilised precursor having desired tensile properties.

As an example, it has been found that under fixed temperature and time conditions during the oxidation step, the properties of ultimate tensile strength and tensile modulus of a PAN precursor can each decrease as increasing amounts of tension are applied to a pre-stabilised precursor. The decreases in ultimate tensile strength and tensile modulus continue until a minimum value for each property is reached. Thereafter, further increases in the amount of tension applied to the precursor results in an increase in ultimate tensile strength and tensile modulus.

Similarly, at fixed temperature and time conditions during the oxidation step, elongation to break of the stabilised PAN precursor can increase as increasing amounts of tension are applied to the pre-stabilised precursor during oxidation, until a maximum elongation to break value is achieved. Above the maximum value, elongation to break will start to decrease with respect to a corresponding increase in applied tension. In some embodiments it can be desirable for process conditions employed during the oxidation step to be selected so as to produce a maximum elongation to break value in the stabilised precursor formed from the oxidation step.

Precursor fibre diameter can also decrease as a result of the oxidation step. The decrease of the fibre diameter is the result of a combination of weight loss and fibre shrinkage induced by chemical reactions. In some embodiments the diameter of the fibre can be influenced by tension applied to the precursor during the oxidation step.

With the progress of stabilisation and evolution of ladder-like structures during the oxidation step, the mass density of the precursor increases during oxidation and can follow a linear trend. Thus the mass density of a fully stabilised precursor may be used as an indicator to help guide the selection of process conditions for the oxidation step.

In some embodiments, process conditions selected for the oxidation step are sufficient to from a stabilised precursor having a mass density in the range of from about 1.30 g/cm$^3$ and 1.40 g/cm$^3$. A stabilised precursor having a mass density in such ranges may be suitable for the manufacture of high performance carbon fibre.

Another indicator that may be used for the selection of oxidation process conditions is the extent of nitrile group cyclisation (% EOR) in the stabilised precursor. The extent of reaction (% EOR) provides a measurement of the proportion of cyclic structures in the stabilised precursor. Together with knowledge of the % EOR produced during the pre-stabilisation step, this indicator can allow one to determine how much cyclisation occurred during the oxidative stabilisation process.

In some embodiments, process conditions selected for the oxidation step are sufficient to form a stabilised precursor having at least 50% cyclised nitrile groups, preferably at least 60% cyclised nitrile groups. A stabilised precursor may have up to about 85% cyclised nitrile groups. In one set of embodiments, process conditions selected for the oxidation step are sufficient to form a stabilised precursor having from about 65% to 75% cyclised nitrile groups. The extent of nitrile group cyclisation in the stabilised precursor is determined using FT-IR spectroscopy in accordance with procedures described herein.

It is one advantage of the process of the present invention that a stabilised precursor having at least 60%, preferably at least 65%, cyclised nitrile groups can be rapidly formed in a shorter period of time, compared to alternative stabilisation processes In some embodiments, low density stabilised precursors can be formed by the stabilisation process of the invention. It has been found that a low density, stabilised precursor can be formed by subjecting pre-stabilised precursors as described herein to the oxidative stabilisation conditions described herein. Such low density stabilised precursors can have at least 60%, at least 65%, or at least 70%, cyclised nitrile groups and a mass density in the range of from about 1.30 g/cm$^3$ and 1.33 g/cm$^3$. It has been found that such low density stabilised precursors are sufficiently thermally stable and can be carbonised and converted into a carbon-based material such as carbon fibre having acceptable properties. It is believed that the stabilisation process of the invention can produce unique low density stabilised precursors due to the process utilising a pre-stabilisation step to form a pre-stabilised precursor prior to oxidative stabilisation.

A further indicator that may be used to help guide the selection of oxidation process conditions is the appearance of the fully stabilised precursor. For instance, it can be desirable to select process conditions to limit or avoid the formation of a skin-core cross-sectional morphology in the stabilised precursor as skin-core formation is a result of non-homogeneous stabilisation from the skin of the precursor to its core. However, in some embodiments, fully stabilised precursors formed in accordance with the process of the invention may have skin-core cross-sectional morphology. Furthermore, fully stabilised PAN precursors prepared in accordance with embodiments described herein are preferably substantially defect-free and have an acceptable appearance. It is considered that defects including melting of the precursor or partial tow breakage could lead to low tensile properties or even failure in a carbon material prepared with the stabilised precursor.

Stabilised precursors formed in accordance with the stabilisation process of the invention are thermally stable and are resistant to combustion when exposed to a naked flame. The stabilised precursors are moreover capable of being carbonised for conversion into a carbon-based material such as carbon fibre.

In one set of embodiments the oxidation step may be performed at room temperature (approximately 20° C.), but preferably is performed at elevated temperature.

For a PAN precursor that has been subjected to pre-stabilisation, the oxidation step can be carried out at a lower temperature than that conventionally used for the production of a stabilised precursor.

In some embodiments of the precursor stabilisation process described herein, the oxidation step for forming a stabilised precursor can be performed at a temperature that is at least 20° C. lower than that used in a conventional or alternative stabilising process that does not utilise a pre-stabilisation step.

The ability to perform the oxidation step at lower temperature can be advantageous as it can help to reduce risks associated with uncontrolled heat evolution and thermal runaway, which can be produced due to chemical reactions occurring during precursor stabilisation. Moreover, by lowering the temperature at which oxidation step is performed, the amount of energy required to stabilise a precursor may also be reduced.

For instance, it is believed that pre-stabilised precursors are sensitive to oxygen and are under an "activated state", whereby it is reactive to oxygen. Thus, this may shorten the time period required for precursor stabilisation, which would result in significant energy savings and manufacturing cost reduction.

In particular, when a pre-stabilised precursor with a high content of cyclised nitrile groups is exposed to an oxygen containing atmosphere, it has been found that oxidative reactions leading to full stabilisation of the precursor can be completed within a shorter time period. Thus by initially forming a pre-stabilised precursor having at least 10%, at least 15%, or at least 20%, cyclised nitrile group, the rate of oxidative stabilisation reactions and further nitrile group cyclisation in the precursor can be increased when the pre-stabilised precursor is exposed to an oxygen containing atmosphere, thus enabling the time period required for formation of the stabilised precursor to be reduced.

In some embodiments, the oxidation step is performed at an elevated temperature.

In one embodiment, the pre-stabilised precursor is heated in an oxygen containing atmosphere when performing the oxidation step. The oxygen containing atmosphere may comprise a suitable amount of oxygen. In one preference, the oxygen containing atmosphere comprises at least 10% oxygen by volume. In one embodiment, the oxygen containing atmosphere is air.

One skilled in the art would appreciate that oxidative stabilisation reactions occurring during the oxidation step may consume oxygen atoms. As a result, the content of oxygen in the oxygen containing atmosphere may be less than the oxygen content in the gas employed to establish the oxygen containing atmosphere.

In one preference, the pre-stabilised precursor is heated in air in order to form a stabilised precursor.

The oxidation step may be performed at a temperature that is higher or lower than that of pre-stabilisation step. Alternatively, the oxidation step may be performed at a temperature that is approximately the same as that employed for the pre-stabilisation step.

In a specific embodiment, the pre-stabilised precursor is heated in the oxygen containing atmosphere at a temperature that is lower temperature than that used for forming the pre-stabilised precursor. That is, the oxidation step may be performed at a temperature that is lower than that of the pre-stabilisation step.

In one form, the oxidation step is performed at a temperature that is above ambient room temperature and below the temperature used for forming the pre-stabilised precursor in the pre-stabilisation step.

In some embodiments, the pre-stabilised precursor may be heated in the oxygen containing atmosphere at a temperature that is at least 20° C. lower temperature than that used in the pre-stabilising step.

In one preference, the pre-stabilised precursor is heated in the oxygen containing atmosphere at a temperature in a range of from about 200° C. to 300° C.

When the oxidation step is performed at an elevated temperature, the pre-stabilised precursor may be heated under a substantially constant temperature profile or a variable temperature profile.

In one set of embodiments, the pre-stabilised precursor is heated under a constant temperature profile. In such embodiments, the pre-stabilised precursor may be heated at a temperature of about 300° C.

In one set of embodiments, the pre-stabilised precursor is heated under a variable temperature profile. For example, the pre-stabilised precursor may initially be heated at a selected temperature, then the temperature may increase as the oxidation step proceeds. As an example, the pre-stabilised precursor may initially be heated at a temperature of about 230° C., with temperature increasing to about 285° C. during the oxidation step.

As the oxidation step may be exothermic, it can be desirable to perform the oxidising step at a controlled rate. This may be achieved through a variety of methods, for example by passing the pre-stabilised precursor through a series of temperature zones with progressively increasing temperatures in a desired temperature range.

The flow path for the pre-stabilised precursor may be such that the precursor makes a single pass or multiple passes through a particular temperature zone.

In some embodiments, heating of the pre-stabilised precursor during the oxidation step may occur by passing the pre-stabilised precursor through a single temperature zone.

In other embodiments, heating of the pre-stabilised precursor during the oxidation step may occur by passing the pre-stabilised precursor through a plurality of temperature zones. In such embodiments, the pre-stabilised precursor may pass through 2, 3, 4, or more temperature zones. Each of the zones may be of the same temperature. Alternatively, two or more zones may be of different temperatures. For example, at least one temperature zone (e.g. first temperature zone) may be at a first temperature while at least one temperature zone (e.g. second temperature zone) is at a second temperature that is different to the first temperature.

The pre-stabilised precursor may make a single pass through a given temperature zone, or it may make multiple passes through a given temperature zone. Multiple passes through a temperature zone can be utilised to increase the time for exposing the pre-stabilised precursor to the oxygen containing atmosphere.

In some embodiments, each temperature zone may provide an oxidation zone in which a reaction facilitating stabilisation of the pre-stabilised precursor is performed.

In embodiments when a flow of an oxygen containing gas is used to establish the oxygen containing atmosphere, the flow of oxygen containing gas may be heated. The flow of heated oxygen containing gas can be used to bring the pre-stabilised precursor up to reaction temperature.

As discussed above, the pre-stabilised precursor may be activated for the oxidation step due to cyclisation of a portion of nitrile groups in the PAN precursor during the pre-stabilisation step. In particular, it has been found that activation of the precursor through the pre-stabilisation step can enable a stabilised precursor to be formed more rapidly.

In one set of embodiments the pre-stabilised precursor is exposed to the oxygen containing atmosphere for a time period selected from the group consisting of no more than about 60 minutes, no more than about 45 minutes, no more than about 30 minutes, and no more than about 20 minutes.

The present invention can provide a process for rapidly preparing a stabilised PAN precursor fibre capable of being carbonised to form a carbon fibre, wherein the process (including the pre-stabilisation and oxidation steps) is performed for a time period selected from: no more than about 60 minutes, no more than about 45 minutes, no more than about 30 minutes, no more than about 25 minutes, or no more than about 20 minutes.

Thus a stabilised precursor fibre suitable for carbon fibre manufacture can be formed within a time period selected from: no more than about 60 minutes, no more than about 45 minutes, no more than about 30 minutes, no more than about 25 minutes, or no more than about 20 minutes.

The ability to rapidly form a stabilised precursor that is capable of being carbonised can provide significant time, energy and cost savings in the manufacture of carbon-based materials such as carbon fibre. For example, a stabilised precursor having a desired quantity of cyclised nitrile groups can be formed at least 25%, at least 30%, at least 40%, at least 50%, at least 60%, at least 70%, or at least 80% faster than comparative stabilisation process designed to form a similarly stabilised precursor, but which does not include the pre-stabilisation step described herein.

It is one advantage that the oxidation step employed for precursor stabilisation may proceed at high speed. This can help reduce the impact of the oxidation step on the time and cost of carbon fibre manufacture.

In one set of embodiments, the pre-stabilised precursor is exposed to an oxygen containing atmosphere while under tension. By this is meant that a predetermined amount of tension is applied to the pre-stabilised precursor during the oxidation step. In particular embodiments, the pre-stabilised precursor is heated in an oxygen containing atmosphere while under applied tension. Tension applied during the oxidation step can help to promote chemical reactions occurring during stabilisation, enhance the molecular alignment of polyacrylonitrile, and allow the formation of a more highly ordered structure in the precursor.

In one set of embodiments, tension in the range of from about 50 cN to 50,000 cN, or from about 50 cN to 10,000 cN, is applied to the pre-stabilised precursor during the oxidising step.

In one set of embodiments, the pre-stabilised precursor is exposed to an oxygen containing atmosphere at a predetermined temperature for a predetermined period of time.

The predetermined temperature may be a temperature in a range from room temperature (about 20° C.) up to about 300° C., preferably a temperature in a range of from about 200° C. to 300° C.

The predetermined time period may be selected from the group consisting of no more than about 60 minutes, no more than about 45 minutes, no more than about 30 minutes, and no more than about 20 minutes.

When the pre-stabilised precursor is exposed to an oxygen containing atmosphere at a predetermined temperature for a predetermined period of time, tension may be applied to the pre-stabilised precursor while in the oxygen containing atmosphere in order to promote the evolution of one or more of the indicators described above and thus help form a stabilised precursor having desirable properties suitable for carbon fibre manufacture.

The oxidation step may be performed in a suitable oxidation reactor. Suitable oxidation reactors may comprise an oxidation chamber adapted to stabilise the pre-stabilised precursor in an oxygen containing atmosphere, an inlet for allowing the pre-stabilised precursor to enter the oxidation chamber, an outlet for allowing the pre-stabilised precursor to exit the oxidation chamber, and a gas delivery system for delivering an oxygen containing gas to the oxidation chamber. In one set of embodiments, the oxygen containing gas is air.

Suitable oxidation reactors include conventional oxidation reactors known in the art. The operating parameters of the oxidation reactor can be adjusted to oxidise the pre-stabilised precursor and form a stabilised precursor in accordance with a stabilisation process of one or more embodiments described herein.

An exemplary oxidation reactor may be a furnace or oven that is adapted to contain an oxygen containing atmosphere, such as air.

A plurality of oxidation reactors may be used to perform the oxidation step.

An oxidation reactor may comprise a single oxidation chamber or a plurality of oxidation chambers. Where the reactor comprises a plurality of oxidation chambers, the pre-stabilised precursor may be conveyed from one oxidation chamber to the next by suitable transport means.

A plurality of oxidation chambers used for carrying out the oxidation step may be at the same temperature or two or more of the chambers may be at different temperatures. Each reaction chamber may provide a temperature zone in which oxidation of the pre-stabilised precursor can be performed.

A flow of an oxygen containing gas may be used to establish an oxygen containing atmosphere in an oxidation chamber. Exothermic energy can be released as nitrile groups in the pre-stabilised precursor undergo cyclisation, as well as through oxidation reactions.

A flow of oxygen containing gas may therefore assist in dissipating exothermic energy that is released during the oxidation step.

The pre-stabilised precursor is conveyed through an oxidation reactor comprising one or more oxidation chambers in order to form a stabilised precursor. The pre-stabilised precursor may be conveyed such that it makes a single pass or multiples passes through each oxidation chamber, at a predetermined speed. The length of the oxidation reactor, the flow path of the precursor through each oxidation chamber, and the speed at which the precursor is conveyed through each chamber can each influence the total dwell time of the precursor in the oxidation reactor. In turn, the dwell time can determine the time period in which the oxidation step is performed.

Additionally, the total residence time of the pre-stabilised precursor in the oxidation reactor can be affected by the temperature within each oxidation chamber and vice versa. For example, in embodiments where a higher temperature is used for oxidation, it may be desirable to shorten the residence time in the oxidation reactor compared to embodiments where a lower temperature is used.

In one set of embodiments, the dwell time of the pre-stabilised precursor in the oxidation reactor is no more than 60 minutes or no more than about 45 minutes, no more than about 30 minutes or no more than about 20 minutes.

For a given oxidation reactor, the temperature of each oxidation chamber as well as the speed at which the precursor is conveyed through each chamber and the flow path of the precursor can be adjusted in order to achieve the desired dwell time.

In some embodiments, the speed at which the precursor is conveyed through an oxidation reactor is selected to match a line speed used during the pre-stabilisation step. This can allow the pre-stabilised precursor formed in the pre-stabilisation step to be fed directly to the downstream oxidation step. Accordingly, this can avoid the need to collect the pre-stabilised precursor. Thus the oxidation reactor for oxidising the pre-stabilised precursor to form a stabilised precursor can be located downstream of a pre-stabilisation reactor.

In some embodiments, the pre-stabilised precursor may be conveyed through an oxidation reactor at a speed in a range of from about 10 to 1,000 metres/hour.

In some particular embodiments, during the oxidation step, the pre-stabilised precursor is heated in an oxygen containing atmosphere at a temperature in a range of from about 200° C. to 300° C. Heating at a temperature within this range may occur for a time period selected from the group consisting of no more than about 60 minutes or no more than about 45 minutes, no more than about 30 minutes or no more than about 20 minutes.

The oxidation reactor may comprise one or more heating elements to facilitate heating of the pre-stabilised precursor to a desired temperature. In some embodiments, the heating elements may heat an oxidation chamber that is adapted to oxidise the pre-stabilised precursor. Alternatively or additionally, the oxidation reactor may comprise one or more heating elements that heat a flow of an oxygen containing gas that is delivered to the oxidation chamber. A heated gas flow may assist to control the temperature of the precursor as it passes through the oxidation chamber. A heated gas flow may further assist to promote oxygen diffusion through the pre-stabilised precursor, help to control excess heat induced by chemical exothermic reactions through controlled shaking of the precursor, and also help with carrying away toxic gases emitted as a result of the chemical reactions occurring in the precursor during the oxidation step.

As discussed above, in some embodiments tension is also applied to the pre-stabilised precursor during the oxidation step. The desired amount of tension may be applied by tensioning devices located upstream and downstream of each oxidation chamber employed for stabilisation of the pre-stabilised precursor. The precursor is suspended between the tensioning devices, which are adapted to pass the precursor through each oxidation chamber under a predetermined amount of tension.

In some embodiments, tensioning devices are material handling devices such as those known in the art and are separate components from the oxidation chamber. Examples of material handling devices include drive rollers.

In some embodiments, the oxidation reactor will comprise one or more of the tensioning devices. In embodiments where the oxidation reactor comprises two or more oxidation chambers, tensioning devices may be provided upstream and downstream of each oxidation chamber so that the precursor is conveyed via a tensioning device as it passes from one oxidation chamber to the next.

Tensioning devices may be controlled by a tension controller in order to enable a predetermined amount of tension to be applied to the pre-stabilised precursor fibre. The amount of tension applied may be monitored by the use of a tensiometer or electric load cells.

Similar to the pre-stabilisation, once the processing parameters of temperature, time and tension are selected for oxidation of the pre-stabilised precursor. the parameters remain fixed and unchanged while the oxidation step is performed. Furthermore, controls may be utilised to ensure that the process parameters are adequately maintained within acceptable limits for the selected values. This can help to ensure that consistent and stable precursor stabilisation can be achieved.

In one set of embodiments, there is provided a continuous process for preparing a stabilised precursor. In such embodiments, the pre-stabilisation and oxidation steps are performed in a continuous manner. That is, the oxidation step is performed immediately after the pre-stabilisation step.

In another aspect, the present invention provides a continuous process for preparing a stabilised precursor fibre for a carbon fibre, the process comprising the steps of: feeding a precursor comprising polyacrylonitrile in to a pre-stabilisation reactor comprising a substantially oxygen-free atmosphere and heating the precursor in the substantially oxygen-free atmosphere while applying a substantially constant amount of tension to the precursor to promote cyclisation of nitrile groups in the precursor, the temperature and time period in which the precursor is heated in the atmosphere and the amount of tension applied to the precursor each being selected to form a pre-stabilised precursor having at least 10% cyclised nitrile groups as determined by Fourier transform infrared (FT-IR) spectroscopy; and feeding the pre-stabilised precursor in to an oxidation reactor comprising an oxygen containing atmosphere and exposing the pre-stabilised precursor to the oxygen containing atmosphere to form the stabilised precursor.

In some embodiments, the pre-stabilised precursor has at least 15%, or at least 20% cyclised nitrile groups as determined by Fourier transform infrared (FT-IR) spectroscopy.

In one specific embodiment, the pre-stabilised precursor has from 20 to 30% cyclised nitrile groups as determined by Fourier transform infrared (FT-IR) spectroscopy.

In embodiments of continuous stabilisation processes described herein, the oxidation reactor is located downstream of the pre-stabilisation reactor.

Depending on temperatures, for some practical considerations, it can be desirable to cool the pre-stabilised precursor prior it being exposed the oxygen containing atmosphere. For instance, prior to being fed to the oxidation reactor, the pre-stabilised precursor can be cooled to a temperature that is below the environmental temperature of the oxidation reactor. Where oxidative stabilisation is performed in an oxidation reactor comprising multiple temperature zones, the pre-stabilised precursor may be cooled to a temperature that is below the temperature of the first temperature zone of the oxidation reactor.

Cooling of the pre-stabilised precursor results in the transfer of heat from the pre-stabilised precursor.

Cooling of the pre-stabilised precursor may be particularly desirable to limit the fire risk that may arise in circumstances where a pre-stabilised precursor is at a temperature that is higher than that of the oxygen containing atmosphere in the oxidation reactor.

In some embodiments, the pre-stabilised precursor is cooled to a temperature selected from the group consisting of less than 240° C., less than 140° C., and less than 100° C.

A temperature of less than 240° C. for the pre-stabilised precursor may be desirable for safety reasons, to at least limit or avoid a fire risk.

A temperature of less than 140° C. may be desirable to ensure the pre-stabilised precursor is below the exotherm of the pre-stabilised precursor as determined by differential scanning calorimetry (DSC). This can help to suitably limit reaction of the pre-stabilised precursor with oxygen in the surrounding ambient atmosphere prior to the pre-stabilised precursor entering the oxidation reactor.

A temperature of less than 100° C. for the pre-stabilised precursor may be desirable to enable handling of the pre-stabilised precursor.

Although cooled, it is preferable that the pre-stabilised precursor remains hot enough for efficient reaction in the oxidative environment within the oxidation reactor.

Cooling of the pre-stabilised precursor may be achieved by passing the pre-stabilised precursor though a cooling zone prior to its entry in to the oxidation reactor.

In one embodiment, the cooling zone may be provided by a cooling chamber positioned in between the pre-stabilisation reactor and the oxidation reactor.

In an alternative embodiment, the cooling zone may be part of the pre-stabilisation reactor and be provided by a cooling section within the pre-stabilisation reactor. In such embodiments, the cooling zone can be designed to cool the pre-stabilised precursor prior to it exiting the pre-stabilisation reactor.

Cooling of the pre-stabilised precursor in a cooling zone may be achieved by active or passive means.

In some embodiments, active cooling of the pre-stabilised precursor may involve passing a flow of substantially oxygen-free gas, such as nitrogen gas, over or around the pre-stabilised precursor. In one embodiment, cooling of the pre-stabilised precursor may be achieved by flowing a substantially oxygen-free cooling gas over or around the pre-stabilised precursor. The cooling gas is of a temperature that is lower than that of the pre-stabilised precursor. In some embodiments, the cooling gas may be at a temperature in a range of from about 20° C. to about 240° C. However, it would be appreciated that this may depend on the temperature of the oxidation reactor into which the pre-stabilised precursor will enter, with the temperature of the cooling gas being selected such that it is relative cooler than the pre-stabilised precursor. In some embodiments, the pre-stabilised precursor may be exposed to a suitable cooling gas at ambient room temperature for a predetermined time period in order to cool the pre-stabilised precursor prior to its introduction to the oxidation reactor.

In other embodiments, active cooling of the pre-stabilised precursor may be achieved by flowing a substantially oxygen-free gas of an appropriate temperature over or around the pre-stabilised precursor at a flow rate or volume that facilitates the transfer of heat from the pre-stabilised precursor.

In other embodiments, active cooling of the pre-stabilised precursor may be achieved by passing the pre-stabilised precursor through a cooling chamber or cooling section having cooled internal surfaces that cool the atmosphere within the cooling chamber or cooling section. In turn, this cooled atmosphere is used to cool the pre-stabilised precursor. A coolant may be used for cooling the internal surfaces. In some embodiments, cooled internal surfaces may be used combination with a substantially oxygen-free cooling gas to cool the hot pre-stabilised precursor to a desired temperature.

In some embodiments, passive cooling of the pre-stabilised precursor may involve passing the pre-stabilised precursor though a cooling zone that is a void or space of a volume that facilitates the transfer of heat from pre-stabilised precursor.

The continuous precursor stabilisation process employs pre-stabilisation and oxidation steps as described herein above.

When carrying out a continuous process for forming a stabilised precursor, the PAN precursor and pre-stabilised PAN precursor are preferably fed to the pre-stabilisation reactor and the oxidation reactor at substantially the same rate or speed. That is, a common rate or speed is preferably used.

The line speed on a production line may be selected such that the PAN precursor and pre-stabilised precursor are fed at a rate that enables the precursor and pre-stabilised precursor to have a desired residence time in the pre-stabilisation reactor and the oxidation reactor, respectively.

In one set of embodiments, the line speed is such that the PAN precursor has a residence time (i.e. dwell time) in the pre-stabilisation reactor of no more than about 5 minutes, no more than about 4 minutes, no more than about 3 minutes, or no more than about 2 minutes.

In one set of embodiments, the line speed is such that the pre-stabilised precursor has a residence time (i.e. dwell time) in the oxidation reactor of no more than no more than about 60 minutes, no more than about 45 minutes, or no more than about 30 minutes, or no more than about 20 minutes.

In one set of embodiments, conditions are selected that the stabilisation process (including the pre-stabilisation and oxidation steps) is complete in a time period selected from the group consisting of: no more than about 60 minutes, no more than about 45 minutes, no more than about 30 minutes, no more than about 25 minutes, and no more than about 20 minutes. Thus a fully stabilised precursor is formed within the aforementioned time periods.

The temperature the precursor is subjected to during the pre-stabilisation and oxidation steps, as well as the tension applied to the precursor during the time that the precursor resides in the pre-stabilisation and oxidation reactors can also facilitate the rapid formation of a stabilised precursor that is suitable for use in the manufacture of a carbon material, such as carbon fibre.

The stabilisation process of embodiments of the invention described herein allows a stabilised precursor suitable for carbon fibre manufacture to be formed in a shorter period of time compared to that of conventional PAN precursor stabilisation processes. A short residence time for the precursor in the pre-stabilisation and oxidation reactors may only be required.

It is one advantage of processes described herein that a stabilised precursor can be prepared in a shorter time period than that of conventional precursor stabilisation processes. The faster stabilisation time can be achieved by subjecting the PAN precursor to an initial pre-stabilisation step for a very short period of time (e.g. a time period of no more than about 5 minutes, no more than about 4 minutes, no more than about 3 minutes or no more than about 2 minutes) and subsequently, to an oxidation step that completes the precursor stabilisation and results in the formation of a stabilised precursor.

It is a further advantage that the oxidation step and may also be carried out for a shorter time period and/or at a lower temperature and energy than that of conventional oxidative stabilisation processes.

The inclusion of a pre-stabilisation step can therefore markedly reduce overall precursor stabilisation time and upon additional heat treatment of the stabilised precursor, carbon-based materials, such as carbon fibres, with excellent properties can be produced. Thus fast oxidative stabilisation of a PAN precursor suitable for the manufacture of carbon fibre can be achieved.

The stabilisation process described herein can be applied to range of PAN precursors of varying morphology and composition, to form a stabilised precursor.

The present invention also provides a stabilised precursor prepared by a stabilisation process of any one of the embodiments described herein. The stabilised precursor can suitably be used in the manufacture of carbon-based materials, such as carbon fibre.

Stabilised precursors prepared by one or more embodiments of processes described herein can have a density of between 1.30 g/cm$^3$ and 1.40 g/cm$^3$. Such densities can be suited for the manufacture of high performance carbon materials such as high performance carbon fibre.

It has also been found that a stabilised PAN precursor prepared by stabilisation processes described herein exhibit a range of properties that differ from stabilised precursors formed using conventional stabilisation processes.

For instance, a stabilised PAN precursor prepared in accordance with the stabilisation process of the invention have a different crystal structure, and can exhibit a smaller apparent crystallite size (Lc (002)) relative to a comparative stabilised PAN precursor formed by a comparative stabilisation process that does not include a pre-stabilisation step. In some embodiments, the Lc (002) may be at least 20% smaller than that observed for a comparative stabilised precursor.

Furthermore, stabilised PAN precursors prepared by the stabilisation process of the invention had higher thermal conversion and were formed with lower exothermic energy being generated, as measured by DSC. This highlights the possibility of the stabilisation process of the invention in enhancing the safety of carbon fibre manufacture.

Stabilised precursors prepared by the stabilisation process of the invention were also observed to have a higher dehydrogenation index (CH/CH$_2$ ratio) compared to a stabilised precursor formed using a comparative process that does not include a pre-stabilisation step. In some embodiments, the dehydrogenation index may be at least 5%, or at least 10% higher than that of a comparative stabilised precursor. The higher dehydrogenation index is believed to reflect a higher extent of oxidative chemical reactions or a higher chemical conversion of the PAN precursor during the oxidation step.

If desired, the stabilised precursor produced in accordance with processes of one or more embodiments described herein may be collected and stored in preparation for carbonisation or further use. For example, the stabilised precursor may be collected on one or more spools.

As discussed above, the stabilisation process of the invention, which comprises a pre-stabilisation step as described herein, enables a stabilised precursor that is sufficiently thermally stable for carbonisation to be formed in a rapid manner.

The term "rapid" as used in relation to a process described herein is intended to indicate that the process is performed more quickly (i.e. in a shorter period of time) than a reference process that is designed to achieve the same result, but which does not include the pre-stabilisation step as a part of the process. Processes of the present invention which involve the pre-stabilisation treatment can therefore provide a time saving, compared to the reference process. As an example, a conventional reference stabilisation process may form a stabilised PAN precursor having from 65% to 70% cyclised nitrile groups in a time period of about 70 minutes. In comparison, some embodiments of the stabilisation process of the present invention can enable a stabilised precursor having an equivalent amount of cyclised nitrile groups to be formed in a time period that is as little as about 15 minutes. Thus the stabilisation process of an embodiment of the invention can achieve a time saving of about 55 minutes (or about 78%) over the reference process.

Advantageously, the precursor stabilisation process of the invention enables a stabilised precursor to be formed in less time and with lower cost.

In some embodiments, the rapid stabilisation process of the invention can be at least 30%, at least 40%, at least 50%, at least 60%, at least 70% or at least 80% faster than a reference process that is designed to achieve an equivalent extent of nitrile group cyclisation in a stabilised precursor but which does not comprise the pre-stabilisation step.

The ability to rapidly stabilise a PAN precursor also enables energy savings to be achieved as less energy is consumed when performing the stabilisation process of the invention. This in turn can provide flow-on cost savings for processes such as carbon fibre manufacture. For example, a stabilisation process of the invention may consume on average from about 1.1 to 2.6 kWh/kg. This compares to a conventional stabilisation process, which has an average energy consumption of from about 3.7 to 8.9 kWh/kg.

In another aspect, the present invention also provides a low density stabilised precursor comprising polyacrylonitrile having at least 60% cyclised nitrile groups and a mass density in a range of from about 1.30 g/cm$^3$ to 1.33 g/cm$^3$. In some embodiments, the low density stabilised precursor has at least 65%, or at least 70%, cyclised nitrile groups. The low density stabilised PAN precursor is thermally stable and can be converted into a carbon material such as fibre with acceptable properties. Conversion to a carbon material such as carbon fibre can be achieved despite the relatively low density of the stabilised precursor.

A low density stabilised PAN precursor as described herein is also light weight and may advantageously be used in a variety of applications where a light weight stabilised precursor is desired. For example, the low density stabilised precursor may suitably be incorporated into fabrics.

Carbonisation

A stabilised precursor prepared in accordance with the invention can undergo carbonisation to form a carbon-based material or product, such as a carbon fibre. In particular embodiments, a stabilised precursor prepared in accordance with processes described herein may be suitable for use in the manufacture of high performance carbon fibre.

In some embodiments, the precursor stabilisation process described herein can be incorporated into a process for preparing a carbon fibre, to provide an improved carbon fibre manufacturing process.

The rapid precursor stabilisation process of the invention can enable carbon-based materials such as carbon fibre to be manufactured at a faster rate, compared to manufacturing processes utilising stabilised precursors prepared using conventional stabilisation procedures.

In one aspect, the present invention provides a process for preparing a carbon-based material comprising the steps of:
  providing a stabilised precursor prepared according to a stabilisation process of any one of the embodiments described herein; and
  carbonising the stabilised precursor to form the carbon-based material.

The carbon-based material may be in a range of forms, including fibre, yarn, web, film, fabric, weave and mat forms. Mats may be woven or non-woven mats.

In another aspect the present invention provides a process for preparing a carbon-based material, the process comprising:
  a pre-stabilisation stage comprising heating a precursor comprising polyacrylonitrile in a substantially oxygen-free atmosphere while applying a substantially constant amount of tension to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups as determined by Fourier transform infrared (FT-IR) spectroscopy;
  an oxidation stage comprising exposing the pre-stabilised precursor to an oxygen containing atmosphere to form a stabilised precursor; and
  a carbonisation stage comprising carbonising the stabilised precursor to form the carbon-based material.

In one preference, the carbon-based material is a carbon fibre. In order to produce a carbon fibre, the stabilised precursor may be in the form of fibre, preferably a continuous length of fibre.

It will be convenient to describe the carbonisation step by reference to the formation of a carbon fibre from a stabilised precursor fibre. However, a skilled person would appreciate that the carbonisation step could be performed on stabilised precursors in other forms, such that carbon-based materials in a range of different forms, including in forms other than fibre, can be prepared.

In another aspect, the present invention provides a process for preparing a carbon fibre comprising the steps of:
  providing a stabilised precursor fibre prepared according to a stabilisation process of any one of the embodiments described herein; and
  carbonising the stabilised precursor fibre to form the carbon fibre.

In another aspect the present invention provides a process for preparing a carbon fibre, the process comprising:
  a pre-stabilisation stage comprising heating a precursor fibre comprising polyacrylonitrile in a substantially oxygen-free atmosphere while applying a substantially constant amount of tension to the precursor fibre to promote cyclisation of nitrile groups in the precursor, the temperature and time period in which the precursor is heated in the substantially oxygen-free atmosphere and the amount of tension applied to the precursor fibre each being selected to form a pre-stabilised precursor fibre having at least 10% cyclised nitrile groups as determined by Fourier transform infrared (FT-IR) spectroscopy;

an oxidation stage comprising exposing the pre-stabilised precursor fibre to an oxygen containing atmosphere to form a stabilised precursor fibre; and a carbonisation stage comprising carbonising the stabilised precursor fibre to form the carbon fibre.

In carbonising a stabilised precursor fibre, a range of suitable conditions may be employed. The choice of process conditions for the carbonisation step can be selected to facilitate formation of a carbon material having desired properties and/or structure. In some embodiments, carbonisation process conditions are selected to enable the formation of a high performance carbon material, such as high performance carbon fibre. Suitable process conditions may include conventional carbonisation conditions known to one skilled in the relevant art.

During the carbonisation step, ladder-like molecular structures that formed in the stabilisation step become bonded to each other and modified into graphite-like structures, thereby forming the carbon-based structure of the carbon fibre. Additionally, during carbonisation, the volatilisation of elements other than carbon also occurs.

In one set of embodiments, the stabilised precursor fibre is heated in a substantially oxygen-free atmosphere during the carbonising step.

In some embodiments the carbonisation step involves heating the stabilised precursor fibre at a temperature in the range of from about 350° C. to 3000° C., preferably from about 450° C. to 1800° C., in the substantially oxygen-free atmosphere.

In one set of embodiments, the carbonisation step may comprise low temperature carbonisation and high temperature carbonisation.

Low temperature carbonisation can involve heating the stabilised precursor fibre at a temperature in a range of from about 350° C. to about 1000° C.

High temperature carbonisation can involve heating the stabilised precursor fibre at a temperature in a range of from about 1000° C. and 1800° C.

In the carbonisation step, low temperature carbonisation may be performed before high temperature carbonisation.

During carbonisation, the stabilised precursor fibre may be heated under a variable temperature profile to form a carbon fibre. For example, the temperature may be varied within the defined range of temperature employed for low temperature and/or high temperature carbonisation.

A variable temperature profile for carbonisation step may be achieved by passing the stabilised precursor fibre through a plurality of temperature zones, with each temperature zone being at a different temperature. In one set of embodiments, the stabilised precursor fibre may pass through 2, 3, 4, or more temperature zones.

The carbonisation step is performed in a substantially oxygen-free atmosphere, which may comprise an inert gas. A suitable inert gas may be a noble gas, such as argon, helium, neon, krypton, xenon and radium. Furthermore, a suitable inert gas may be nitrogen. The substantially oxygen-free atmosphere may comprise a mixture of inert gases, such as a mixture of nitrogen and argon.

The carbonisation step may be carried out for a period of time that is suitable for producing a carbon fibre. In some embodiments, the carbonisation step may be performed for a time period selected from up to 20 minutes, up to 15 minutes, up to 10 minutes and up to 5 minutes.

In one set of embodiments the stabilised precursor is heated under tension during the carbonising step. Tension applied during the carbonising step can help to control shrinkage of the carbon material as well as promote the formation of a more highly ordered structure in the carbon material.

Tension values as used in conventional carbonisation processes for forming carbon material such as carbon fibre can be used in the carbonisation step of processes described herein.

The choice of tension to be applied the stabilised precursor during the carbonisation step may in some embodiments depend on outcomes desired in relation to one or more mechanical properties of the carbon fibre formed from the precursor. Mechanical properties desired for the carbon fibre may include tensile properties such as ultimate tensile strength, tensile modulus and elongation to break. Tension applied to the precursor during carbonisation can be adjusted in order to promote the evolution of one or more of the above properties to achieve a desired outcome in the carbon fibre.

Carbonisation of the stabilised precursor can be performed in a variety of different carbonisation units, including conventional carbonisation units known to one skilled in the relevant art. Such units can use operating parameters known in the art for carbonising a stabilised precursor.

A suitable carbonisation unit may comprise at least one at least one carbonisation reactor. Carbonisation units comprising multiple reactors, such as two or more carbonisation reactors, can also be used.

A carbonisation reactor is adapted to carbonise the stabilised precursor in a substantially oxygen-free atmosphere. The reactor may comprise an inlet for allowing the stabilised precursor to enter the carbonisation reactor, an outlet for allowing the stabilised precursor to exit the carbonisation reactor, and a gas delivery system for delivering a substantially oxygen-free gas to the carbonisation reactor to help establish the substantially oxygen-free atmosphere. In one set of embodiments, the substantially oxygen-free gas comprises nitrogen.

The carbonisation reactor may also comprise one or more heating elements. The heating elements may heat a substantially oxygen-free gas that is delivered to the carbonisation reactor. The carbonisation reactor may be configured to provide a single temperature zone or a plurality of temperature zones for heating the stabilised precursor that passes within.

Exemplary carbonisation reactors may be ovens or furnaces that are adapted to contain a substantially oxygen-free atmosphere and can withstand the high temperature conditions generally employed for carbon fibre formation. Conventional ovens or furnaces suitable for carbon fibre manufacture may be used to perform the carbonisation step.

When more than one carbonisation reactor is used to carry out the carbonisation step, the separate carbonisation reactors may be arranged in series, with the precursor making a only a single pass through each reactor. For example, a carbonisation unit may comprise a low temperature furnace and a high temperature furnace for performing the carbonisation step. The high temperature furnace will generally be located downstream of the low temperature furnace.

Carbonisation is performed in a substantially oxygen-free atmosphere and a flow of a substantially oxygen-free gas may be used to establish the substantially oxygen-free atmosphere in a carbonisation reactor. In one preference, the substantially oxygen-free gas is an inert gas. A suitable inert gas may be a noble gas, such as argon, helium, neon, krypton, xenon and radium. Furthermore, an inert gas may be nitrogen. The substantially oxygen-free atmosphere may comprise a mixture of inert gases, such as a mixture of nitrogen and argon.

One skilled in the art would appreciate that a carbonisation unit would have a defined length established by the heated length of each reactor and the stabilised precursor may pass through the carbonisation unit at a predetermined speed. The length of the carbonisation unit and the speed at which the precursor is conveyed through the carbonisation unit can influence the total dwell time of the precursor in the unit. In turn, the dwell time can determine the time period in which the carbonisation step is performed.

In one set of embodiments, the dwell time of the stabilised precursor in the carbonisation unit is no more than about 20 minutes, no more than about 15 minutes, no more than about 10 minutes or no more than about 5 minutes.

The temperature of the one or more carbonisation reactors in the carbonisation unit as well as the speed at which the precursor is conveyed through the carbonisation unit can be adjusted in order to achieve a carbon material in the desired time.

In some embodiments, the speed at which the precursor is conveyed through a carbonisation unit is selected to match a line speed used in the pre-stabilisation and oxidation steps described herein. This can facilitate the continuous manufacture of a carbon material such as carbon fibre. In particular embodiments, the stabilised precursor may be conveyed through a carbonisation unit at a speed in a range of from about 10 to 1,000 metres/hour.

In order to readily convey the stabilised precursor through the carbonisation unit, the precursor will typically have some tension applied to it to ensure that it does not sag or drag as it passes through a carbonisation reactor. In addition, tension applied during the carbonisation step can help to inhibit shrinkage of the carbon material as well as promote the formation of a more highly ordered structure in the carbon material. Tension values used in conventional carbonisation process for forming carbon material such as carbon fibre can be used in the carbonisation step of processes described herein.

The desired amount of tension may be applied by tensioning devices located upstream and downstream of a carbonisation unit employed for carbonising the precursor. The precursor is suspended between the tensioning devices, which are adapted to pass the precursor through a carbonisation unit under a predetermined amount of tension.

In some embodiments, tensioning devices are material handling devices such as those known in the art and are separate components from the carbonisation unit. Examples of material handling devices include drive rollers.

In some embodiments, the carbonisation unit will comprise one or more of the tensioning devices. In embodiments where the carbonisation unit comprises two or more carbonisation reactors, tensioning devices may be provided upstream and downstream of each carbonisation reactor so that the precursor is conveyed via a tensioning device as it passes from one carbonisation reactor to the next.

In some embodiments, carbon fibre prepared in accordance with processes described herein may be formed in a time period of no more than about 70 minutes, no more than about 65 minutes, no more than about 60 minutes, no more than about 45 minutes, or no more than about 30 minutes.

The pre-stabilisation, oxidation and carbonisation steps described herein may be carried out as part of a continuous process for forming a carbon-based material, in particular, a carbon fibre.

In another aspect, the present invention provides a continuous process for preparing a carbon-based material, the process comprising the steps of:

feeding a precursor comprising polyacrylonitrile in to a pre-stabilisation reactor comprising a substantially oxygen-free atmosphere and heating the precursor in the substantially oxygen-free atmosphere while applying a substantially constant amount of tension to the precursor to promote cyclisation of nitrile groups in the precursor, the temperature and time period in which the precursor is heated in the substantially oxygen-free atmosphere and the tension applied to the precursor each being selected to form a pre-stabilised precursor comprising at least 10% cyclised nitrile groups as determined by Fourier transform infrared (FT-IR) spectroscopy;

feeding the pre-stabilised precursor in to an oxidation reactor comprising an oxygen containing atmosphere and exposing the pre-stabilised precursor to the oxygen containing atmosphere to form a stabilised precursor; and feeding the stabilised precursor in to a carbonisation unit and carbonising the stabilised precursor in the carbonisation unit to form the carbon-based material.

The carbon-based material is suitably a carbon fibre. In such embodiments, the precursor comprising polyacrylonitrile is preferably in the form of a continuous fibre. Thus processes for preparing a carbon fibre as described herein may be continuous.

In yet another aspect the present invention provides a continuous process for preparing a carbon fibre, the process comprising the steps of:

feeding a precursor fibre comprising polyacrylonitrile in to a pre-stabilisation reactor comprising a substantially oxygen-free atmosphere and heating the precursor in the substantially oxygen-free atmosphere while applying a substantially constant amount of tension to the precursor to promote cyclisation of nitrile groups in the precursor, the temperature and time period in which the precursor is heated in the substantially oxygen-free atmosphere and the tension applied to the precursor each being selected to form a pre-stabilised precursor fibre comprising at least 10% cyclised nitrile groups as determined by Fourier transform infrared (FTIR) spectroscopy;

feeding the pre-stabilised precursor fibre in to an oxidation reactor comprising an oxygen containing atmosphere and exposing the pre-stabilised precursor fibre to the oxygen containing atmosphere to form a stabilised precursor fibre; and feeding the stabilised precursor fibre in to a carbonisation unit and carbonising the stabilised precursor fibre in the carbonisation unit to form the carbon fibre.

The pre-stabilisation reactor, oxidation reactor and carbonisation unit in one or more aspects of the invention as discussed above may be part of a system for formation of a carbon fibre.

Figure 22:
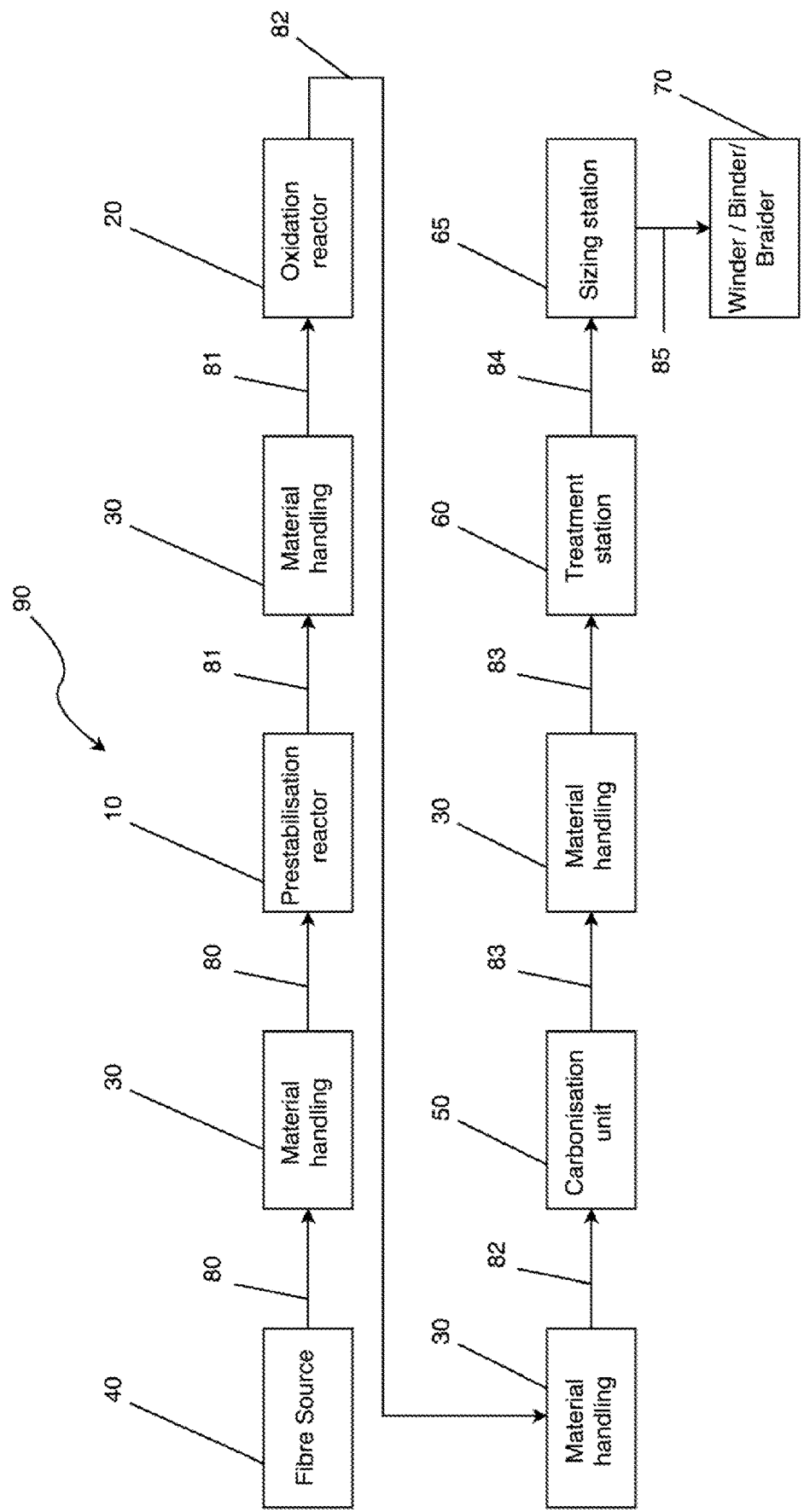
FIG. 22 shows a block diagram of a carbon fibre production system for performing a continuous carbon fibre preparation process of an embodiment of the present invention.

Referring to FIG. 22, there is shown an example of a carbon fibre production system suitable for continuous production of a carbon fibre in the form of a block diagram. The carbon fibre production system 90 comprises a pre-stabilisation reactor 10 for producing a pre-stabilised precursor 81 from a polyacrylonitrile fibre precursor 80.

A fibre source 40 is used to dispense the precursor 80. Multiple fibres of the precursor 80 are simultaneously dispensed by the fibre source 40 as a tow. After the precursor fibres 80 are dispensed, they are passed through a material handling device 30, such as a tension stand having a plurality of rollers, as is well known in the art. This material handling device 30 is used, together with the material handling device 30 downstream of the reactor 10, to apply a predetermined tension to the precursor 80 as it passes through the reactor 10 to form the pre-stabilised precursor 81.

The pre-stabilised precursor 81 is then fed into an oxidation reactor 20, which may comprise a series of oxidation chambers. A further material handling device 30 is used to draw the pre-stabilised precursor 81 through the oxidation reactor 20. Similarly to the pre-stabilisation reactor 10, the material handling devices 30 upstream and downstream of the oxidation reactor 20 may be used to apply a predetermined tension to the pre-stabilised precursor 81 as it passes through the oxidation reactor 20 to form the stabilised precursor 82.

The stabilised precursor 82 is then processed by the carbonisation unit 50 to pyrolyse the stabilised precursor 82 and convert it into carbon fibre 83. The carbonisation unit 50 comprises one or more carbonisation reactors. The carbonisation reactors may be ovens or furnaces that are adapted to contain a substantially oxygen-free atmosphere and can withstand the high temperature conditions generally employed for carbon fibre formation. Next, a surface treatment may be performed at a treatment station 60. Then, a sizing may be applied to the treated carbon fibre 84 at a sizing station 65.

The tows of sized carbon fibres 85 are then wound using a winder 70 and/or bundled.

In a continuous process for forming a carbon-based material, in particular a carbon fibre, in accordance with one or more aspects of the invention, the operating conditions under which the pre-stabilisation, oxidation and carbonisation steps of the process can be performed are described herein above.

When carrying out a continuous process for forming a carbon fibre, the precursor can be fed to the pre-stabilisation reactor, the oxidation reactor and the carbonisation unit at substantially the same rate or speed. Consequently, the precursor is continuously conveyed from one reactor to the next without the need to collect the precursor between reactors.

The line speed may be as low as 10 metres per hour (m/hr), and may be up to as high as 1,000 m/hr. For an industrial carbon fibre manufacturing process, the line speed may in a range of from about 100 to 1,000 m/hr, for example, 120 to 900 m/hr.

In some embodiments of a continuous carbon fibre preparation process described herein there may be a further step of cooling the pre-stabilised precursor prior to feeding the pre-stabilised precursor in to the oxidation reactor.

Cooling of the pre-stabilised precursor can take place in a cooling zone. The pre-stabilised precursor is passed though the cooling zone prior to its entry in to the oxidation reactor.

In one embodiment, the cooling zone may be provided by a cooling chamber positioned in between the pre-stabilisation reactor and the oxidation reactor.

In an alternative embodiment, the cooling zone may be part of the pre-stabilisation reactor and be provided by a cooling section within the pre-stabilisation reactor. In such embodiments, the cooling zone can be designed to cool the pre-stabilised precursor prior to it exiting the pre-stabilisation reactor.

Cooling of the pre-stabilised precursor in a cooling zone may be achieved by active or passive means.

In some embodiments, active cooling of the pre-stabilised precursor may involve passing a flow of substantially oxygen-free gas, such as nitrogen gas, over or around the pre-stabilised precursor. In one embodiment, cooling of the pre-stabilised precursor may be achieved by flowing a substantially oxygen-free cooling gas over or around the pre-stabilised precursor. The cooling gas is of a temperature that is lower than that of the pre-stabilised precursor. In some embodiments, the cooling gas may be at a temperature in a range of from about 20° C. to about 240° C. However, it would be appreciated that this may depend on the temperature of the oxidation reactor into which the pre-stabilised precursor will enter, with the temperature of the cooling gas being selected such that it is relative cooler than the pre-stabilised precursor. In some embodiments, the pre-stabilised precursor may be exposed to a suitable cooling gas at ambient room temperature for a predetermined time period in order to cool the pre-stabilised precursor prior to its introduction to the oxidation reactor.

In other embodiments, active cooling of the pre-stabilised precursor may be achieved by flowing a substantially oxygen-free gas of an appropriate temperature over or around the pre-stabilised precursor at a flow rate or volume that facilitates the transfer of heat from the pre-stabilised precursor.

In other embodiments, active cooling of the pre-stabilised precursor may be achieved by passing the pre-stabilised precursor through a cooling chamber or cooling section having cooled internal surfaces that cool the atmosphere within the cooling chamber or cooling section. In turn, this cooled atmosphere is used to cool the pre-stabilised precursor. A coolant may be used for cooling the internal surfaces. In some embodiments, cooled internal surfaces may be used combination with a substantially oxygen-free cooling gas to cool the hot pre-stabilised precursor to a desired temperature.

In some embodiments, passive cooling of the pre-stabilised precursor may involve passing the pre-stabilised precursor though a cooling zone that is a void or space of a volume that facilitates the transfer of heat from pre-stabilised precursor.

The ability to rapidly form a stabilised precursor in accordance with one or more embodiments described herein can provide downstream advantages for carbon fibre manufacture, particularly in relation to the time required to form a carbon fibre. Thus the rate of carbon fibre production on a production line can be increased due to the rapid stabilisation process of the invention, leading to the ability to produce carbon fibre at faster rates and/or in higher volumes, compared to conventional carbon fibre manufacturing processes known in the art. Furthermore, processes described herein can also enable high volumes of carbon fibre to be produced more rapidly on an industrial scale. Thus manufacturing costs associated with carbon fibre manufacture can be reduced.

The present invention may thus also provide use of a stabilised precursor prepared by a stabilisation process of any one of the embodiments as described herein in the manufacture of a carbon-based material, such as carbon fibre.

As discussed above, carbon fibre prepared in accordance with processes described herein may be formed in a time period of no more than about 70 minutes, no more than about 65 minutes, no more than about 60 minutes, no more than about 45 minutes, or no more than about 30 minutes.

While processes herein have been described with reference to the production of carbon fibre, a skilled person would understand that the described processes can be used to prepare carbon-based material in non-fibre form. That is, when the precursor is in non-fibre form (e.g. yarn, web, film, fabric, weave or mat forms), the carbon-based material formed after carbonisation of the stabilised precursor may be in these other forms.

The present invention further provides a carbon fibre prepared by the process of any one of the embodiments described herein.

Advantageously, carbon fibre produced in accordance with processes of embodiments of the invention described herein may exhibit tensile properties that are at least equivalent to those produced by conventional carbon fibre manufacturing processes employed in industry.

Additionally, carbon fibres made from stabilised precursors prepared in accordance with the stabilisation process of the invention can exhibit a different crystal structure, compared to carbon fibres known in the art. For instance, carbon fibres prepared with a stabilised precursor manufactured in accordance with the invention described herein and can exhibit a larger apparent crystallite size (Lc (002)) relative to a carbon fibre formed with a comparative convention stabilised precursor. In some embodiments, the Lc (002) for the carbon fibre may be at least 20% larger than that observed for a carbon fibre obtained from a comparative stabilised precursor.

The invention will now be described with reference to the following examples. However, it is to be understood that the examples are provided by way of illustration of the invention and that they are in no way limiting to the scope of the invention.

EXAMPLES

Characterisation Methods
Mechanical Testing

The mechanical properties of single fibre samples were tested on a Textechno Favimat+single-filament tensile tester fitted with a 'Robot 2' sample loader. This instrument automatically records the linear density and force extension data for individual fibres loaded into a magazine (25 samples) with a pretension weight of (~80-150 mg) attached to the bottom of each fibre. The instrument uses a 210 cN load cell and clamps with a surface area of 4×4 mm². The clamping force was set at 45 N.

Differential Scanning Calorimetry

Thermally induced transitions were measured using a differential scanning calorimeter (DSC, TA, Q200 Series) from TA instruments. Three milligrams of samples were heated from 100° C. to 400° C. at a heating rate of 20° C./min under nitrogen and air atmosphere. Using methodology developed by Tsai et al (J.-S. Tsai, H.-N. Hsu, J. Mater. Sci. Lett., 11 (1992) 1403-1405), the rate of the stabilisation of polyacrylonitrile fibres were calculated using the following equation:

$$\text{Conversion index (\%)} = \left(\frac{H_0 - H_1}{H_0}\right) \times 100 \quad (1)$$

where $H_0$ is the area under the exothermic peak of the precursor, and $H_1$ is the area under the exothermic peak of the sample undergoing the stabilisation. All areas under the exothermic curve were calculated using sigmoid integration from baseline to baseline.

Fourier Transform Infrared Spectroscopy

Chemical changes induced during the stabilisation of samples were analysed using a Bruker Lumos FT-IR microscope equipped with a germanium crystal. Each sample was measured using the attenuated total reflectance mode (ATR). Uniform pressure was applied between the crystal and samples for each measurement. Each measurement was taken from 600 cm$^{-1}$ to 4000 cm$^{-1}$ with an average of 128 scans and a resolution of 4 cm$^{-1}$.

The quantity of cyclised nitrile groups in the stabilised sample was calculated according to the method developed by Collins et al, Carbon, 26 (1988) 671-679. The quantity of cyclised nitrile groups was expressed as an extent of reaction (% EOR), which was determined in accordance with the following formula:

$$EOR\ (\%) = \frac{(100 \times 0.29 \times \text{Abs}(1590))}{((\text{Abs}(2242) + (0.29 \times \text{Abs}(1590)))} \quad (2)$$

where Abs (1590) and Abs (2242) are the absorbance of the peaks recorded at the corresponding wavenumber.

The ratio of CH/CH$_2$ functional groups, known as dehydrogenation index (DI), was calculated using the method of Nunna, Srinivas, et al. Polymer Degradation and Stability, 125 (2016): 105-114, using following formula, where Abs (1360) and Abs (1450) are the measured absorbance of CH and CH$_2$ functional groups, respectively.

$$\text{Dehydrogenation index} = \text{Ratio}\frac{CH}{CH_2} = \frac{\text{Abs}(1360)}{\text{Abs}(1450)} \quad (3)$$

Density

The mass density of polyacrylonitrile precursor, stabilised polyacrylonitrile precursor and carbon fibres were measured at 23° C. using a density gradient column method in accordance with ASTM D1505-10: Standard Test Method for density of Plastics by the Density-Gradient Technique. Two columns were used. The first column was filled with a mixture of potassium iodide and distilled water solution to characterize precursors and stabilised fibres with gradient from 1.17 to 1.45 g/cm³. The other column was used to characterize the density of the carbon fibre produced and filled with 3-ethylphosphate and 1,3-dibromopropane with a gradient from 1.60 to 1.90 g/cm³.

X-Ray Diffraction (XRD)

Wide angle X-ray diffraction experiments were performed in accordance with literature procedure (F. Liu et al, Effect of microstructure on the mechanical properties of PAN-based carbon fibres during high-temperature graphitization, J Mater Sci 43(12) (2008) 4316-4322). XRD was performed on samples using X-pert pro PANalytical XRD equipped with a Cu-Kα radiation source (λ=1.5406 Å). The X-ray tube was set to 40 kV and 30 mA. The diffraction peaks for the samples were obtained by conducting an absolute measurement with a point focus varying between 5° and 60°. Prior to measurements, fibres samples were aligned on a low noise silicon background. The apparent crystallite size and d-spacing of the samples were obtained using Equations 4 and 5.

$$\text{Scherrer equation: } L_c = \frac{K\lambda}{B\cos\theta} \quad (4)$$

$$\text{Bragg equation: } n\lambda = 2d\sin\theta \quad (5)$$

Where "B" is the full width at half maximum (FWHM) intensity for the diffraction peaks corresponding to the different crystal planes studied and "k" is a constant equal to 0.89. The diffraction angles 2θ of PAN precursor and oxidised fibres were 2θ=~17° and 2θ=~25.5° for the crystal plane (100) and (002), respectively. For the carbon fibres, only the diffraction angle 2θ=~25.5° corresponding to crystal planes (002) was considered. In the equation (5), "d" correspond to the spacing between crystal planes. Curve fitting was applied in order to calculate FWHM and centre of the diffraction peaks. The apparent crystallite size and d-spacing were calculated by considering the standard error for the peak centre and FWHM values.

Thermogravimetric Analysis (TGA)

The weight loss of the samples was determined via thermogravimetric analysis using a TA Instruments Q50 thermogravimetric analyser (USA). Three milligrams of fibres were tested under nitrogen atmosphere from 100 to 600° C. at a heating rate of 20° C./min. Experiments were performed in triplicate and results shown are an average.

Experimental

Comparative Example 1 (CE-1)—Production of Stabilised Fibres and Carbon Fibres with No Pre-Stabilisation (Baseline The precursor used for this study was a commercial polyacrylonitrile (PAN) which include 24000 filaments (1.3 dtex) containing acidic comonomers coated with a sizing. Carbon fibres were prepared using the Carbon Nexus production line at Deakin University, Australia.

The PAN precursor was stabilised in air atmosphere by passing through a set of ovens operating with 4 different temperature zones. The total dwell time for the oxidation was 68 minutes. Material handling drives are used to control the tension applied to the precursor. A first drive (Drive 1) is located before temperature zone 1. A second drive (Drive 2) is located between temperature zones 1 and 2. A third drive (Drive 3) is located after temperature zone 2. A fourth drive (Drive 4) is located after zone 4.

The stabilised precursor was then carbonised by heating in nitrogen in a low temperature and high temperature furnace. The cumulated dwell time used for the carbonisation was 3.7 minutes. The process parameters are summarised in Table 1.

TABLE 1

Process parameters used for the baseline.

Oxidation ovens

| Process parameters | Zone 1 | Zone 2 | Zone 3 | Zone 4 |
|---|---|---|---|---|
| Temperature (° C.) | 233 | 244 | 254 | 264 |
| Tension (cN) | 2100 | 2300 | 2600 | 2800 |

Low temperature carbonisation furnace (LT)

| Process parameters | Zone 1 | Zone 2 | Zone 3 |
|---|---|---|---|
| Temperature (° C.) | 450 | 650 | 850 |
| Tension (cN) | | 1100 | |

High temperature carbonisation furnace (HT)

| Process parameters | Zone 1 | Zone 2 |
|---|---|---|
| Temperature (° C.) | 1100 | 1500 |
| Tension (cN) | | 2700 |

Mechanical testing using the Favimat was performed and shown in Table 2.

TABLE 2

Mechanical properties and density of baseline carbon fibres.

| | Mechanical properties | | | |
|---|---|---|---|---|
| Products | Ultimate tensile strength (GPa) | Tensile modulus (GPa) | Elongation to break (%) | Mass density (g/cm³) |
| PAN | 0.70 ± 0.08 | 14.68 ± 0.78 | 12.32 ± 1.28 | 1.182 |
| Oxidation zone 1 | 0.58 ± 0.02 | 14.46 ± 0.13 | 13.31 ± 0.52 | 1.223 |
| Oxidation zone 2 | 0.54 ± 0.07 | 13.00 ± 0.20 | 15.67 ± 0.95 | 1.262 |
| Oxidation zone 3 | 0.54 ± 0.02 | 11.87 ± 0.34 | 17.95 ± 1.29 | 1.331 |
| Oxidation zone 4 | 0.46 ± 0.03 | 10.50 ± 0.49 | 17.70 ± 2.69 | 1.367 |
| Carbon fibres | 4.52 ± 0.81 | 276.00 ± 8.16 | 1.79 ± 0.29 | 1.785 |

Regarding the mechanical testing results, the ultimate tensile strength and modulus decreased gradually along the stabilisation process. Showing an opposite behaviour, the elongation of the polymer gradually increases until zone 3 and then finally dropped in zone 4. The density was measured using the density column. The precursor did show a density of 1.182 g/cm³ characteristic of acrylic precursors. The density recorded for the stabilised fibre was 1.367 g/cm³. It has been reported into the literature that the density of the stabilised fibre should be located between 1.34 and 1.39 g/cm³ for the manufacture of carbon fibre having the best mechanical properties (Takuku et al, J. Appl. Polym. Sci., 30, (1985), 1565-1571).

The FT-IR technique was used to monitor chemical changes occurring during stabilisation. The FT-IR spectra of the commercial PAN fibre was characterised by the following characteristic peaks: 2242 cm$^{-1}$ (unreacted nitrile groups), 1730 cm$^{-1}$ (C=O from acidic comonomers), 1450 cm$^{-1}$ ($CH_2$ from the polymer backbone), 1260 cm$^{-1}$, 1090 cm$^{-1}$ and 1022 cm$^{-1}$ (various CH, CO, OH groups). When stabilisation occurred, cyclisation, dehydrogenation and oxidation chemical reactions took place. Peaks appearing at 1590 and 1365 cm$^{-1}$ in the stabilised fibre appeared related to cyclisation and dehydrogenation reaction products. The 1730 cm$^{-1}$ and 2242 cm$^{-1}$ peak decreased whereas a broad band from 1000 to 1700 cm$^{-1}$ formed synonym of stabilisation (Quyang et al, Polymer Degradation and Stability, 93 (2008), 1415-1421). The extent of the cyclisation reaction (EOR) was calculated for the stabilised fibre and showed a value of 68%.

DSC analysis was also performed on the stabilised fibre and did show a CI index of 70%.

Example 1—Pre-Stabilisation of PAN Precursor Fibre in Nitrogen (PSN-1) Using Isothermal Temperature Profile The precursor used for this study was a commercial polyacrylonitrile (PAN) which include 24000 filaments (1.3 dtex) containing acidic comonomers covered with a sizing.

The PAN precursor was heated under nitrogen in a reactor, which is a low temperature (LT) furnace, operating with 4 temperature zones, as illustrated in FIG. 1. The temperature of each heated zone was set at 300° C. operating at a temperature that is as high as possible without causing degradation of the precursor. The line speed was set to provide a dwell time in the heat and nitrogen atmosphere of 1 minute and 10 seconds in the furnace. The tension applied to the precursor fibre was set at a constant value of 3000 cN and regulated using material handling drives located upstream and downstream the furnace. The furnace was slightly over pressurized with nitrogen in order to inhibit of the ingress of oxygen. After the heat treatment in nitrogen, the fibre turned dark orange/copper without any sign of degradation or filament fusing.

Mechanical properties of the pre-stabilised fibre (PSN-1) and a PAN precursor were recorded using the Favimat. The results are shown in Table 3.

TABLE 3

Mechanical properties and density of PSN-1.

| Products | Mechanical properties | | | Mass density (g/cm$^3$) |
|---|---|---|---|---|
| | Ultimate tensile strength (GPa) | Tensile modulus (GPa) | Elongation to break (%) | |
| PAN | 0.70 ± 0.08 | 14.68 ± 0.78 | 12.32 ± 1.28 | 1.182 |
| PSN-1 | 0.51 ± 0.02 | 12.00 ± 0.46 | 14.84 ± 0.57 | 1.223 |

The ultimate tensile strength and tensile modulus were significantly impacted by the short nitrogen heat treatment. Indeed, the ultimate tensile strength and modulus properties of PSN-1 did show similar value to that encountered in zone 3 of the baseline sample (Example CE-1, Table 2). The mass density of PSN-1 recorded was equal to 1.223 g/cm$^3$ similar to the baseline PAN precursor after stabilisation in the first zone.

Figure 2:
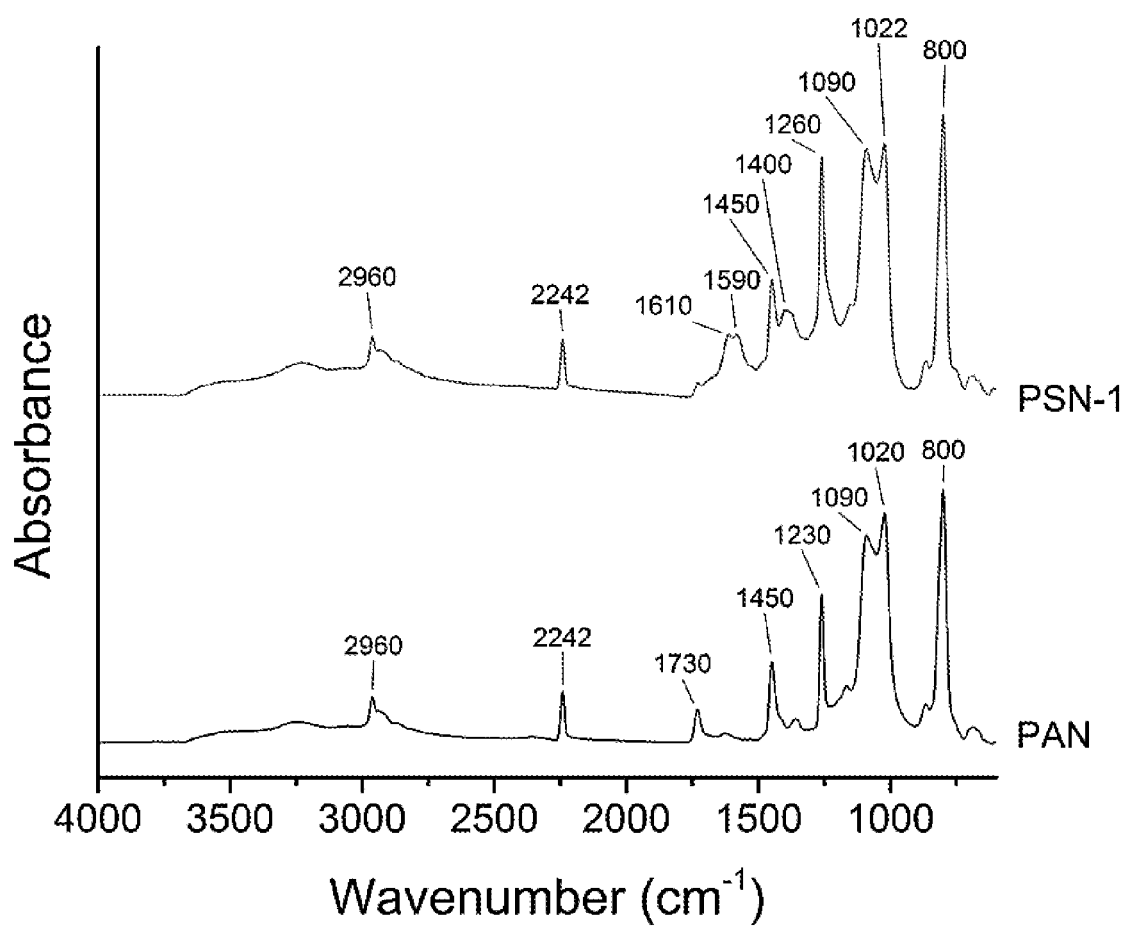
FIG. 2 shows FT-IR spectra of an untreated PAN precursor and a pre-stabilised PAN precursor fibre (PSN-1) that has been heated in a nitrogen atmosphere under an applied tension of 3,000 cN in accordance with an embodiment of a process of an aspect of the invention.

In addition to density measurements, FT-IR spectroscopy was also performed. FIG. 2 shows the FT-IR spectra of PSN-1 sample and the original PAN precursor. After the pre-stabilisation in nitrogen, the chemical structure of the precursor significantly evolved. A noticeable drop in intensity of the 1730 cm$^{-1}$ was recorded signalling a chemical conversion of acidic co-monomers triggering the formation of cyclised structures highlighted by the appearance of a peak located at 1590 cm$^{-1}$. An additional peak was also observed at 1616 cm$^{-1}$ ($\nu_{C=N}$) as a result of the splitting of the 1590 cm$^{-1}$$_{(C=C, C=N)}$ single peak usually seen under air atmosphere. PAN does not fully conjugate under nitrogen leading to an imine-enamine isomerism through the formation of dihydropyridine structures. With the progress of cyclisation reactions, dehydrogenation of polymer chains was also seen with the formation of the 1400 cm$^{-1}$ band in the PSN-1 sample. The extent of the cyclisation reaction (EOR) was calculated and demonstrated a value of 24%.

Additionally, fibres from the comparative example (CE-1) having the same coloration as the PSN-1 fibre were extracted and also tested. To reach the same colouration with the comparative stabilisation process, it took 5 minutes and 30 seconds, whereas with the pre-stabilisation step, the precursor fibre only required treatment for 1 minute and 10 seconds to achieve a dark orange/copper colour. FT-IR analysis was performed on the extracted sample. The % EOR in the fibre treated in accordance with the CE-1 process was calculated and was equal to 2%. Although the fibres had exactly the same colour, it appeared that the chemical structure of the PSN-1 fibre was significantly different (a % EOR of 2% for baseline versus a % EOR of 24% for PSN-1).

Example 2—Pre-Stabilisation of PAN Precursor Fibre in Nitrogen (PSN-2) Using a Step-Increase Temperature Profile The precursor used for this study was a commercial polyacrylonitrile (PAN) which include 24000 filaments (1.3 dtex) containing acidic comonomers covered with a sizing.

The PAN precursor was heated under nitrogen using a reactor having a set of heated zones configured to provide 4 temperature zones as previously described in Example 1 and shown in FIG. 1. Similar to process parameters used for PSN-1, the line speed was set in order to provide a dwell time in the heated zones of 1 minute and 10 seconds. The temperature set for zones 1 and 2 was 285° C. whereas the temperature set for zones 3 and 4 was 295° C. The tension applied to the fibre was set at a constant amount of 2300 cN. The furnace was slightly over pressurized with nitrogen in order to inhibit the ingress of oxygen.

Mechanical properties of PSN-2 were recorded (Table 4) and did show lower values for ultimate tensile strength and modulus than PSN-1. The measured elongation was higher than PSN-1.

TABLE 4

Mechanical properties and recorded density of PSN-2.

| Product | Mechanical properties | | | Mass density (g/cm$^3$) |
|---|---|---|---|---|
| | Ultimate tensile strength (GPa) | Tensile modulus (GPa) | Elongation to break (%) | |
| PSN-2 | 0.43 ± 0.03 | 10.18 ± 0.46 | 17.19 ± 0.73 | 1.214 |

Figure 3:
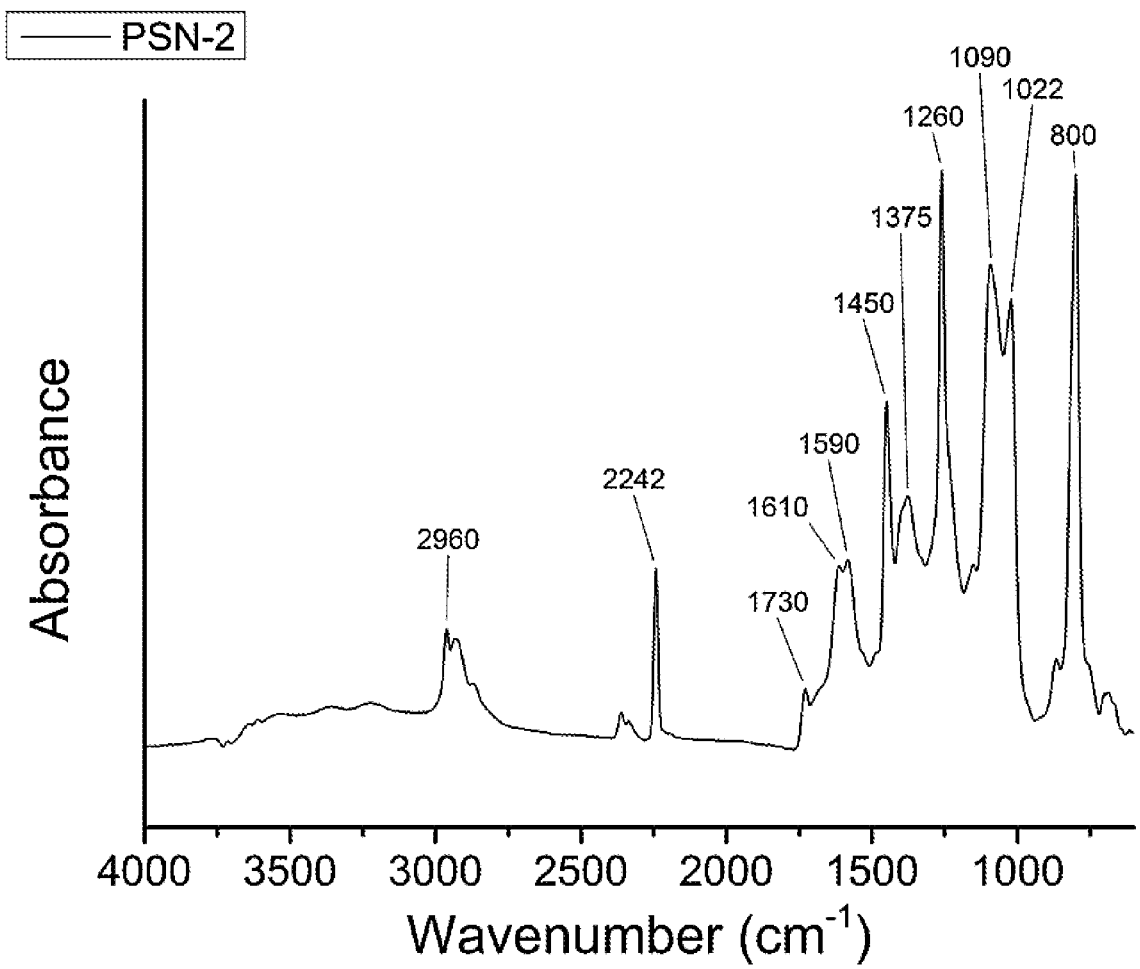
FIG. 3 shows an FT-IR spectrum of a pre-stabilised PAN precursor fibre (PSN-2) that has been heated in a nitrogen atmosphere under an applied tension of 2300 cN in accordance with an embodiment of a process of an aspect of the invention.

FT-IR spectra of PSN-2 was performed and showed on FIG. 3. PSN-2 had a chemical structure similar to PSN-1. The PSN-2 pre-stabilised precursor showed a calculated % EOR of 24%.

Example 3—Effect of Tension on Pre-Stabilisation of PAN Precursor

In this study, the influence of tension on the formation of cyclised structures was investigated.

A commercially sourced PAN precursor (24 K) containing acidic comonomers was used for the following experiments. A reactor having configured to provide 4 temperature controlled zones as previously described in Example 1 and shown in FIG. 1 was used. The reactor was purged and over-pressurized with high purity nitrogen to avoid any oxygen contact with the fibres.

The line speed was set to match a dwell time in the heated zones of the reactor of 1 minutes and 10 seconds. The temperature set for zone 1 and 2 was 290° C. whereas temperature set for zone 3 and 4 was 295° C. Three different tensions were selected and applied to the precursor fibre: 2500 cN (low), 2700 cN (medium) and 3000 cN (high), as shown in Table 5.

TABLE 5

Processing conditions used for the preliminary study for each sample.

| Sample name | Residence time in heat (min) | Temperature (° C.) | Tension (cN) | Tension (level) |
|---|---|---|---|---|
| PSN-3 | 1.1 | 300 | 2500 | Low |
| PSN-4 | | | 2700 | Medium |
| PSN-5 | | | 3000 | High |

It was visually observed that the pre-stabilised precursor fibre adopted a different colouration according to the tension applied to the PAN fibre during pre-stabilisation. It was observed that the precursor fibre adopted a darker colouration with the highest tension, highlighting a higher extent of chemical reactions.

FT-IR analysis of the original PAN precursor and pre-stabilised precursors showed that after the pre-treatment in inert atmosphere, significant chemical changes were observed. The reduction of the nitrile peak (2242 cm$^{-1}$) in accordance with the increase of the 1610 cm$^{-1}$ ($v_{C=N}$) region highlighted that cyclization had occurred under nitrogen treatment. The intensity of the peak located at 1730 cm$^{-1}$ (C=O functional groups) decreased which demonstrated the initiation of the cyclization chemical reactions by acidic comonomers. It was noted that chemical changes became more obvious at higher applied tensions. As shown with the decrease of the 1730 cm$^{-1}$ absorption band ($v_{C=O}$), with increasing tensions, higher content of acidic comonomers reacted which promoted chemical reactions. The extent of cyclization reaction (% EOR) was calculated for each set of fibres processed with different tensions. The results are shown in Table 6. Considering the very short residence time used for these experiments, the content of cyclic structure generated after pre-treatment was significant.

A decrease in $CH_2$ functional groups (1450 cm$^{-1}$), which was directly related to the increase of CH functional groups (1360 cm$^{-1}$), was also noticed on fibres processed at higher tensions. The ratio of $CH/CH_2$ functional groups was calculated according to Equation (3) and are shown in Table 6.

TABLE 6

Extent of cyclization reaction and $CH/CH_2$ ratio of nitrogen pre-treated fibres.

| Sample name | Tension (level) | EoR (%) | Ratio $CH/CH_2$ |
|---|---|---|---|
| PSN-3 | Low | 10.7 ± 0.5 | 0.46 ± 0.03 |
| PSN-4 | Medium | 16.3 ± 0.7 | 0.58 ± 0.02 |
| PSN-5 | High | 19.3 ± 0.4 | 0.65 ± 0.03 |

Mechanical testing was performed using the Favimat robot and results are shown in Table 7.

TABLE 7

Mechanical properties and density of PSN-3, PSN-4 and PSN-5.

| Products | Tension (cN) | Ultimate tensile strength (GPa) | Tensile modulus (GPa) | Mass density (g/cm$^3$) |
|---|---|---|---|---|
| PSN-3 | 2300 | 0.54 ± 0.02 | 11.72 ± 0.26 | 1.194 |
| PSN-4 | 2500 | 0.47 ± 0.02 | 11.57 ± 0.25 | 1.204 |
| PSN-5 | 3000 | 0.42 ± 0.05 | 10.98 ± 0.96 | 1.206 |

With the increasing tension, the ultimate tensile strength and modulus of the precursor dropped significantly, from 2300 cN to 3000 cN. It was also observed that higher tension increased the mass density of the precursor.

Figure 4:
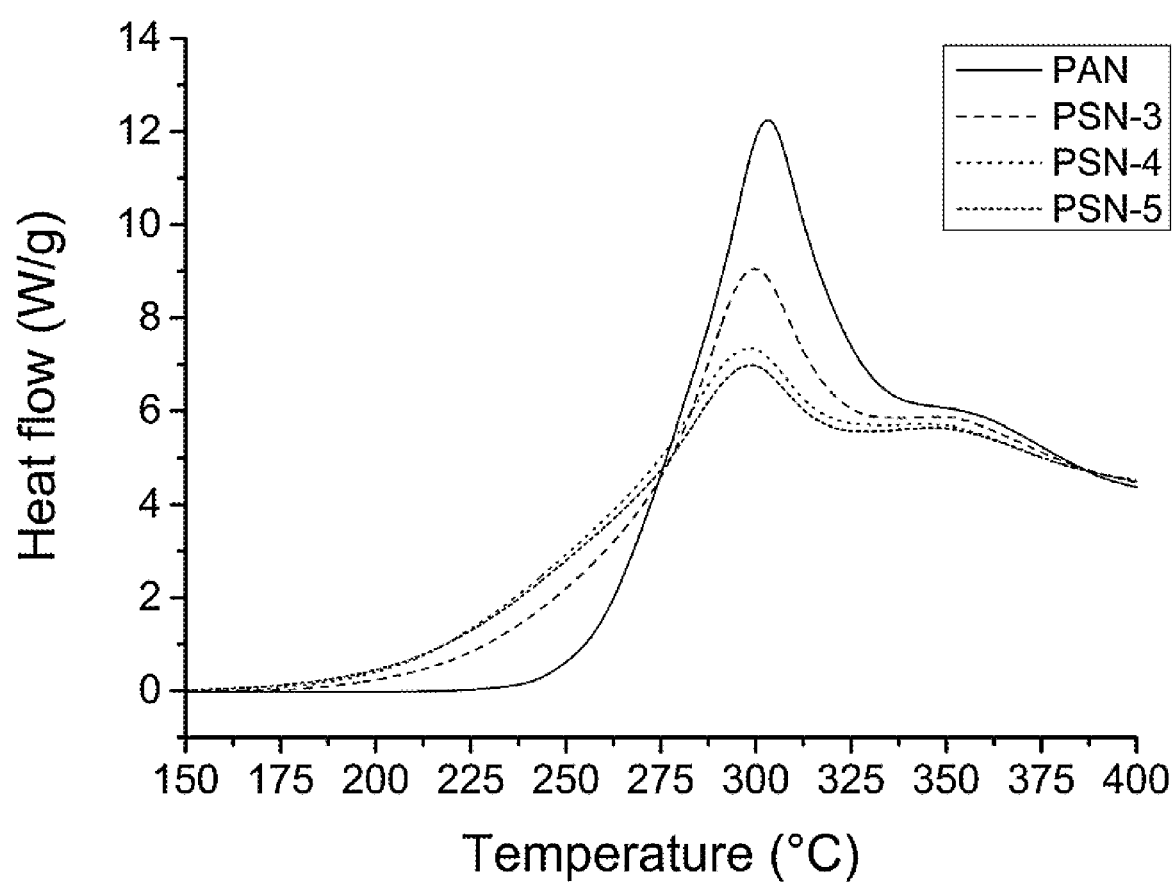
FIG. 4 shows DSC curves illustrating the heat flow for an untreated PAN precursor and pre-stabilised PAN precursor fibres heated in a nitrogen atmosphere under applied tensions of 2,300 cN, 2,500 cN and 3,000 cN (labelled as PSN-3, PSN-4 and PSN-5, respectively) in accordance with embodiments of a process of an aspect of the invention.

Differential scanning calorimetry (DSC) analysis was performed under air atmosphere, on the pre-treated PAN fibres in order to investigate their thermal behaviour (FIG. 4). The tension at which the fibre was processed significantly impacted the recorded enthalpy, with enthalpy being lowest at the highest tension used for the fibre pre-treatment. Interestingly, the thermal behaviour of pre-stabilised samples was different than the PAN precursor. The pre-stabilisation of the precursor in nitrogen drastically changed the kinetics of the chemical stabilisation reactions. The slope of the exothermic curve was significantly reduced which was translated into a carbon fibre manufacturing process operating under safer running conditions.

Figure 5:
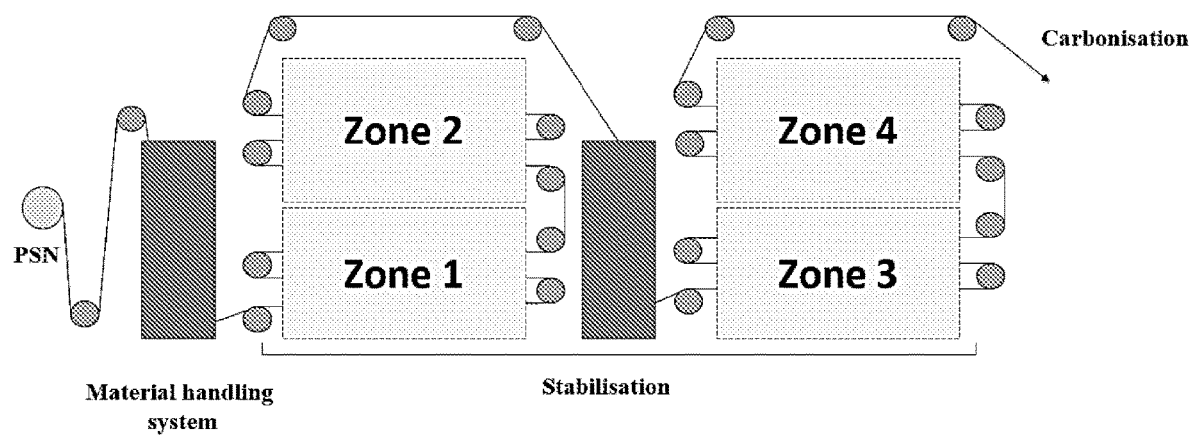
FIG. 5 shows a schematic of an oxidation process of an embodiment of one aspect of the invention performed in a reactor having four oxidation chambers providing four temperature zones, with a pre-stabilised precursor making multiple passes through each temperature zone.

Example 4—Rapid Stabilisation of Pre-Treated PAN Precursor in 60 Minutes and Formation of Carbon Fibres The pre-stabilised precursor PSN-1 from Example 1 was stabilised using a set of oxidation ovens with 4 temperature zones, as described for Comparative Example 1 (CE-1). The oven arrangement and oxidation process is illustrated in FIG. 5. The fibre path through the oxidation ovens was identical to example CE-1. Multiple passes through each of the ovens were made, resulting in PSN-1 being heated in air for 60 minutes to oxidise the pre-stabilised precursor fibre. The stabilised precursor was then carbonised in nitrogen, in a low temperature and high temperature furnace to form a carbon fibre. The cumulated dwell time for the carbonisation was 3.1 minutes. The process parameters employed for oxidation and carbonisation are summarized in Table 8.

TABLE 8

Process parameters for Example 4.

Oxidation ovens

| Process parameters | Zone 1 | Zone 2 | Zone 3 | Zone 4 |
|---|---|---|---|---|
| Temperature (° C.) | 210 | 219 | 232 | 240 |
| Tension (cN) | 3000 | 3150 | 3000 | 3400 |

Low temperature carbonisation furnace (LT)

| Process parameters | Zone 1 | Zone 2 | Zone 3 |
|---|---|---|---|
| Temperature (° C.) | 450 | 650 | 850 |
| Tension (cN) | | 1600 | |

High temperature carbonisation furnace (HT)

| Process parameters | Zone 1 | Zone 2 |
|---|---|---|
| Temperature (° C.) | 1100 | 1500 |
| Tension (cN) | 3400 | |

The oxidation temperature profile used for this trial was, on each zone, approximately 20° C. lower than the temperature employed for stabilising the precursor in the baseline comparative example (CE-1). This reduction of temperature was observed despite a reduction of the oxidation dwell time to stabilise the fibres (68 minutes for example CE-1 versus 60 minutes for Example 4). The pre-stabilised precursor fibre appeared to be extremely reactive when it was exposed to heat and an atmosphere containing oxygen (oxidation). The pre-stabilised precursor fibre did turn to completely black after being heated in zone 1. This type of black colouration is usually seen on zone 3 of the baseline process, which has no pre-stabilisation.

The evolution of mechanical properties of the PAN fibre along the stabilisation and carbonisation was measured using the Favimat. The results are shown in Table 9.

TABLE 9

Mechanical properties and recorded density of Example 4.

| Products | Ultimate tensile strength (GPa) | Tensile modulus (GPa) | Elongation to break (%) | Mass density (g/cm$^3$) |
|---|---|---|---|---|
| Oxidation zone 1 | 0.34 ± 0.03 | 10.79 ± 0.42 | 14.72 ± 2.19 | 1.245 |
| Oxidation zone 2 | 0.34 ± 0.02 | 10.82 ± 0.35 | 16.43 ± 2.29 | 1.278 |
| Oxidation zone 3 | 0.34 ± 0.02 | 11.04 ± 0.34 | 15.65 ± 1.68 | 1.324 |
| Oxidation zone 4 | 0.30 ± 0.04 | 11.47 ± 1.16 | 15.99 ± 1.45 | 1.350 |
| Carbon fibres | 3.73 ± 0.78 | 259.00 ± 8.68 | 1.56 ± 0.31 | 1.737 |

The tensile strength recorded after zone 1 stabilisation of the pre-stabilised PAN fibre was almost equal to the value of samples coming from zone 4 of the baseline trial (CE-1). The ultimate tensile strength of the fibre did not drastically evolve on zones 2, 3 and 4. The tensile modulus of carbon fibre usually decreases along the stabilisation process (Example CE-1). After zone 1, the tensile modulus significantly increased. This type of behaviour is usually seen in the carbonisation stage of a conventional carbon fibre manufacturing process and could be explained by the different chemical structure adopted after the nitrogen pre-stabilisation. Regarding the evolution of the elongation along the stabilisation, the baseline showed an increase until zone 3 and a slight drop. In this experiment, the elongation adopted a similar behaviour but the drop was recorded after zone 2. The mass density of the stabilised fibre (zone 4) recorded was equal to 1.350 g/cm$^3$.

The mechanical properties of the carbon fibre were 3.73 GPa and 259 GPa for the ultimate tensile strength and modulus, respectively.

The heat flow and thus the enthalpy under the exothermic curve of the stabilised fibre (zone 4) was recorded under nitrogen atmosphere using DSC. Although the stabilised fibres have been processed for a shorter time under a lower temperature, the sample showed a conversion index of 78% which was higher than the index recorded for the baseline (70%).

Figure 6:
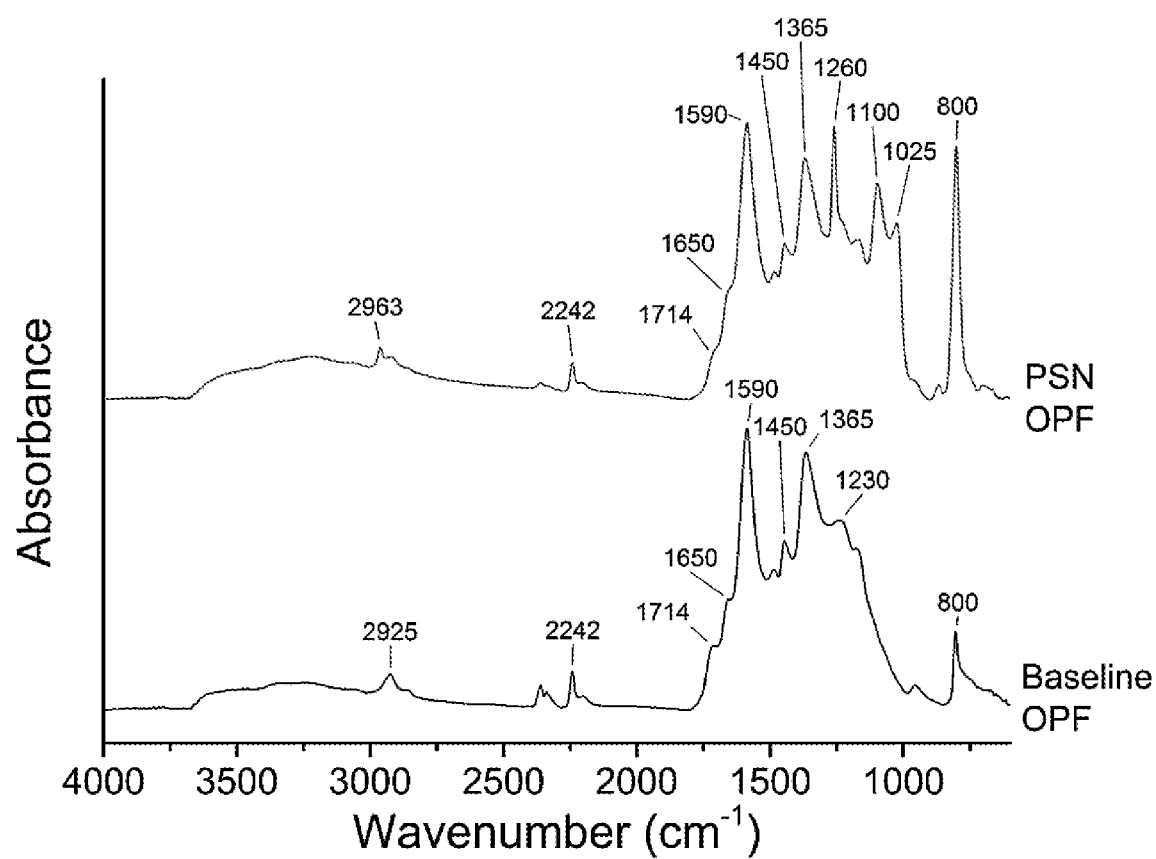
FIG. 6 shows FT-IR spectra of a stabilised PAN precursor (PSN OPF) produced by oxidising a pre-stabilised precursor in accordance with the process illustrated in FIG. 5, and a comparative stabilised PAN precursor (Baseline OPF).

The FT-IR spectra of stabilised samples from baseline (CE-1) and stabilised PAN precursor prepared in Example 4 (PSN OPF) are shown in FIG. 6. Along the thermo-stabilisation (baseline), the structure of polyacrylonitrile evolved towards a ladder type structure. Nitrile groups (2242 cm$^{-1}$) were converted into C=N groups through cyclisation and dehydrogenation reactions resulting in C=C groups (1590 cm$^{-1}$). When stabilisation occurs, CH$_2$ groups (1450 cm$^{-1}$) originally contained in the backbone of the polymer chains were converted into CH groups (1370 cm$^{-1}$) essentially through crosslinking and dehydrogenation of polymer chains. After stabilisation, a broad band from 1700 to 1000 cm$^{-1}$ was seen due to various modes of vibrations of C=C, C=O, C=N, C—C, C—CN groups contained in the stabilised product. Regarding the IR spectra of the stabilised sample, similar changes were seen for cyclisation and crosslinking reactions. However, significant structural changes were seen essentially on the lowest part of the FT-IR spectra. Additional or more intense peaks were seen at 800 cm$^{-1}$, 1022 cm$^{-1}$, 1260 cm$^{-1}$. The formation of these new peaks could be related to a higher amount of aromatic types of structures induced due by the nitrogen pre-treatment. The % EOR recorded for the stabilised fibre from Example 4 was 69%.

Figure 7:
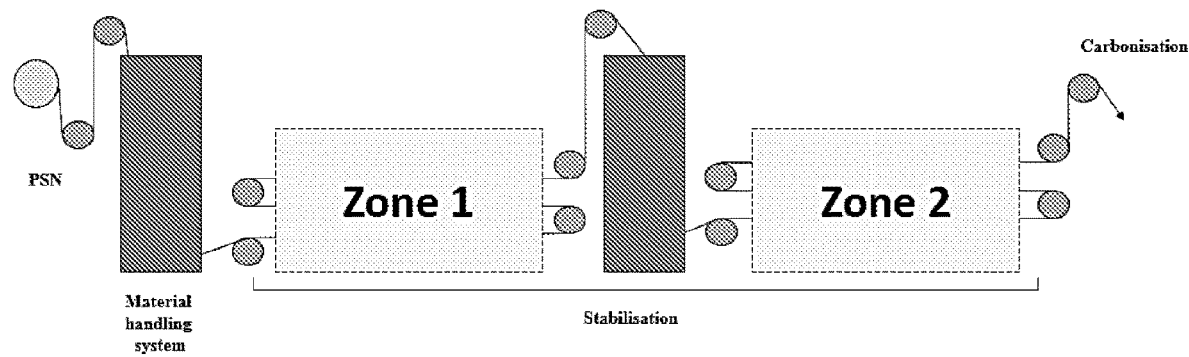
FIG. 7 shows a schematic of an oxidation process of an embodiment of one aspect of the invention performed in a reactor having two oxidation chambers providing two temperature zones, with a pre-stabilised precursor making multiple passes through each temperature zone.

Example 5—Rapid Stabilisation of Pre-Treated PAN Precursor in 30 Minutes and Formation of Carbon Fibre The pre-stabilised precursor PSN-1 from Example 1 was oxidised in a set of ovens operating as illustrated in FIG. 7. The line speed employed for this example was identical to that used in Example 4. However, only two heated zones were used for this example which shortened the oxidation dwell time to 30 minutes. The pre-stabilised precursor PSN-1 made multiple passes through each oven. The stabilised precursor was then carbonised in a low temperature and high temperature furnace to form a carbon fibre. The cumulated carbonisation dwell time was 3.1 minutes. The process parameters employed for oxidation and carbonisation are summarized in Table 10.

TABLE 10

Process parameters used for Example 5.

| | Oxidation ovens | |
|---|---|---|
| Process parameters | Zone 1 | Zone 2 |
| Temperature (° C.) | 244 | 258 |
| Tension (cN) | 3100 | 3200 |

| | Low temperature carbonisation furnace (LT) | | |
|---|---|---|---|
| Process parameters | Zone 1 | Zone 2 | Zone 3 |
| Temperature (° C.) | 450 | 650 | 850 |
| Tension (cN) | | 1600 | |

| | High temperature carbonisation furnace (HT) | |
|---|---|---|
| Process parameters | Zone 1 | Zone 2 |
| Temperature (° C.) | 1100 | 1500 |
| Tension (cN) | | 3200 |

Mechanical testing was performed and results are shown in Table 11.

TABLE 11

Mechanical properties and recorded density of Example 5.

| Products | Ultimate tensile strength (GPa) | Tensile modulus (GPa) | Elongation to break (%) | Mass density (g/cm$^3$) |
|---|---|---|---|---|
| Oxidation zone 1 | 0.46 ± 0.02 | 11.83 ± 0.32 | 16.70 ± 0.67 | 1.283 |
| Oxidation zone 2 | 0.35 ± 0.01 | 10.61 ± 0.26 | 15.91 ± 1.25 | 1.343 |
| Carbon fibres | 3.70 ± 0.75 | 243.88 ± 8.63 | 1.62 ± 0.31 | 1.783 |

Compared to Example 4, the ultimate tensile strength and modulus recorded for zone 1 stabilisation was higher. The tensile strength and modulus decreased after zone 2 similar to the traditional behaviour observed with the baseline sample. The density value of the stabilised fibre after oxidation in the two temperature zones was also recorded to be 1.343 g/cm$^3$. The carbon fibre produced in this industrial trial has a ultimate tensile strength of 3.70 GPa and a tensile modulus of 244 GPa.

The heat flow and thus the enthalpy under the exothermic curve of the stabilised fibre (zone 2) were recorded under nitrogen atmosphere using DSC. The sample showed a conversion index of 78%. This conversion index value registered was higher than the CE-1 baseline sample (70%).

Figure 8:
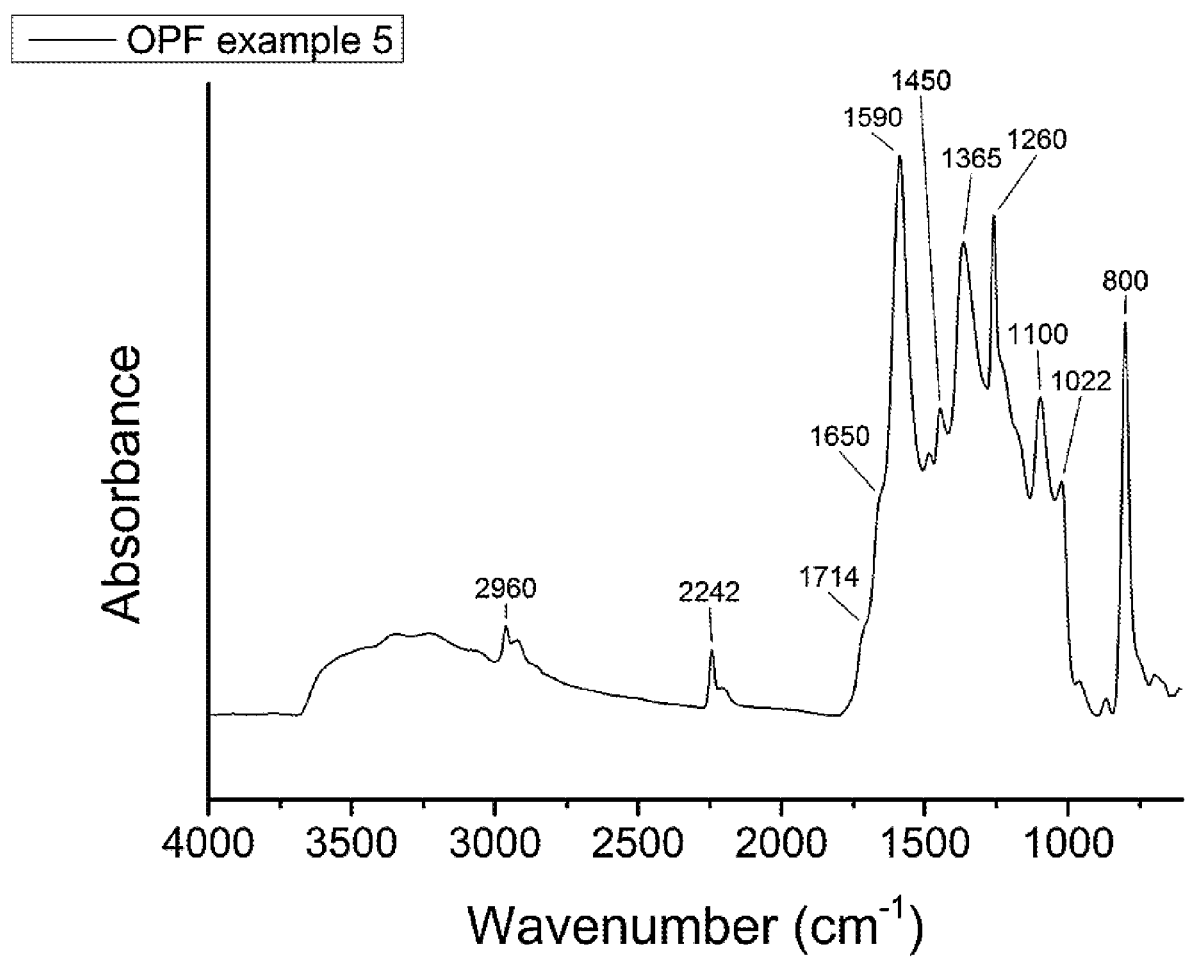
FIG. 8 shows an FT-IR spectrum of a stabilised PAN precursor fibre produced by oxidising a pre-stabilised precursor in accordance with the process illustrated in FIG. 7.

The FT-IR spectrum of the stabilised fibre produced after oxidation in zones 1 and 2 is shown in FIG. 8. The % EOR recorded for the stabilised fibre was 74%, which is slightly higher than the CE-1 baseline example.

Figure 9:
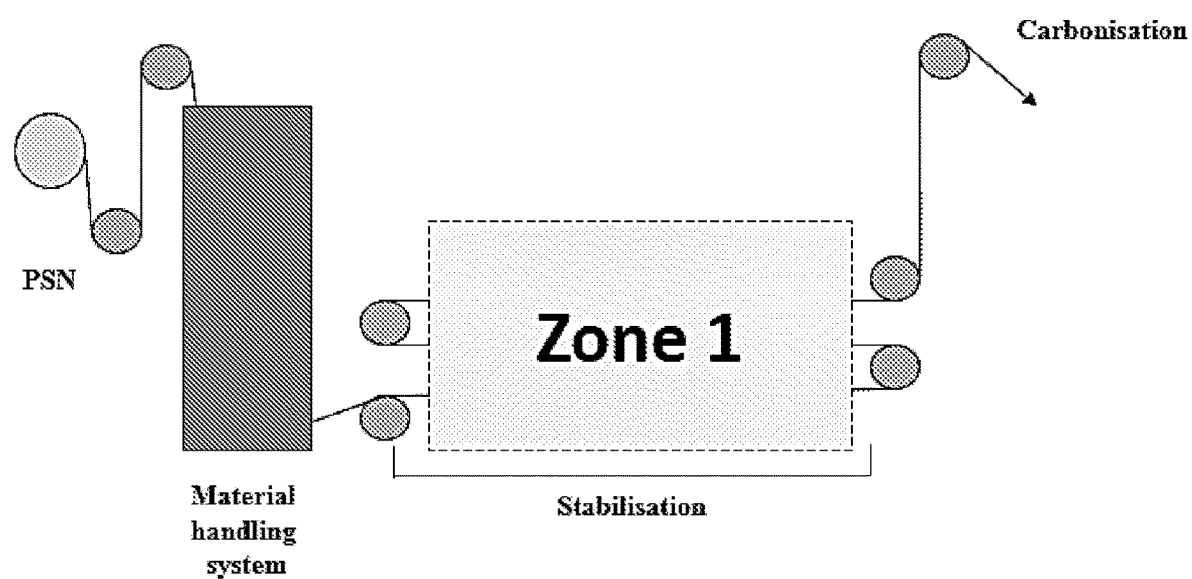
FIG. 9 shows a schematic of an oxidation process of an embodiment of one aspect of the invention performed in a reactor having a single oxidation chamber providing a single temperature zone, with a pre-stabilised precursor making multiple passes through the temperature zone.

Example 6—Rapid Stabilisation of Pre-Treated PAN Precursor in 15 Minutes and Formation of Carbon Fibres The pre-stabilised precursor PSN-1 from Example 1 was oxidised in a single temperature zone, as shown in FIG. 9. Similar to the trial of Example 5, the line speed was kept identical to that used in Example 4. For this example, only one oxidation oven providing a single oxidation zone was utilised, allowing the oxidation dwell time to be shortened to 15 minutes. The pre-stabilised precursor PSN-1 made multiple passes through the single oxidation oven. The stabilised precursor was then carbonised in a low temperature and high temperature furnace to form carbon fibres. The cumulated carbonisation dwell time was identical to Examples 4 and 5 (3.1 minutes). The process parameters employed for oxidation and carbonisation are summarized in Table 12.

TABLE 12

Process parameters used for Example 6.

| Oxidation oven | | | |
|---|---|---|---|
| Process parameters | Zone 1 | | |
| Temperature (° C.) | 258 | | |
| Tension (cN) | 3200 | | |
| Low temperature carbonisation furnace (LT) | | | |
| Process parameters | Zone 1 | Zone 2 | Zone 3 |
| Temperature (° C.) | 450 | 650 | 850 |
| Tension (cN) | | 1500 | |
| High temperature carbonisation furnace (PIT) | | | |
| Process parameters | Zone 1 | Zone 2 | |
| Temperature (° C.) | 1100 | 1500 | |
| Tension (cN) | | 3000 | |

The mechanical properties of materials along the process were measured using the Favimat (Table 13).

TABLE 13

Mechanical properties and recorded density of Example 6

| Products | Mechanical properties | | | |
|---|---|---|---|---|
| | Ultimate tensile strength (GPa) | Tensile modulus (GPa) | Elongation to break (%) | Mass density (g/cm³) |
| Oxidation zone 1 | 0.42 ± 0.01 | 10.95 ± 0.19 | 17.23 ± 1.04 | 1.304 |
| Carbon fibres | 3.56 ± 0.83 | 234.10 ± 7.11 | 1.68 ± 0.37 | 1.791 |

High performance carbon fibre was produced in this trial with a ultimate tensile strength of 3.56 GPa and a modulus of 234 GPa. Stabilised fibre coming from zone 1 in this trial had higher mechanical properties than the stabilised fibre coming from the baseline (CE-1).

The density value of the stabilised fibre produced by oxidation in a single temperature zone was also recorded and equal to 1.304 g/cm³. Despite the low density of the stabilised fibres, the material was thermally stable enough to be carbonised. This high thermal stability correlated to the enhanced chemical composition of the stabilised fibres formed using this process.

Figure 10:
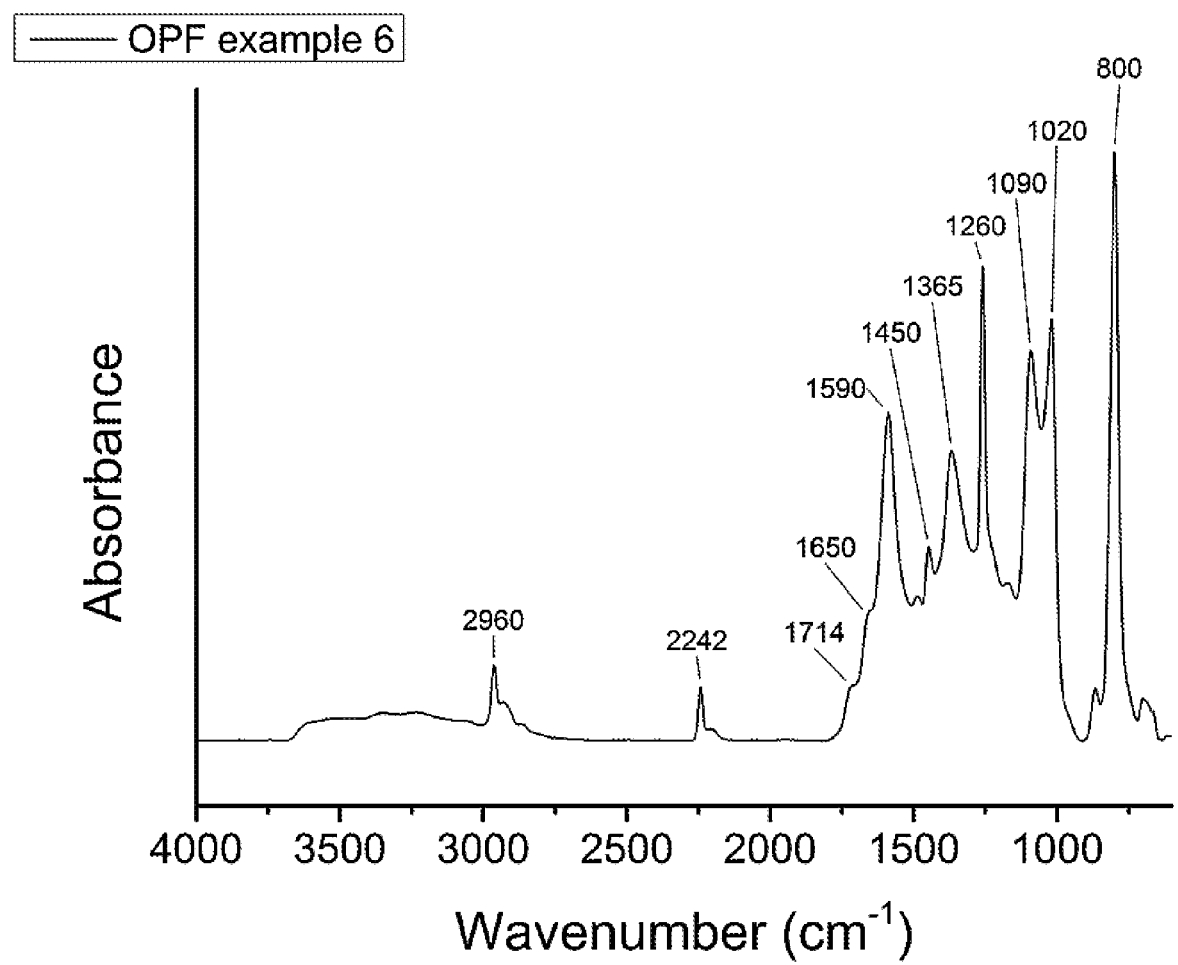
FIG. 10 shows an FT-IR spectrum of a stabilised PAN precursor fibre produced by oxidising a pre-stabilised precursor in accordance with the process illustrated in FIG. 9.

The FT-IR spectrum of the stabilised sample produced after oxidation in single temperature zone is shown in FIG. 10. The spectrum is similar that obtained for Examples 4 and 5. The absorption of the 800 cm$^{-1}$ was significant highlighting the formation of aromatic structures at higher processing temperatures. The % EOR of the stabilised sample was 64%. DSC experiments were also performed and a CI index of 65% was recorded.

Figure 11:
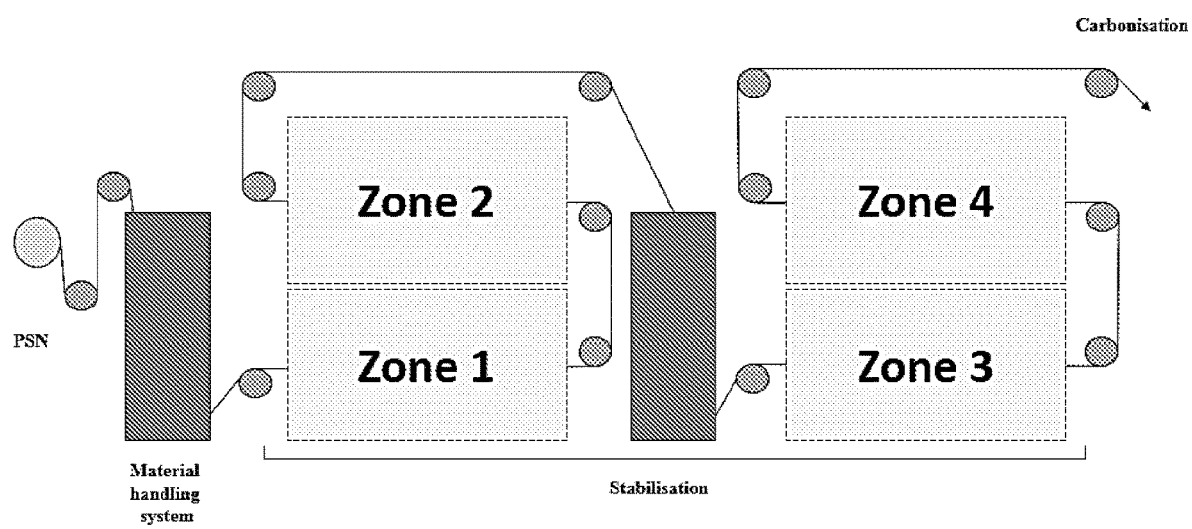
FIG. 11 shows a schematic of an oxidation process of an embodiment of one aspect of the invention performed in a reactor having four oxidation chambers providing four temperature zones, with a pre-stabilised precursor making a single pass through each temperature zone.

Example 7—Rapid Stabilisation of Pre-Treated PAN Precursor in 20 Minutes and Formation of Carbon Fibres The pre-stabilised precursor PSN-1 from Example 1 was oxidised by passing the pre-stabilised precursor once through four different ovens set at different temperatures, as shown in FIG. 11. A different set of tension was used for each pass. The pre-stabilised precursor PSN-1 made a single pass through each oven. The dwell time of the pre-stabilised fibre was 5 minutes per oven, thus a total oxidation time of 20 minutes. The line speed used was identical to that of Example 4. The stabilisation precursor was then carbonised in a low temperature and high temperature furnace to form a carbon fibre. The cumulated carbonisation dwell time was identical to that previously used in Examples 4, 5 and 6 (3.1 minutes). The process parameters employed for oxidation and carbonisation are summarized in Table 14.

TABLE 14

Process parameters used for Example 7.

| Oxidation ovens | | | | |
|---|---|---|---|---|
| Process parameters | Zone 1 | Zone 2 | Zone 3 | Zone 4 |
| Temperature (° C.) | 230 | 243 | 256 | 265 |
| Tension (cN) | 3000 | 3100 | 3200 | 3400 |
| Low temperature carbonisation furnace (LT) | | | | |
| Process parameters | Zone 1 | Zone 2 | Zone 3 | |
| Temperature (° C.) | 450 | 650 | 850 | |
| Tension (cN) | | 1650 | | |
| High temperature carbonisation furnace (HT) | | | | |
| Process parameters | Zone 1 | Zone 2 | | |
| Temperature (° C.) | 1100 | 1450 | | |
| Tension (cN) | | 3300 | | |

Mechanical testing was performed using the Favimat (Table 15).

TABLE 15

Tensile properties and recorded density for Example 7.

| | Mechanical properties | | | |
|---|---|---|---|---|
| Products | Ultimate tensile strength (GPa) | Tensile modulus (GPa) | Elongation to break (%) | Mass density (g/cm³) |
| Oxidation zone 1 | 0.34 ± 0.03 | 10.51 ± 0.70 | 16.95 ± 2.30 | 1.251 |
| Oxidation zone 2 | 0.38 ± 0.04 | 11.08 ± 0.75 | 17.45 ± 1.92 | 1.278 |
| Oxidation zone 3 | 0.38 ± 0.04 | 10.93 ± 0.37 | 14.82 ± 2.84 | 1.313 |
| Oxidation zone 4 | 0.32 ± 0.02 | 10.31 ± 0.34 | 15.04 ± 2.27 | 1.344 |
| Carbon fibres | 3.57 ± 0.52 | 240.74 ± 8.08 | 1.61 ± 0.23 | 1.799 |

Regarding results, it was observed that the ultimate tensile strength and modulus of the fibre remained similar along the stabilisation process. Similar to Example 5, the elongation increased in the first two zones and finally dropped in the last two zones. It was noted that the density of the carbon fibres produced in this example was higher than the baseline CE-1 example, which may be attributed to a different structural conformation of the carbon fibres.

Figure 12:
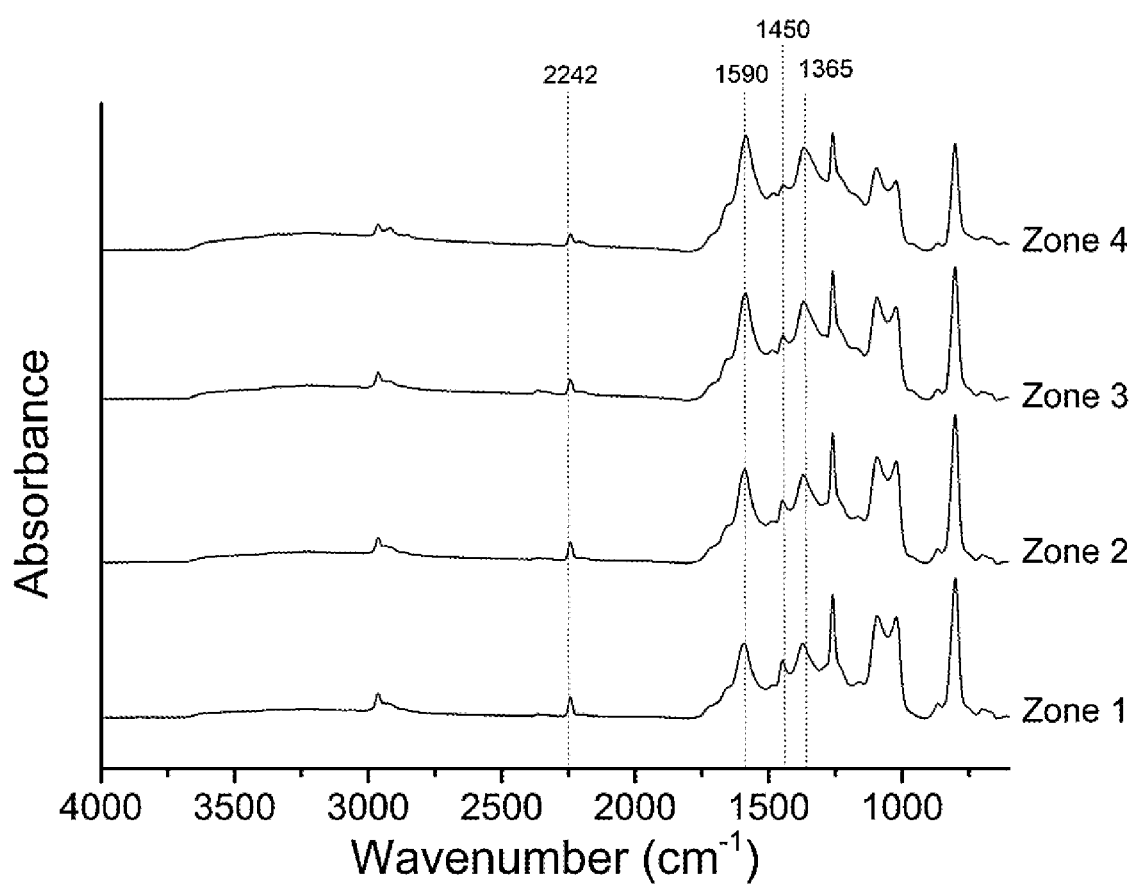
FIG. 12 shows FT-IR spectra of the pre-stabilised PAN precursor fibre after oxidation in each of the temperature zones shown in FIG. 11.
Figure 13:
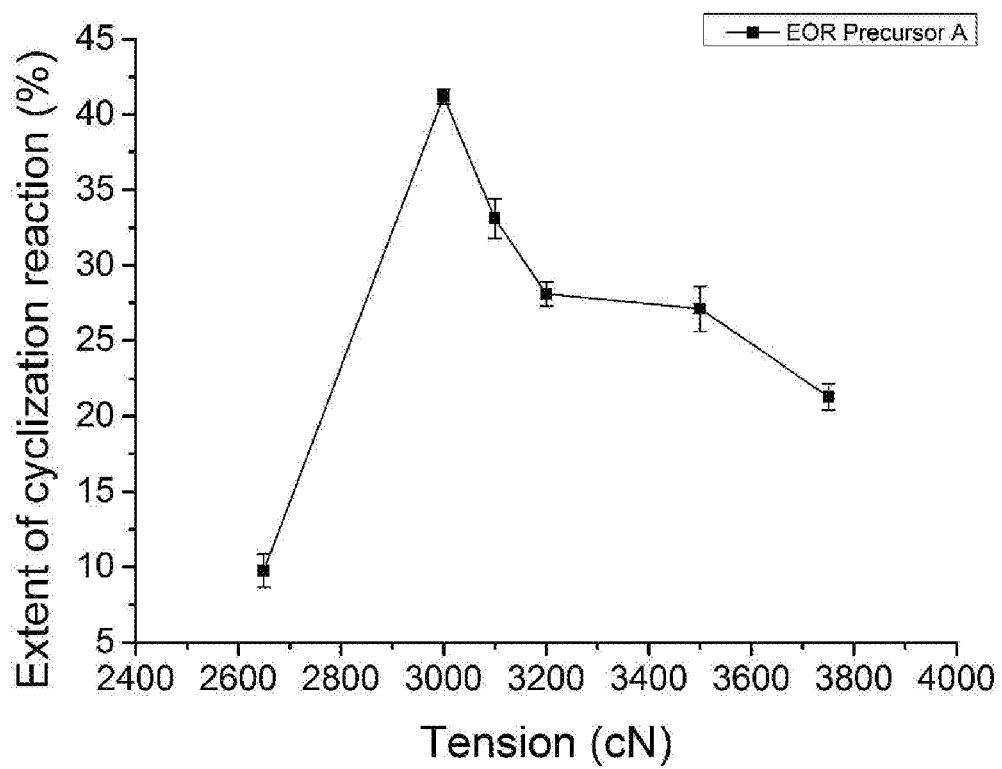
FIG. 13 shows a graph illustrating the change in % EOR with applied tension for a commercial PAN precursor having an oval cross sectional shape in the form of a 50K tow coated with sizing (Precursor A) stabilised in accordance with an embodiment of one aspect of the invention.

FT-IR analysis was performed on samples after oxidation in each different temperature zone (FIG. 12). Interestingly, the fibre adopted a chemical structure similar a stabilised fibre already after zone 1. This was confirmed with an elevated recorded % EOR value for zone 1. After pre-stabilisation treatment in nitrogen, it is believed that the fibre is in a activated state, allowing oxidative stabilisation chemical reactions to occur more rapidly and to a higher extent DSC experiments were also performed on each set of samples coming from the stabilisation process. The CI index was calculated and did show a value of 75% for the stabilised sample.

Results of FT-IR and DSC analysis are shown in Table 16.

TABLE 16

Extent of reaction and conversion index of Example 7 during stabilization (oxidation).

| Products | FT-IR EOR (%) | DSC CI (%) |
|---|---|---|
| Zone 1 | 51.2 ± 0.3 | 44.2 ± 1.1 |
| Zone 2 | 57.5 ± 1.3 | 53.4 ± 1.6 |
| Zone 3 | 61.3 ± 1.1 | 60.9 ± 0.8 |
| Zone 4 | 68.9 ± 0.9 | 75.2 ± 1.0 |

Example 8—Rapid Stabilisation and Carbonisation of Different PAN Precursor Fibres Different commercial polyacrylonitrile precursors were used in this experiment:
Precursor A: Large commercial polyacrylonitrile tow including 50.000 filaments (50K) with an oval cross sectional shape, covered with sizing. The chemical composition of this precursor includes copolymerized polyacrylonitrile with acidic comonomers (unknown composition).
Precursor B: Commercial polyacrylonitrile tow including 24.000 filaments (24K) with a round cross sectional shape, covered with a silicon based sizing. This fibre is made from copolymerized polyacrylonitrile with the following proportions: 93% acrylonitrile, 1% itaconic acid and 6% methyl methacrylate.

Rapid Pre-Stabilisation of PAN Precursor Fibres Under Nitrogen Atmosphere

Precursors A and B were each pre-stabilised using a furnace comprising 4 heated zones in a nitrogen atmosphere (FIG. 1).

The different precursor types were pre-treated under the same processing conditions except for the applied tension. The tensions being tested were selected to be appropriate for the tow size. For these trials, the line speed was set to provide a dwell time in the nitrogen atmosphere of 1 minute and 10 seconds. The temperature profile used was 285° C. for zones 1 and 2; and 295° C. for zones 3 and 4, respectively. The furnace was slightly over pressurized with nitrogen in order to inhibit any presence of oxygen.

In order to study the effect of the tension as a process parameter, the different precursor fibres were stabilised at different values of constant applied tension, as shown in Table 17. Samples were characterized using FT-IR, density columns and Favimat.

TABLE 17

Listing of samples generated during pre-stabilisation trials under nitrogen.

| Precursor | Tension (cN) | Reference |
|---|---|---|
| A | 2650 | A-2650 |
| | 3000 | A-3000 |
| | 3100 | A-3100 |
| | 3200 | A-3200* |
| | 3500 | A-3500 |
| | 3750 | A-3750 |
| B | 1500 | B-1500 |
| | 1600 | B-1600* |
| | 1700 | B-1700 |
| | 1800 | B-1800 |

Exposure to oxygen to form stabilised PAN precursor A larger quantity of pre-stabilised fibres for each different type of PAN precursor was produced for stabilisation. Fibres "A-3200" and "C-1600" in Table 17 were the candidates selected for further oxidation in air. The set up used for the oxidation step was similar for each precursor tested, and is illustrated in FIG. 11.

* Selected pre-stabilised PAN fibres produced in larger quantity for further stabilisation in oxygen and carbonisation.

Carbonisation and Formation of Carbon Fibre

Fully stabilised PAN fibres were carbonised under tension in a low and high temperature furnace under inert atmosphere. Two furnaces purged with nitrogen were used. The cumulated dwell time in heat for the carbonisation was 3.1 minutes. The low temperature furnace had 3 zones set up at 450° C., 650° C. and 850° C., respectively. The high temperature furnace had 2 zones set up at 1100° C. and 1500° C., respectively. All precursors were processed using the same processing conditions.

Results and Discussion

Precursor a

Pre-Stabilisation Under Nitrogen Atmosphere In order to determine a desired tension to be applied during pre-stabilisation, samples of precursor were initially heated under nitrogen at different tensions, from low to high (Table 17).

The samples treated under different applied tensions were analysed by FT-IR and the extent of reaction (% EOR) measured. The extent of the nitrile cyclisation reaction and how cyclisation varies with applied tension is shown on FIG.

13. It was observed that the curve adopted a "bell" shape suggesting that there was maximum intensity related to the formation of cyclic structure (43%). From this study, it appears that there is the existence of an amount of applied tension that promotes optimum amount of cyclised nitrile groups in the PAN precursor. For precursor A, the optimum tension for this precursor was 3000 cN.

Figure 14:
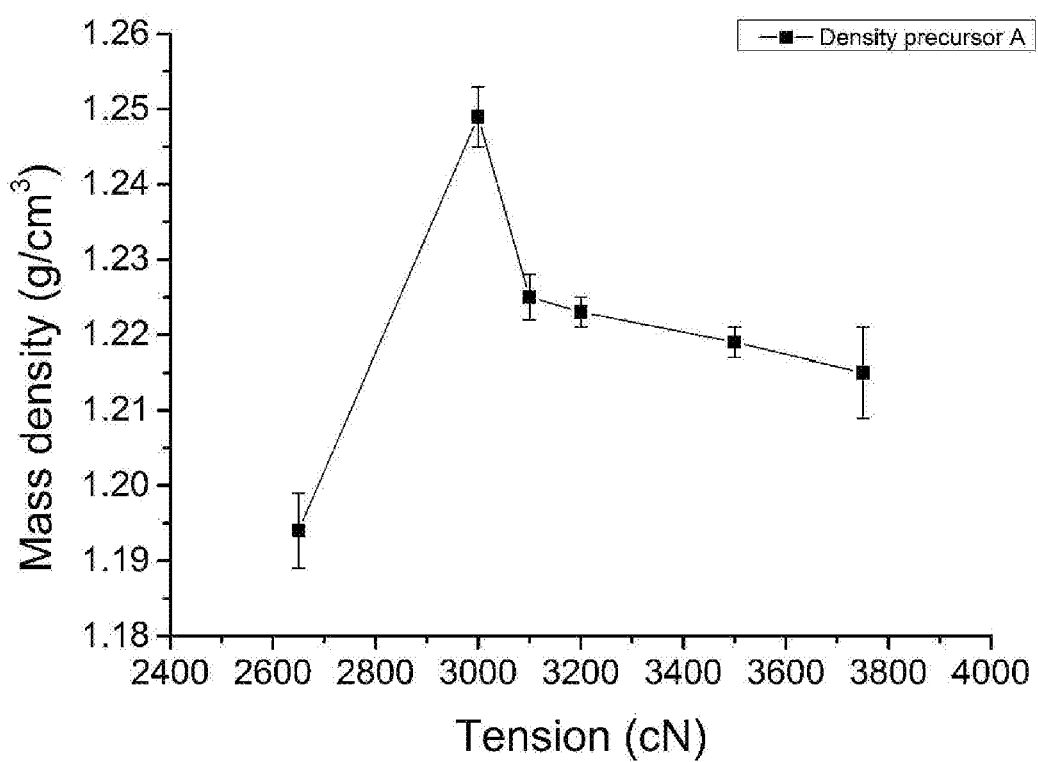
FIG. 14 shows a graph illustrating the change in mass density with applied tension for commercial PAN precursor (Precursor A) stabilised in accordance with an embodiment of one aspect of the invention.

The mass density of the various pre-stabilised samples was also tested and shown on FIG. 14 and Table 18. The same type of profile was observed similar to FT-IR. The sample at the maximum of the curve (applied tension of 3000 cN), which is correlated to the highest content of cyclic structure, had the highest mass density recorded.

Figure 15:
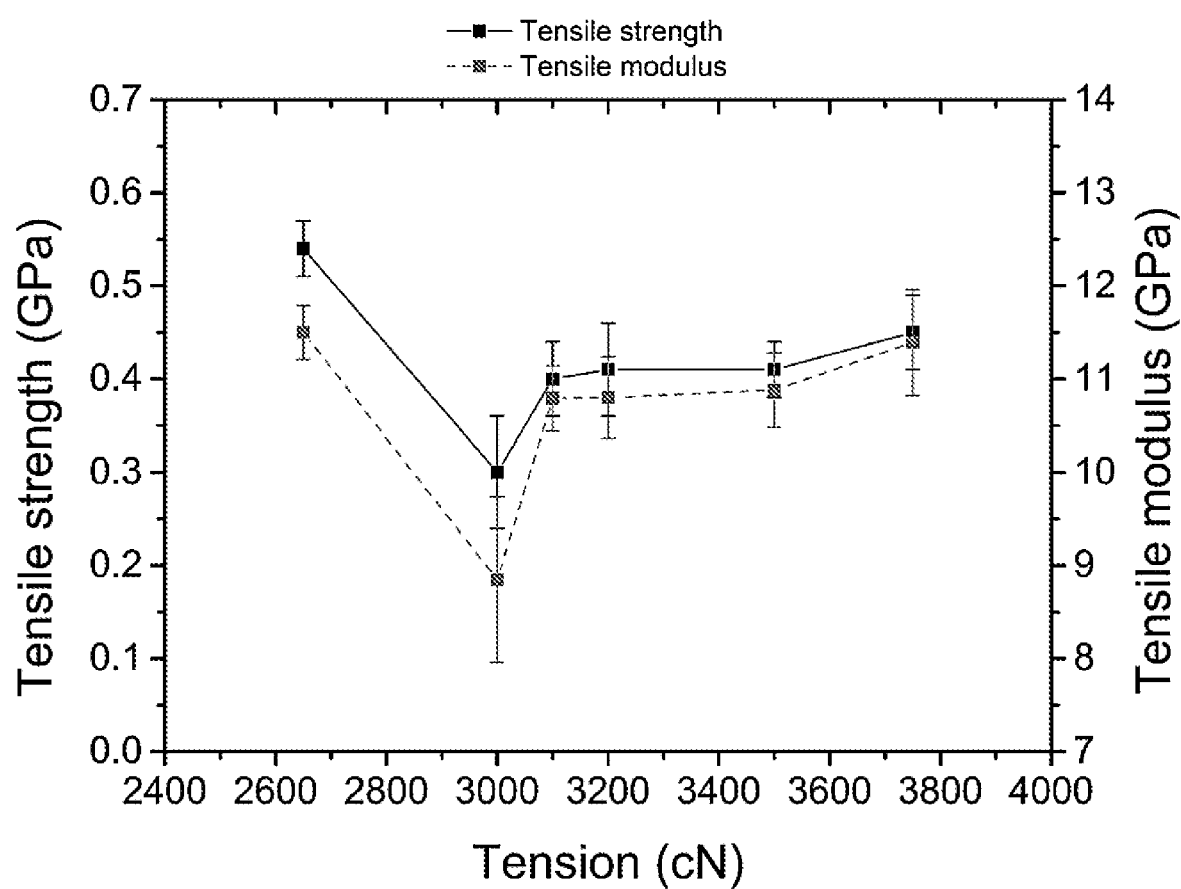
FIG. 15 shows graphs illustrating the change in tensile modulus and ultimate tensile strength with applied tension for commercial PAN precursor (Precursor A) stabilised in accordance with an embodiment of one aspect of the invention.

The mechanical properties of pre-stabilised fibres were determined using the single filament tester FAVIMAT. FIG. 15 shows the evolution of the ultimate tensile strength and tensile modulus of the pre-stabilised fibres processed under different applied tension. The results are also presented in Table 18. The curves presented an inverted trend compared to FT-IR and mass density results. The more the stabilisation proceeded, the weaker the system became. The minima of mechanical properties recorded for this precursor was located at 3000 cN.

TABLE 18

Mechanical properties and recorded density for samples of precursor A

| Products | Mechanical properties | | | Mass density (g/cm$^3$) |
|---|---|---|---|---|
| | Ultimate tensile Strength (GPa) | Tensile modulus (GPa) | Elongation to break (%) | |
| PAN-A | 0.64 ± 0.05 | 13.56 ± 0.23 | 14.06 ± 1.09 | 1.187 |
| A-2650 | 0.54 ± 0.03 | 11.50 ± 0.29 | 17.03 ± 0.95 | 1.194 |
| A-3000 | 0.30 ± 0.06 | 8.85 ± 0.89 | 15.40 ± 1.88 | 1.249 |
| A-3100 | 0.40 ± 0.04 | 10.79 ± 0.35 | 15.65 ± 1.69 | 1.225 |
| A-3200 | 0.41 ± 0.05 | 10.80 ± 0.44 | 15.70 ± 0.75 | 1.223 |
| A-3500 | 0.41 ± 0.03 | 10.88 ± 0.40 | 15.63 ± 0.98 | 1.219 |
| A-3750 | 0.45 ± 0.04 | 11.39 ± 0.57 | 14.40 ± 1.12 | 1.215 |

Rapid Conversion of Pre-Stabilised Precursor a into Carbon Fibre

The pre-stabilised fibre candidate "A-3200" was selected for trials involving continuous stabilisation in air and subsequent carbonisation in inert atmosphere. This precursor had an extent of reaction of 26%. The fibre was stabilised using 4 heated zones at different temperatures, using the set-up as shown in FIG. 11. Only one pass per zone was required. The residence time per zone was 5 minutes. The total residence time in oxidation was 20 minutes (4 single passes of 5 minutes in heat). The pre-stabilised precursor did change colour very quickly from orange to dark brown in a single pass of 5 minutes while being heated in air, demonstrating a highly catalysed system. After stabilisation, the fibre was carbonised using a low and high temperature furnace saturated with nitrogen. Process parameters used during the trial are shown in Table 19.

TABLE 19

Process parameters used to stabilise and carbonise the fibres "A-3200".

| Oxidation ovens | | | | |
|---|---|---|---|---|
| Process parameters | Zone 1 | Zone 2 | Zone 3 | Zone 4 |
| Temperature (° C.) | 274 | 237 | 250 | 263 |
| Tension (cN) | 3050 | 3300 | 3300 | 3550 |

| Low temperature carbonisation furnace (LT) | | | |
|---|---|---|---|
| Process parameters | Zone 1 | Zone 2 | Zone 3 |
| Temperature (° C.) | 450 | 650 | 850 |
| Tension (cN) | | 2930 | |

| High temperature carbonisation furnace (HT) | | |
|---|---|---|
| Process parameters | Zone 1 | Zone 2 |
| Temperature (° C.) | 1100 | 1500 |
| Tension (cN) | >3500 | |

Carbon fibres were produced from this trial and mechanical properties are shown in Table 20.

TABLE 20

Mechanical properties of the carbon fibres produced from precursor "A-3200"

| Product | Ultimate tensile strength (GPa) | Tensile modulus (GPa) | Elongation to break (%) |
|---|---|---|---|
| "A-3200 Carbon fibres" | 3.52 ± 0.43 | 227.12 ± 7.95 | 1.70 ± 0.20 |

Precursor B

Pre-Stabilisation Under Nitrogen Atmosphere

The precursor B fibre was stabilised in nitrogen at different applied tension (Table 17).

Figure 16:
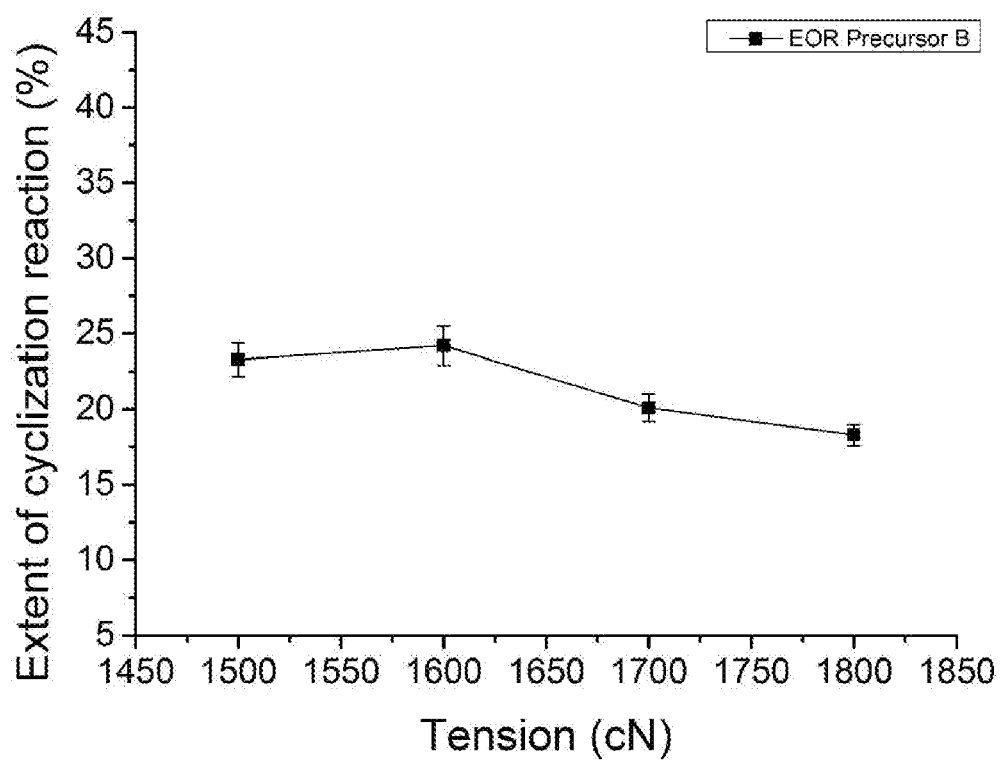
FIG. 16 shows a graph illustrating the change in % EOR with applied tension for a commercial PAN precursor having a round cross sectional shape, under the form of a tow which includes 24,000 filaments (1.6 dtex) coated with a silicon based sizing (Precursor B) stabilised in accordance with an embodiment of one aspect of the invention.
Figure 17:
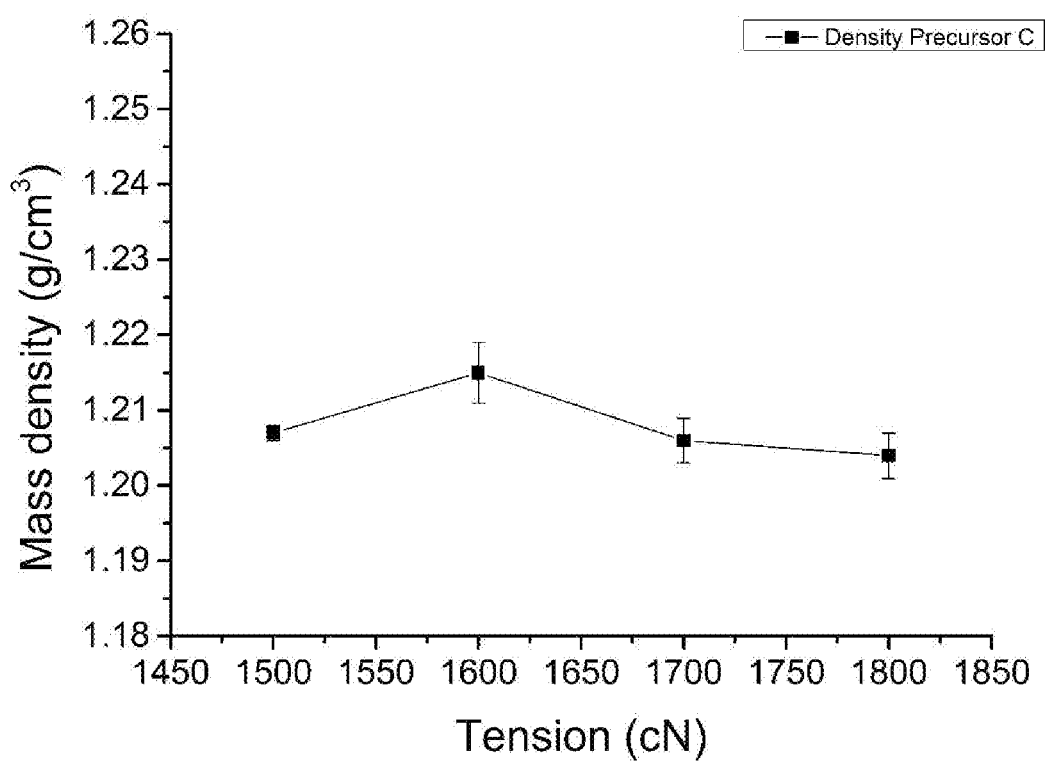
FIG. 17 shows a graph illustrating the change in mass density with applied tension for a commercial PAN precursor (Precursor B) stabilised in accordance with an embodiment of one aspect of the invention.
Figure 18:
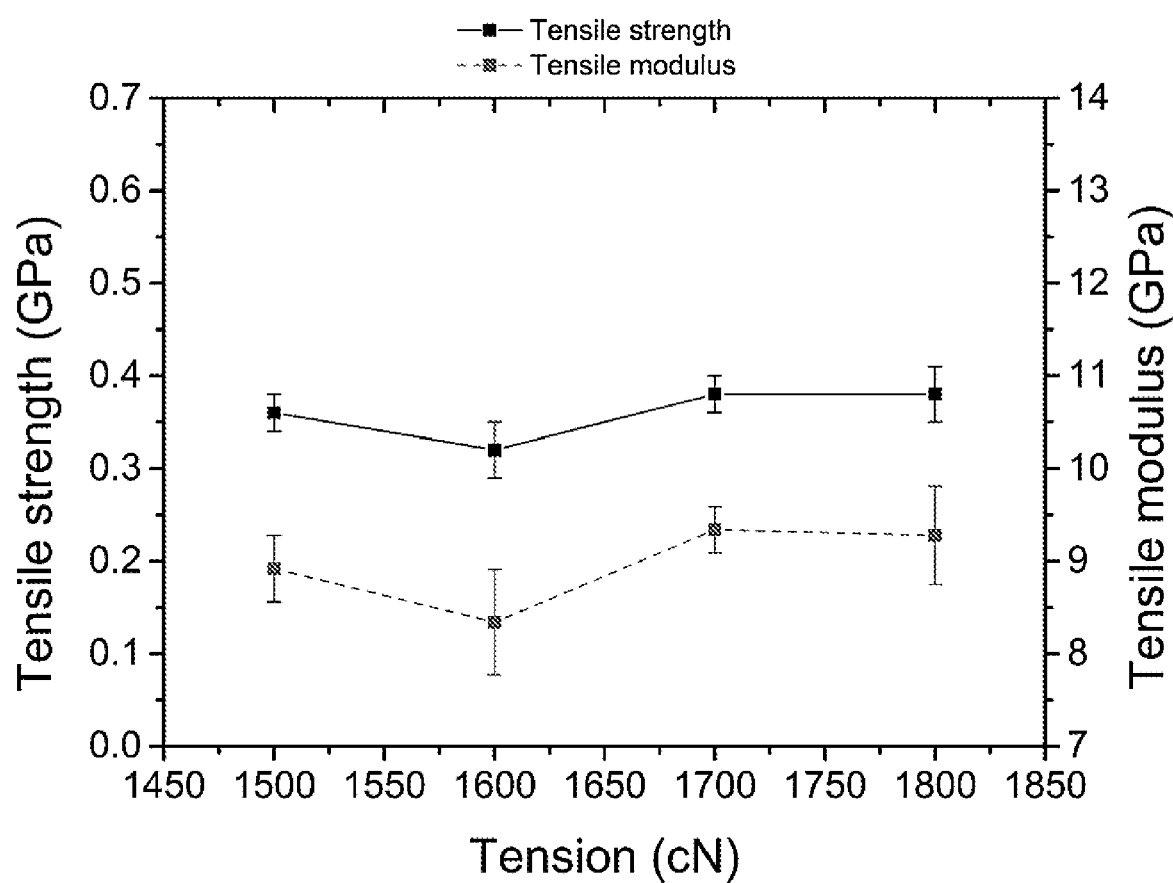
FIG. 18 shows graphs illustrating the change in tensile modulus and ultimate tensile strength with applied tension for a commercial PAN precursor (Precursor B) stabilised in accordance with an embodiment of one aspect of the invention.

FT-IR analysis was performed and highlighted again a maximum of extent of cyclisation reaction. In this case, the maximum nitrile cyclisation (24%) occurred at an applied tension of 1600 cN (FIG. 16). The mass density was the highest also for this tension. Mechanical testing was performed on the different sets of pre-stabilised fibres. The results are shown in Table 21 and FIG. 18. The ultimate tensile strength and tensile modulus of the different fibre samples showed a minimum at 1600 cN. When the content of cyclised nitrile groups is at a maximum, the mechanical properties recorded are the lowest. This behaviour has been observed for the different precursors tested in this study.

TABLE 21

Mechanical properties and recorded density for samples of precursor B

| Products | Mechanical properties | | | Mass density (g/cm$^3$) |
|---|---|---|---|---|
| | Ultimate tensile Strength (GPa) | Tensile modulus (GPa) | Elongation to break (%) | |
| PAN-B | 0.55 ± 0.04 | 10.83 ± 0.53 | 16.08 ± 0.85 | 1.182 |
| B-1500 | 0.36 ± 0.02 | 8.92 ± 0.36 | 21.38 ± 1.11 | 1.207 |
| B-1600 | 0.32 ± 0.03 | 8.34 ± 0.57 | 20.82 ± 1.98 | 1.215 |

TABLE 21-continued

Mechanical properties and recorded density for samples of precursor B

| | Mechanical properties | | | |
|---|---|---|---|---|
| Products | Ultimate tensile Strength (GPa) | Tensile modulus (GPa) | Elongation to break (%) | Mass density (g/cm³) |
| B-1700 | 0.38 ± 0.02 | 9.34 ± 0.25 | 19.45 ± 0.82 | 1.206 |
| B-1800 | 0.38 ± 0.03 | 9.28 ± 0.53 | 19.34 ± 1.20 | 1.204 |

Rapid Conversion of Pre-Stabilised Precursor B into Carbon Fibre

The candidate "B-1600" was manufactured in a larger quantity to allow industrial trials. This fibre had a measured extent of reaction of 24%. The pre-stabilised fibre was successfully stabilised in air. Again, the total residence time in an oxygen containing atmosphere was equal to 20 minutes. Following stabilisation in oxygen, fibres were carbonised in inert atmosphere using two furnaces. Details about process parameters used during the trial are shown in Table 22.

TABLE 22

Process parameters used to stabilise and carbonise the fibres "B-1600".

| | Oxidation ovens | | | |
|---|---|---|---|---|
| Process parameters | Zone 1 | Zone 2 | Zone 3 | Zone 4 |
| Temperature (° C.) | 228 | 243 | 252 | 265 |
| Tension (cN) | 2700 | 2700 | 2900 | 3000 |

| | Low temperature carbonisation furnace (LT) | | |
|---|---|---|---|
| Process parameters | Zone 1 | Zone 2 | Zone 3 |
| Temperature (° C.) | 450 | 650 | 850 |
| Tension (cN) | | 1200 | |

| | High temperature carbonisation furnace (HT) | |
|---|---|---|
| Process parameters | Zone 1 | Zone 2 |
| Temperature (° C.) | 1100 | 1500 |
| Tension (cN) | | 2200 |

Carbon fibres were produced from this trial and mechanical properties are shown in Table 23.

TABLE 23

Mechanical properties of the carbon fibres produced from precursor "B-1600"

| Product | Ultimate tensile strength (GPa) | Tensile modulus (GPa) | Elongation to break (%) |
|---|---|---|---|
| "B-1600 Carbon fibres" | 3.63 ± 0.49 | 243.89 ± 10.52 | 1.61 ± 0.23 |

The above experiments demonstrate that a variety of different stabilised PAN precursors can be produced rapidly and that the fully stabilised precursors can be successfully converted into carbon fibre delivering mechanical properties tailored for high volume automotive applications.

Example 9—Study of a Comparative Precursor Stabilisation Process Versus a Rapid Precursor Stabilisation Process in Producing Carbon Fibres Having Similar Tensile Properties In this example, a comparative process that represents a conventional precursor stabilisation process utilised in industry was compared against the rapid precursor stabilisation process of the invention.

Two industrial trials were conducted, using the same precursor feedstock (commercial PAN 24K containing acidic comonomers). Carbon fibres having similar mechanical properties were produced. Additionally, to allow further comparison of the oxidised PAN fibre (OPF) produced from both processes, a similar density in the stabilised precursor (OPF) was targeted. Fibres produced with the comparative process were stabilised over 96 minutes. Conversely, fibres manufactured with the rapid stabilisation process were stabilised in an oxygen containing atmosphere in 20 minutes. To allow the examination of both processes, fibre specimens were taken at the end of the oxidative stabilisation and carbonisation.

9.1 Processing Conditions Used for the Comparative Conventional Process

Commercial PAN fibres were continuously converted into carbon fibres using the carbon fibre production line at Carbon Nexus, Australia. PAN fibres were stabilised using four center-to-ends ovens providing four temperature zones, with multiple passes in each temperature zone. For the oxidative stabilisation, fibres were gradually heated under strict control of process parameters (tension, line speed, air flow, gas extraction, etc.). For this comparative oxidation process, the precursor fibre dwell time was 24 minutes per oven, resulting in a cumulative residence time of 96 minutes. The setup used to perform the comparative oxidation process is shown in FIG. 5. The tension was adjusted by varying the rotational speed of the driven rollers on the carbon fibre production line. Process parameters used for the stabilisation are summarised in Table 24.

TABLE 24

Process parameters used for the comparative conventional precursor stabilisation process

| | Oxidation ovens | | | |
|---|---|---|---|---|
| Process parameters | Zone 1 | Zone 2 | Zone 3 | Zone 4 |
| Temperature (° C.) | 225 | 235 | 245 | 255 |
| Tension (cN) | 2650 | 2750 | 2550 | 2650 |

Stabilised fibres were continuously carbonised in inert atmosphere in two furnaces, low and high temperature. Furnaces were purged with high purity nitrogen to avoid any oxygen contact with the fibres. Low temperature carbonisation was performed from 450 to 850° C. at a constant tension of 1200 cN and high temperature carbonisation was performed from 1200 to 1500° C. at a constant tension of 2200 cN, respectively. The total residence time for the carbonisation was 3.1 minutes.

9.2 Processing Conditions Used with the Rapid Stabilisation Process

For this continuous process, the nitrogen pre-treatment was performed using an industrial size furnace. The furnace was composed of 4 controllable heated zones, an input and output nitrogen seal and a nitrogen cooling chamber (FIG. 1). The furnace was purged with high purity nitrogen and the fibres were heated from zone 1 to zone 4 at a temperature of 285° C. and 295° C. for the two first and two last zones of the furnace, respectively. For the nitrogen pre-treatment, the fibre dwell time was 1 minute and 10 seconds in heat. The trial was performed under strict control of tension at 1600 cN. The measured extent of cyclization reaction (% EOR) for the nitrogen pre-treated fibres was 23%.

Nitrogen pre-treated fibres were further stabilised in air atmosphere using the same equipment as used for the comparative conventional process (FIG. 5). The line speed was initially set to allow a residence time for the oxidation equal to 5 minutes per zone, thus 20 minutes in total (FIG. 11). Process parameters used during the oxidation are summarised in Table 25.

TABLE 25

Process parameters used for the rapid precursor stabilisation process

| Process parameters | Oxidation ovens | | | |
|---|---|---|---|---|
| | Zone 1 | Zone 2 | Zone 3 | Zone 4 |
| Temperature (° C.) | 228 | 243 | 252 | 265 |
| Tension (cN) | 2700 | 2700 | 2900 | 3000 |

Stabilised fibres were carbonised using the same experimental set up used for the comparative conventional process for comparison purposes. Again, the total residence time for the carbonisation was 3.1 minutes.

9.3 Results

Fibres from both processes were characterised using X-ray, FT-IR, DSC, density column and tensile testing techniques. The results from each characterisation technique for PAN precursor, oxidised PAN fibres (OPF) and carbon fibres are summarised in Tables 26, 27 and 28.

PAN Precursor Fibres

TABLE 26

Material properties of PAN precursor

| Technique | Parameter tested | Precursor |
|---|---|---|
| XRD | Apparent crystallite size Lc (002) in nm | 1.616 ± 0.014 |
| | d-spacing (002) in A° | 3.343 ± 0.016 |
| | Apparent crystallite size Lc (100) in nm | 9.074 ± 0.173 |
| | d-spacing (100) in A° | 5.249 ± 0.020 |
| FT-IR | Ratio $CH/CH_2$ | 0.39 ± 0.05 |
| TGA | Weight loss at 600° C. in % (tested under nitrogen) | 49.3 ± 0.4 |
| Density column | Mass density (g/cm$^3$) | 1.184 ± 0.003 |
| Tensile testing | Ultimate tensile strength (GPa) | 0.55 ± 0.04 |
| | Tensile Modulus (GPa) | 12.07 ± 0.53 |
| | Elongation at break (%) | 16.08 ± 0.85 |

Oxidised PAN Fibres

TABLE 27

Material properties of oxidised PAN fibres extracted from the comparative conventional and rapid stabilisation processes

| | | Oxidised PAN fibres | |
|---|---|---|---|
| | Analysis Technique | Comparative conventional | Rapid stabilisation |
| Technique | Parameter tested | process | process |
| XRD | Apparent crystallite size Lc (002) in nm | 1.231 ± 0.041 | 1.024 ± 0.049 |
| | d-spacing (002) in A° | 3.467 ± 0.017 | 3.507 ± 0.021 |
| | Apparent crystallite size Lc (100) in nm | 2.192 ± 0.135 | 2.170 ± 0.163 |
| | d-spacing (100) in A° | 5.254 ± 0.070 | 5.244 ± 0.170 |
| FT-IR | Extent of cyclization reaction (%) | 68.1 ± 1.4 | 67.2 ± 1.2 |
| | Dehydrogenation ratio | 1.52 ± 0.09 | 1.73 ± 0.07 |
| DSC | Exothermal conversion index (%) in % (tested under nitrogen) | 53.5 ± 1.1 | 69.5 ± 0.9 |
| TGA | Weight loss at 600° C. in % (tested under nitrogen) | 25.5 ± 0.7 | 24.1 ± 0.9 |
| Density column | Mass density (g/cm$^3$) | 1.355 ± 0.005 | 1.357 ± 0.004 |
| Tensile testing | Ultimate tensile strength (GPa) | 0.31 ± 0.03 | 0.32 ± 0.03 |
| | Tensile Modulus (GPa) | 8.41 ± 0.64 | 9.21 ± 0.34 |
| | Elongation at break (%) | 26.75 ± 2.32 | 22.01 ± 2.31 |

Carbon Fibres

TABLE 28

Material properties of carbon fibres extracted from the comparative conventional and rapid stabilisation processes

| | | Carbon fibres | |
|---|---|---|---|
| | Analysis Technique | Comparative conventional | Rapid stabilisation |
| Technique | Parameter tested | process | process |
| XRD | Apparent crystallite size Lc (002) in nm | 1.783 ± 0.036 | 2.089 ± 0.077 |
| | d-spacing (002) in A° | 3.553 ± 0.018 | 3.527 ± 0.078 |

TABLE 28-continued

Material properties of carbon fibres extracted from the comparative conventional and rapid stabilisation processes

| | | Carbon fibres | |
|---|---|---|---|
| Analysis Technique | | Comparative conventional | Rapid stabilisation |
| Technique | Parameter tested | process | process |
| Density column | Mass density (g/cm$^3$) | 1.774 ± 0.003 | 1.798 ± 0.005 |
| Tensile testing | Ultimate tensile strength (GPa) | 3.36 ± 0.51 | 3.51 ± 0.03 |
| | Tensile Modulus (GPa) | 223.0 ± 10.4 | 229.9 ± 12.6 |
| | Elongation at break (%) | 1.51 ± 0.22 | 1.61 ± 0.19 |

9.4 Discussions

X-Ray Analysis

The structural composition of the initial PAN precursor, the stabilised precursors, and carbonised fibres were characterised using X-ray spectroscopy. The crystal structure of the stabilised and carbon fibres from the comparative conventional and rapid stabilisation process was analysed. In this study, the apparent crystallite size Lc(002) and Lc(100) was determined using Scherrer's equation (formula 4). When carbon fibres were analysed, it was observed that the apparent crystallite size Lc (002) was at least 20% larger with the rapid stabilisation process although fibres spent significantly less time in heat (21% of the residence time compared to comparative conventional process). This finding highlighted the different crystal structure adopted by the fibre induced by the different chemical composition of the stabilised fibre through the rapid stabilisation process.

In addition to the differences observed with the carbon fibres, noticeable discrepancies were also observed with the stabilised fibres extracted from both processes. The apparent crystallite size Lc(002) of the stabilised precursor fibre extracted from the rapid stabilisation process was 20% smaller than that observed in the stabilised precursor fibre formed by the comparative conventional process. In opposition, no distinguishable differences were seen with the apparent crystallite size Lc(100). The d-spacing between crystal planes was also analysed for stabilised and carbonised samples using formula (5). The d-spacing (100) was similar for stabilised fibres extracted from both processes. It was noted that the d-spacing (002) of stabilised precursor fibre formed by the rapid stabilisation process was slightly larger (4%) than that observed for the stabilised precursor formed by the comparative process.

FT-IR Spectroscopy

The chemical composition of the stabilised fibres was characterised using the FT-IR technique. The extent of cyclization reaction was calculated (formula 2) for stabilised fibres extracted from both the comparative convention and rapid stabilisation processes. Stabilised precursor fibres produced by both processes were characterised by a similar % EOR, highlighting that the same content of cyclic structures was formed although the time frame for stabilisation was significantly different.

In addition to the % EOR, noticeable differences were observed when the dehydrogenation ratio was calculated (formula 3). The dehydrogenation ratio of stabilised fibres manufactured with the rapid stabilisation process was at least 13% higher than the comparative conventional process, demonstrating a higher extent of oxidative chemical reactions or higher chemical conversion of the polymeric backbone.

Differential Scanning Calorimetry (DSC)

The thermal behaviour of stabilised fibres from the comparative conventional and the rapid stabilisation processes was investigated through DSC analysis. The CI index (formula 1) of stabilised fibres was calculated and found to be significantly higher (+16%) with the fibres processed through the rapid stabilisation process. Although fibres had spent less time in heat, the conversion of the exotherms was superior, highlighting enhanced fibre processing.

Thermogravimetric Analysis (TGA)

The evolution of the weight loss as a function of temperature of stabilised precursor fibres was analysed by TGA. Samples were tested under nitrogen at a heating rate of 10° C./min. No significant distinguishable differences were observed between the stabilised precursors formed by the comparative conventional and rapid stabilisation process. Stabilised precursor fibres extracted from both manufacturing processes showed a similar weight loss at 600° C. (25.5±0.7 versus 24.1±0.9 for the comparative conventional and rapid stabilisation process, respectively).

Mass Density

The mass density of the PAN precursor and oxidatively stabilised precursor fibre (OPF) obtained from both stabilisation processes was determined using the density column technique. As explained in the above section, the density of the stabilised fibre was similar (criteria for comparison).

However, in the carbon fibres formed from the differently processed stabilised precursors, despite there being significantly less processing time in heat during oxidation for the rapidly stabilised precursor, the density of the carbon fibres (similar tensile properties) generated from the stabilised precursor produced by the rapid stabilisation process was higher than that of the carbon fibre generation from the stabilised precursor produced by the comparative conventional process (1.774±0.003 versus 1.798±0.005, respectively), which demonstrated a different structural/chemical conformation.

Tensile Testing Through FAVIMAT

The tensile properties PAN fibre, stabilised precursor fibre (OPF) and carbon fibres were measured using the FAVIMAT technique. As a criteria for this example, carbon fibres with similar mechanical properties were produced from both stabilisation processes. The tensile properties of OPF from both processes were similar.

Example 10—Effect of the Concentration of Cyclic Structures in Pre-Stabilised Precursors on Oxidative Stabilisations In this study, the influence of the extent of nitrile group cyclisation in pre-stabilised precursors on subsequent oxidative chemical reactions was investigated. Three sets of pre-stabilised fibres (PAN precursor 12K) having different levels of % EOR, of 17%, 24% and 28% EOR, were selected based on their content of cyclic structures determined through the measurement of the extent of cyclization reaction formula using the FT-IR technique.

For these experiments, the three sets of nitrogen pre-treated fibres were stabilised in oxygen using exactly the same experimental conditions. Pre-treated fibres were continuously stabilised in oxygen containing atmosphere using the centre-to-ends ovens from the carbon fibre production line of Carbon Nexus, Australia, with the set up as shown in FIG. 11. Samples of precursor fibre were extracted after oxidation in the ovens for various dwell times. Specifically, precursor fibres were extracted after dwell times in the heat of 3.75, 7, 10.75 and 15 minutes in the oxygen containing atmosphere. The selected constant tension and temperature for the stabilisation experiment was 2200 cN and 230° C., respectively. Oxidised PAN fibres were tested using the FT-IR technique. The extent of cyclization reaction and the $CH/CH_2$ ratio was calculated accordingly from formula 2 and 3, respectively.

10.1 Discussions

Figure 19:
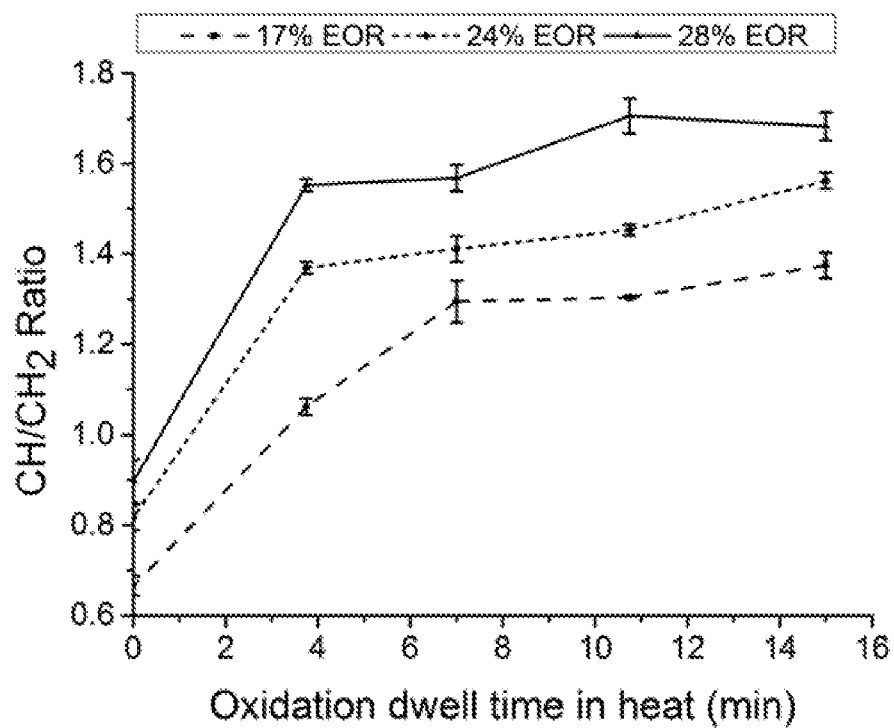
FIG. 19 shows a graph illustrating the dehydrogenation index ($CH/CH_2$ ratio) as a function of dwell time in heat for stabilised precursor fibres of embodiments of the invention formed after oxidative stabilisation of pre-stabilised precursor fibres having different nitrile group cyclisation contents (% EOR) of 17%, 24% and 28%.

The evolution of the $CH/CH_2$ ratio as a function of oxidation dwell time in heat is shown in FIG. 19.

Figure 20:
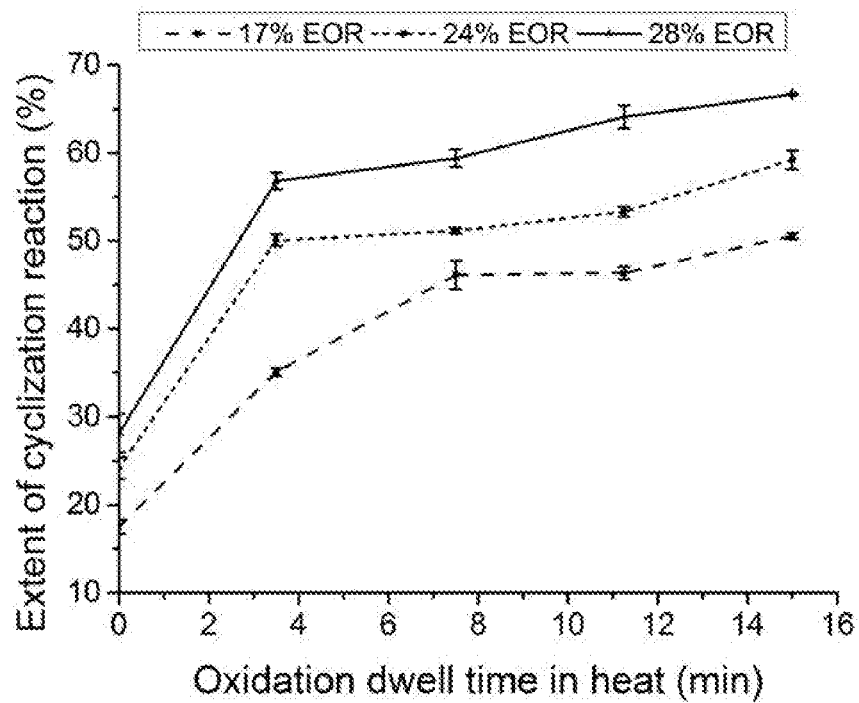
FIG. 20 shows a graph illustrating the extent of nitrile group cyclisation as a function of dwell time in heat for stabilised precursor fibres of embodiments of the invention formed after oxidative stabilisation of pre-stabilised precursor fibres having different nitrile group cyclisation contents (% EOR) of 17%, 24% and 28%.

As seen in FIG. 19, the nitrogen pre-treatment of the different pre-stabilised precursor fibres having different extents of cyclisation, can lead to high chemical reaction conversion rate. The $CH/CH_2$ ratio illustrates the chemical composition of the polymer backbone. With progress of oxidative chemical reaction (dehydrogenation, oxidation, etc), it is expected and accepted that the ratio of CH and $CH_2$ species will be modified during oxidative stabilisation leading to a growth of CH species and a decrease of $CH_2$ functional groups. After the nitrogen pre-treatment, it was observed that the fibres became activated and extremely reactive to oxygen containing atmospheres. The increase of the ratio was maximal for all sets of pre-treated fibres right after short exposure of the fibres in heat and oxygen (0-4 min region). Following this sharp increase, the system became more saturated leading to a decrease of the rate of oxidative chemical reactions. It was noted that the sharpest evolution were observed with the pre-stabilised precursor fibres which had the highest percentage of cyclic structures to start with. The extent of oxidative chemical reactions was directly dependent to the content of cyclic structures generated in the pre-stabilised precursor. In addition to the substantial influence on oxidative chemical reactions, pre-treatment of the precursors in nitrogen also enhanced the growth of nitrile group cyclisation reactions, as shown in FIG. 20.

Similar to the evolution of the $CH/CH_2$ ratio, the sharpest growth of cyclic structure was observed right after exposure to heat and oxygen containing atmosphere. The difference of rate of reaction after 15 minutes of oxidative stabilisation between the different pre-treated fibres was significant. A high % EOR rate was observed (66.7%) after a short exposure time of 15 minutes with the pre-stabilised precursor fibre which had 28% EOR. In previous examples, the % EOR of stabilised precursor samples (OPF samples) at the end of oxidative stabilisation was approximately 70%. This finding was surprising considering the short time (15 minutes) and low temperature (230° C.) at which these experiments were conducted for oxidative stabilisation of the precursor. It was concluded that high cyclization conversion of the PAN precursor during the nitrogen pre-treatment is a prerequisite for rapid oxidation.

Example 11—Production of Carbon Fibres from a Low Density Oxidatively Stabilised Precursor Fibre The precursor used for this example was a commercial PAN tow containing 12,000 filaments (12K) containing acidic comonomers. In this example, two sets of conditions are documented illustrating the manufacture of carbon fibres from an oxidized PAN fibre having an extremely low density which, however, were still acceptable and allowed the manufacture of high performance carbon fibres.

For these experiments, fibres were pre-treated in nitrogen, into the apparatus described in previous examples (FIG. 1), at a temperature of 290° C., a tension of 1200 cN (tension for optimum % EOR) and a residence time in the nitrogen atmosphere of 1 minute and 30 seconds. The extent of cyclization reaction (% EOR) of the pre-stabilised fibre (PSN-6) was determined by FT-IR and was 23%.

Two industrial trials (Examples 11A and 11B) for carbon fibre production using the pre-stabilised precursors were conducted using different experimental conditions. Table 29 and Table 30 are summarising the process parameters used for Examples 11.A and 11.B, respectively. For both trials, pre-treated fibres were rapidly stabilised using three centre-to-ends ovens from the production line of Carbon Nexus, Australia, which were set up to provide three temperature zones for oxidation of the pre-stabilised precursor fibre. The total dwell time in oxygen atmosphere (oxidation) was 15 minutes. Following the oxidation, fibres were carbonised, under tension, in inert atmosphere using similar experimental conditions as illustrated in Tables 29 and 30. The cumulated carbonisation dwell time was 3.9 minutes. Fibres were extracted after each zone of the process and tested using the FAVIMAT.

TABLE 29

Process parameters used for Example 11A.

| Oxidation ovens | | | |
|---|---|---|---|
| Process parameters | Zone 1 | Zone 2 | Zone 3 |
| Temperature (° C.) | 232 | 248 | 266 |
| Tension (cN) | 2500 | 2800 | 3100 |
| Dwell time oxidation (min) | 8 | 4 | 3 |
| Total oxidation time (min) | | 15 | |

| Low temperature carbonization furnace (LT) | | | | |
|---|---|---|---|---|
| Process parameters | Zone 1 | Zone 2 | Zone 3 | Zone 4 |
| Temperature (° C.) | 400 | 500 | 650 | 750 |
| Tension (cN) | | | 700 | |

| High temperature carbonisation furnace (HT) | | | | |
|---|---|---|---|---|
| Process parameters | Zone 1 | Zone 2 | Zone 3 | Zone 2 |
| Temperature (° C.) | 1100 | 1350 | 1550 | 1700 |
| Tension (cN) | | | 2000 | |

TABLE 30

Process parameters used for Example 11B.

Oxidation ovens

| Process parameters | Zone 1 | Zone 2 | Zone 3 |
|---|---|---|---|
| Temperature (° C.) | 232 | 248 | 267 |
| Tension (cN) | 2200 | 2500 | 2800 |
| Dwell time oxidation (min) | 8 | 4 | 3 |
| Total oxidation time (min) | | 15 | |

Low temperature carbonisation furnace (LT)

| Process parameters | Zone 1 | Zone 2 | Zone 3 | Zone 4 |
|---|---|---|---|---|
| Temperature (° C.) | 400 | 500 | 650 | 750 |
| Tension (cN) | | 700 | | |

High temperature carbonisation furnace (HT)

| Process parameters | Zone 1 | Zone 2 | Zone 3 | Zone 2 |
|---|---|---|---|---|
| Temperature (° C.) | 1100 | 1350 | 1550 | 1700 |
| Tension (cN) | | 2000 | | |

Table 31 and Table 32 groups the evolution of the mechanical properties, mass density and the extent of cyclization reaction along the entire manufacturing process.

TABLE 31

Mechanical properties evolution of PAN fibres through the complete production process for Example 11A.

| | Tensile properties | | | | |
|---|---|---|---|---|---|
| Products | Ultimate tensile strength (GPa) | Tensile modulus (GPa) | Elongation to break (%) | Mass density (g/cm$^3$) | EOR (%) |
| PAN | 0.78 ± 0.04 | 16.16 ± 0.50 | 11.14 ± 0.50 | 1.184 | N/A |
| PSN-6 | 0.49 ± 0.03 | 11.85 ± 0.35 | 15.60 ± 0.94 | 1.212 | 23.2 ± 1.2 |
| Oxidation zone 1 | 0.47 ± 0.02 | 11.72 ± 0.33 | 15.78 ± 1.03 | 1.264 | 55.4 ± 0.4 |
| Oxidation zone 2 | 0.42 ± 0.04 | 10.89 ± 0.55 | 16.38 ± 1.14 | 1.286 | 60.5 ± 0.7 |
| Oxidation zone 3 | 0.42 ± 0.02 | 10.85 ± 0.32 | 13.99 ± 1.22 | 1.313 | 66.6 ± 0.7 |
| Carbon fibres | 3.67 ± 0.80 | 252.11 ± 6.58 | 1.72 ± 0.22 | 1.792 | N/A |

TABLE 32

Mechanical properties evolution of PAN fibres through the complete production process for Example 11B.

| | Tensile properties | | | | |
|---|---|---|---|---|---|
| Products | Ultimate tensile strength (GPa) | Tensile modulus (GPa) | Elongation to break (%) | Mass density (g/cm$^3$) | EOR (%) |
| PAN | 0.78 ± 0.04 | 16.16 ± 0.50 | 11.14 ± 0.50 | 1.184 | N/A |
| PSN-6 | 0.49 ± 0.03 | 11.85 ± 0.35 | 15.60 ± 0.94 | 1.212 | 23.2 ± 1.2 |
| Oxidation zone 1 | 0.41 ± 0.02 | 10.84 ± 0.30 | 17.03 ± 0.55 | 1.269 | 54.3 ± 1.1 |
| Oxidation zone 2 | 0.38 ± 0.01 | 10.29 ± 0.29 | 18.26 ± 1.42 | 1.293 | 60.9 ± 0.3 |
| Oxidation zone 3 | 0.32 ± 0.01 | 9.66 ± 0.23 | 17.02 ± 0.45 | 1.336 | 67.8 ± 0.4 |
| Carbon fibres | 3.57 ± 0.72 | 239.90 ± 6.24 | 1.62 ± 0.31 | 1.797 | N/A |

It was observed that high performance carbon fibres were produced from both industrials trials. However, for both examples, it was noted that the density of the oxidised PAN fibre was 1.313 g/cm$^3$ and 1.336 g/cm$^3$, for Examples 11A and 11B, respectively. These density values were considered as low, as the range of density of stabilised precursor fibres (OPF fibres) commonly referenced in the literature that are known for the production of high performance carbon fibre is usually between 1.340 g/cm$^3$ and 1.390 g/cm$^3$. For both examples, the content of cyclic structures of the stabilized fibres (zone 3) was similar to the content measured with the baseline example CE-1. The % EOR was 66.6±0.7% and 67.8±0.4% for Examples 11A and 11B, respectively. Although the stabilised fibres were less dense, the enhanced chemical structure formed using this process allowed high performance carbon fibres to be formed efficiently.

Example 12—Example of Determination of Temperature of Degradation of PAN Precursors The temperature of degradation of PAN precursor was tested using the Differential Scanning calorimeter (DSC). The temperature of degradation was assigned to the maximum of the exothermic transition occurring with PAN precursors under nitrogen atmosphere. Three milligram of precursor fibres were tested by DSC at a heating rate of 10° C. per minute under nitrogen atmosphere.

Table 33 illustrates the temperature of degradation of some PAN precursors used in some of the examples herein.

TABLE 33

Process parameters used for the stabilisation (comparative conventional process).

| Precursor number | Usage in example | Temperature of degradation (° C.) |
| --- | --- | --- |
| 1 | 8 (precursor B), 9 | 303.2 ± 0.7 |
| 2 | 8 (precursor A) | 300.6 ± 0.9 |
| 3 | 13 | 311.9 ± 1.5 |

Figure 21:
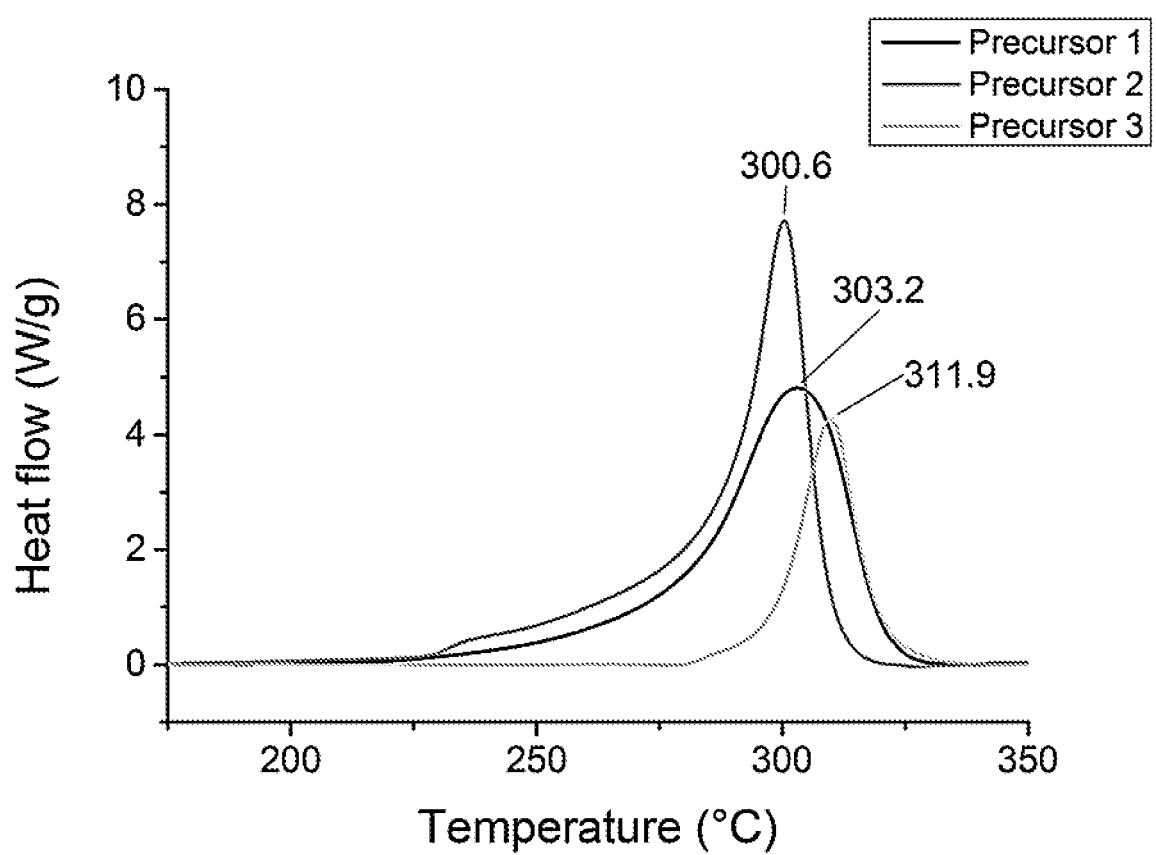
FIG. 21 shows DSC traces under nitrogen atmosphere of different PAN precursors to illustrate the degradation temperature of the precursors.

FIG. 21 shows the DSC traces of the different precursors to illustrate the degradation temperature of the precursors.

Comparative Example 2 (CE-2)—Attempt of Rapid Stabilisation of PAN Precursor Fibre with Pre-Stabilised Precursor Having Less than 10% Cyclised Nitrile Groups In this example, a commercial PAN precursor containing acidic comonomers was used. The precursor fibres were pre-stabilised in nitrogen using the equipment previously used for Example 2. The temperature was set to 280° C. for all heated zones. The line speed was set to provide a residence time in heat of 6 minutes for pre-stabilisation. After pre-stabilisation, the colouration of the fibre changed from white to orange. Although the change of colour highlighted chemical changes, FT-IR analysis was performed on the pre-treated fibres and gave a low extent of cyclization reaction value of 6.1±0.8% EOR.

A rapid stabilisation experiment was attempted on the pre-stabilised precursor fibres using a single oxidation oven (FIG. 9). For this example, the residence time in heat in the oxidation oven was 15 minutes. Rapid stabilisation experiments were firstly preformed at temperatures ranging from 230° C. to 260° C. In this example, although the partially stabilised precursor had been exposed to oxygen, it was found that the resultant precursor after oxygen exposure was not sufficiently thermally stable as determined by a flame test. That is, when a naked flame was held to the precursor after being exposed to oxygen, the precursor was not able to sufficiently withstand the naked flame without combusting or significant smoulder. As a result, the oxygen treated precursor was deemed to be of an unsatisfactory quality for carbonisation.

Following these preliminary experiments, the temperature inside the oxidation oven was set to a higher temperature of 270° C. However, this higher oxidation temperature led to degradation of the pre-stabilised precursor fibre material due to excessive heating rates, non-controlled management of exothermic reactions and insufficient chemical preparation (i.e. not enough nitrile group cyclisation) in the pre-stabilised fibre.

It is to be understood that various other modifications and/or alterations may be made without departing from the spirit of the present invention as outlined herein.

The invention claimed is:

1. A process for preparing a stabilised precursor in no more than 25 minutes, the process comprising: heating a precursor comprising polyacrylonitrile at a temperature in a range of from 250° C. to 400° C. in a substantially oxygen-free atmosphere containing not more than 0.005% by volume of an oxygen containing molecule while applying a substantially constant amount of tension that varies by less than 5% to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups (EOR (%)) as determined by Fourier transform infrared (FT-IR) spectroscopy using the following equation:

$$EOR\ (\%) = \frac{(100 \times 0.29 \times Abs(1590))}{((Abs(2242) + (0.29 \times Abs(1590)))}$$

where Abs (1590) and Abs (2242) are absorbance peaks recorded at 1590 cm$^{-1}$ and 2242 cm$^{-1}$, which correspond to C=N groups and nitrile (—CN) groups, respectively; and
exposing the pre-stabilised precursor to an oxygen containing atmosphere at a temperature in a range of from 200° C. to 300° C. to form the stabilised precursor;
wherein prior to the pre-stabilised precursor being exposed to the oxygen containing atmosphere it is cooled to a temperature below the temperature of the oxygen containing atmosphere.

2. The process according to claim 1, wherein the precursor is heated in the substantially oxygen-free atmosphere for period of no more than about 5 minutes.

3. The process according to claim 1, wherein the amount of tension applied to the precursor is selected to promote formation of at least 15% cyclised nitrile groups in the pre-stabilised precursor as determined by Fourier transform infrared (FT-IR) spectroscopy using the equation defined in claim 1.

4. The process according to claim 1, wherein the amount of tension applied to the precursor is selected to promote maximum nitrile group cyclisation in the pre-stabilised precursor.

5. The process according to claim 1, wherein the pre-stabilised precursor is exposed to the oxygen containing atmosphere for a time period of no more than about 20 minutes.

6. The process according to claim 1, wherein the pre-stabilised precursor is heated in the oxygen containing atmosphere at a temperature that is lower than that used for forming the pre-stabilised precursor.

7. The process according to claim 1 which is a continuous process.

8. The process according to claim 1, further comprising a step of determining a tension parameter for a precursor prior to forming the pre-stabilised precursor, wherein determining the tension parameter for the precursor comprises:
(a) selecting a temperature in a range of from 250° C. to 400° C. and time period for heating a precursor in a substantially oxygen-free atmosphere containing not more than 0.005% by volume of an oxygen containing molecule;
(b) applying a range of different substantially constant amounts of tension that vary by less than 5% to the precursor while heating the precursor in the substantially oxygen-free atmosphere at the selected temperature and for the selected time period;
(c) determining by Fourier transform infrared (FT-IR) spectroscopy using the equation defined in claim 1 the amount of cyclised nitrile groups (EOR (%)) formed in the precursor for each substantially constant amount of tension applied to the precursor;
(d) calculating a trend of extent of nitrile group cyclisation versus tension, (e) identifying from the calculated trend the amounts of tension providing at least 10% nitrile group cyclisation and maximum nitrile group cyclisation; and (f) selecting an amount of tension giving rise to at least 10% nitrile group cyclisation to pre-stabilise the precursor.

9. A process for preparing a carbon fibre comprising the steps of:

providing a stabilised precursor fibre prepared according to a process comprising heating a precursor comprising polyacrylonitrile at a temperature in a range of from 250° C. to 400° C. in a substantially oxygen-free atmosphere containing not more than 0.005% by volume of an oxygen containing molecule while applying a substantially constant amount of tension that varies by less than 5% to the precursor to promote cyclisation of nitrile groups in the precursor, the temperature and time period in which the precursor is heated in the substantially oxygen-free atmosphere and the amount of tension applied to the precursor each being selected to form a pre-stabilised precursor having at least 10% cyclised nitrile groups (EOR (%)) as determined by Fourier transform infrared (FT-IR) spectroscopy using the following equation:

$$EOR\ (\%) = \frac{(100 \times 0.29 \times Abs(1590))}{((Abs(2242) + (0.29 \times Abs(1590)))}$$

where Abs (1590) and Abs (2242) are absorbance peaks recorded at 1590 cm$^{-1}$ and 2242 cm$^{-1}$, which correspond to C=N groups and nitrile (—CN) groups, respectively; and exposing the pre-stabilised precursor to an oxygen containing atmosphere at a temperature in a range of from 200° C. to 300° C. to form the stabilised precursor in a time period of no more than 25 minutes, wherein prior to the pre-stabilised precursor being exposed to the oxygen containing atmosphere it is cooled to a temperature below the temperature of the oxygen containing atmosphere; and carbonising the stabilised precursor fibre to form the carbon fibre.

10. The process according to claim 9, wherein carbonising the stabilised precursor comprises heating the stabilised precursor in an inert atmosphere at a temperature in a range of from about 350° C. to 3000° C.

11. The process according to claim 9, wherein the carbon fibre is formed in a time period of no more than about 45 minutes.

12. The process according to claim 9 which is continuous and comprises the steps of:

(a) feeding a precursor comprising polyacrylonitrile in to a pre-stabilisation reactor comprising a substantially oxygen-free atmosphere containing not more than 0.005% by volume of an oxygen containing molecule and heating the precursor at a temperature in a range of rom 250° C. to 400° C. in the substantially oxygen-free atmosphere while applying a substantially constant amount of tension that varies by less than 5% to the precursor to promote cyclisation of nitrile groups in the precursor, the temperature and time period in which the precursor is heated in the substantially oxygen-free atmosphere and the amount of tension applied to the precursor each being selected to form a pre-stabilised precursor comprising at least 10% cyclised nitrile groups as determined by Fourier transform infrared (FT-IR) spectroscopy using the following equation:

$$EOR\ (\%) = \frac{(100 \times 0.29 \times Abs(1590))}{((Abs(2242) + (0.29 \times Abs(1590)))}$$

where Abs (1590) and Abs (2242) are absorbance peaks recorded at 1590 cm$^{-1}$ and 2242 cm$^{-1}$, which correspond to C=N groups and nitrile (—CN) groups, respectively;

(b) cooling the pre-stabilised precursor prior to it being exposed to an oxygen containing atmosphere and feeding it into an oxidation reactor;

(c) feeding the pre-stabilised precursor in to an the oxidation reactor comprising an oxygen containing atmosphere at a temperature in a range of from 200° C. to 300° C. and exposing the pre-stabilised precursor to the oxygen containing atmosphere to form a stabilised precursor in a time period of no more than 25 minutes; and (d) feeding the stabilised precursor in to a carbonisation unit and carbonising the stabilised precursor in the carbonisation unit to form the carbon fibre.

* * * * *